US012106657B2

United States Patent
Williams, II et al.

(10) Patent No.: US 12,106,657 B2
(45) Date of Patent: Oct. 1, 2024

(54) SIMILARITY AGENT FOR COMPUTER-AIDED DISPATCH SYSTEMS

(71) Applicant: Intergraph Corporation, Madison, AL (US)

(72) Inventors: Jackie Paul Williams, II, Fairmont, WV (US); Michael Thomas Cole, Charlottesville, VA (US); José Eduardo Zindel Deboni, Santo André (BR)

(73) Assignee: Intergraph Corporation, Madison, AL (US)

( * ) Notice: Subject to any disclaimer, the term of this patent is extended or adjusted under 35 U.S.C. 154(b) by 347 days.

(21) Appl. No.: 16/855,664

(22) Filed: Apr. 22, 2020

(65) Prior Publication Data

US 2020/0388143 A1 Dec. 10, 2020

Related U.S. Application Data

(63) Continuation of application No. 16/436,546, filed on Jun. 10, 2019, now Pat. No. 11,735,028.

(Continued)

(51) Int. Cl.
*G08B 25/00* (2006.01)
*G06N 7/02* (2006.01)
(Continued)

(52) U.S. Cl.
CPC ............ *G08B 25/005* (2013.01); *G06N 7/02* (2013.01); *G06N 20/00* (2019.01); *H04L 67/12* (2013.01)

(58) Field of Classification Search
None
See application file for complete search history.

(56) References Cited

U.S. PATENT DOCUMENTS

| 6,754,643 B1 | 6/2004 | Goldsmith |
| 7,508,321 B2 | 3/2009 | Gueziec et al. |

(Continued)

FOREIGN PATENT DOCUMENTS

| CN | 108804567 A | * 11/2018 |
| CN | 110309251 A | * 10/2019 |

(Continued)

OTHER PUBLICATIONS

[No Author Listed], "AccuWeather.com and Triangle Software LLC Announce Partnership to Provide Traffic Information" Online. Published Feb. 8, 2006. Retrieved from the Internet under https://www.accuweather.com/en/press/35639 on May 13, 2021. 2 pages.

(Continued)

*Primary Examiner* — Lance Leonard Barry
*Assistant Examiner* — Mohammad Yousuf A. Mian
(74) *Attorney, Agent, or Firm* — Nutter McClennen & Fish LLP

(57) ABSTRACT

Exemplary embodiments of the present invention provide a virtual dispatch assist system in which various types of Intelligent Agents are deployed (e.g., as part of a new CAD system architecture or as add-ons to existing CAD systems) to analyze vast amounts of historic operational data and provide various types of dispatch assist notifications and recommendations that can be used by a dispatcher or by the CAD system itself (e.g., autonomously) to make dispatch decisions.

20 Claims, 38 Drawing Sheets

Related U.S. Application Data

(60) Provisional application No. 62/683,754, filed on Jun. 12, 2018.

(51) Int. Cl.
  *G06N 20/00* (2019.01)
  *H04L 67/12* (2022.01)

(56) References Cited

U.S. PATENT DOCUMENTS

| | | | |
|---|---|---|---|
| 8,423,567 B1 * | 4/2013 | Finneran | G06F 16/2425 |
| | | | 707/766 |
| 8,515,565 B2 | 8/2013 | Smith et al. | |
| 8,799,799 B1 | 8/2014 | Cervelli et al. | |
| 8,949,164 B1 | 2/2015 | Mohler | |
| 8,976,939 B1 | 3/2015 | Hamilton et al. | |
| 9,129,219 B1 | 9/2015 | Robertson et al. | |
| 9,324,022 B2 | 4/2016 | Williams, Jr. et al. | |
| 9,438,731 B2 | 9/2016 | Klaban | |
| 9,712,549 B2 | 7/2017 | Almurayh | |
| 9,736,302 B2 | 8/2017 | Klaban | |
| 9,805,311 B1 | 10/2017 | Mohler | |
| 9,836,694 B2 | 12/2017 | Robertson et al. | |
| 10,135,937 B2 | 11/2018 | Dotan-Cohen et al. | |
| 10,140,327 B2 | 11/2018 | Elkherj et al. | |
| 10,146,960 B1 | 12/2018 | Wilczynski et al. | |
| 10,540,549 B2 | 1/2020 | Zhao et al. | |
| 10,558,936 B2 | 2/2020 | Herman et al. | |
| 10,679,756 B1 | 6/2020 | Hanson et al. | |
| 10,783,583 B1 | 9/2020 | Gunn, Jr. et al. | |
| 10,791,084 B2 | 9/2020 | Bhagwan et al. | |
| 10,999,248 B2 | 5/2021 | Kishikawa et al. | |
| 2002/0116463 A1 | 8/2002 | Hart | |
| 2004/0019651 A1 | 1/2004 | Andaker | |
| 2008/0177423 A1 | 7/2008 | Brickfield et al. | |
| 2010/0169757 A1 * | 7/2010 | Ahne | G06Q 10/10 |
| | | | 707/E17.05 |
| 2011/0047166 A1 * | 2/2011 | Stading | G06F 16/332 |
| | | | 707/E17.109 |
| 2011/0320715 A1 | 12/2011 | Ickman et al. | |
| 2012/0123822 A1 * | 5/2012 | Hnatio | G06Q 50/26 |
| | | | 705/7.28 |
| 2012/0320912 A1 | 12/2012 | Estrada et al. | |
| 2014/0019431 A1 | 1/2014 | Suleyman et al. | |
| 2014/0185959 A1 | 7/2014 | Coppin et al. | |
| 2015/0278732 A1 | 10/2015 | Fielder et al. | |
| 2015/0281927 A1 | 10/2015 | Fiedler et al. | |
| 2015/0363518 A1 | 12/2015 | Edgington et al. | |
| 2016/0021025 A1 | 1/2016 | Patel et al. | |
| 2016/0086241 A1 | 3/2016 | Proulx | |
| 2016/0189043 A1 | 6/2016 | McGeever et al. | |
| 2016/0189198 A1 * | 6/2016 | McKenzie | G06Q 30/0277 |
| | | | 705/14.41 |
| 2016/0253089 A1 | 9/2016 | Lee et al. | |
| 2016/0309310 A1 | 10/2016 | Herman et al. | |
| 2016/0364434 A1 | 12/2016 | Spitz et al. | |
| 2017/0024449 A1 | 1/2017 | Wesley, Sr. et al. | |
| 2017/0083929 A1 | 3/2017 | Bates et al. | |
| 2017/0091617 A1 | 3/2017 | Baughman et al. | |
| 2017/0098181 A1 | 4/2017 | Herman et al. | |
| 2017/0111432 A1 | 4/2017 | Saini et al. | |
| 2017/0161614 A1 | 6/2017 | Mehta et al. | |
| 2017/0178007 A1 | 6/2017 | Yu et al. | |
| 2017/0208021 A1 | 7/2017 | Ingram et al. | |
| 2017/0293847 A1 | 10/2017 | Robertson et al. | |
| 2018/0075343 A1 | 3/2018 | van den Oord et al. | |
| 2018/0082193 A1 | 3/2018 | Cormier et al. | |
| 2018/0121827 A1 | 5/2018 | Green | |
| 2018/0260689 A1 | 9/2018 | Wang et al. | |
| 2018/0260707 A1 | 9/2018 | Schaul et al. | |
| 2018/0260708 A1 | 9/2018 | Mnih et al. | |
| 2018/0268305 A1 | 9/2018 | Dhondse et al. | |
| 2018/0322891 A1 | 11/2018 | van den Oord et al. | |
| 2018/0329897 A1 | 11/2018 | Kalchbrenner et al. | |
| 2018/0330185 A1 | 11/2018 | Jaderberg et al. | |
| 2018/0336413 A1 | 11/2018 | Zhao et al. | |
| 2018/0336455 A1 | 11/2018 | Kalchbrenner et al. | |
| 2018/0342028 A1 | 11/2018 | Huber et al. | |
| 2018/0365554 A1 | 12/2018 | van den Oord et al. | |
| 2019/0005684 A1 | 1/2019 | De Fauw et al. | |
| 2019/0102438 A1 | 4/2019 | Murray et al. | |
| 2019/0108833 A1 | 4/2019 | van den Oord et al. | |
| 2019/0126472 A1 | 5/2019 | Tunyasuvunakool et al. | |
| 2019/0139270 A1 | 5/2019 | De Fauw et al. | |
| 2019/0188572 A1 | 6/2019 | Lanctot et al. | |
| 2019/0205757 A1 | 7/2019 | Blundell et al. | |
| 2019/0212754 A1 | 7/2019 | Smith | |
| 2019/0213469 A1 | 7/2019 | Danihelka et al. | |
| 2019/0228186 A1 | 7/2019 | Atreya et al. | |
| 2019/0232489 A1 | 8/2019 | Pascanu et al. | |
| 2019/0244099 A1 | 8/2019 | Schaul et al. | |
| 2019/0251419 A1 | 8/2019 | Pascanu et al. | |
| 2019/0251987 A1 | 8/2019 | van den Oord et al. | |
| 2019/0258718 A1 | 8/2019 | Yu et al. | |
| 2019/0258907 A1 | 8/2019 | Rezende et al. | |
| 2019/0258918 A1 | 8/2019 | Wang et al. | |
| 2019/0258929 A1 | 8/2019 | Mnih et al. | |
| 2019/0258938 A1 | 8/2019 | Mnih et al. | |
| 2019/0259051 A1 | 8/2019 | Silver et al. | |
| 2019/0266449 A1 | 8/2019 | Viola et al. | |
| 2019/0266475 A1 | 8/2019 | Wierstra et al. | |
| 2019/0279076 A1 | 9/2019 | Hu et al. | |
| 2019/0286708 A1 | 9/2019 | Kalchbrenner et al. | |
| 2019/0303764 A1 | 10/2019 | Uria-Martinez et al. | |
| 2019/0324988 A1 | 10/2019 | Wayne et al. | |
| 2019/0332923 A1 | 10/2019 | Gendron-Bellemare et al. | |
| 2019/0332938 A1 | 10/2019 | Gendron-Bellemare et al. | |
| 2019/0340509 A1 | 11/2019 | Osindero et al. | |
| 2019/0346272 A1 | 11/2019 | Banino et al. | |
| 2019/0354689 A1 | 11/2019 | Li et al. | |
| 2019/0354813 A1 | 11/2019 | Riedmiller et al. | |
| 2019/0354859 A1 | 11/2019 | Xu et al. | |
| 2019/0354867 A1 | 11/2019 | Czarnecki et al. | |
| 2019/0354869 A1 | 11/2019 | Warde-Farley et al. | |
| 2019/0354885 A1 | 11/2019 | Li et al. | |
| 2019/0362201 A1 | 11/2019 | van den Oord et al. | |
| 2019/0362238 A1 | 11/2019 | Pietquin et al. | |
| 2019/0369946 A1 | 12/2019 | Foerster et al. | |
| 2019/0370637 A1 | 12/2019 | Dunning et al. | |
| 2019/0373101 A1 * | 12/2019 | Dotan-Cohen | H04L 67/535 |
| 2019/0378397 A1 | 12/2019 | Williams, II et al. | |
| 2020/0005147 A1 | 1/2020 | Grefenstette et al. | |
| 2020/0005152 A1 | 1/2020 | Blundell et al. | |
| 2020/0029084 A1 | 1/2020 | Wierstra et al. | |
| 2020/0042901 A1 | 2/2020 | Chen et al. | |
| 2020/0050611 A1 | 2/2020 | Patton et al. | |
| 2020/0082227 A1 | 3/2020 | Wierstra et al. | |
| 2020/0082534 A1 | 3/2020 | Nikolov et al. | |
| 2020/0090006 A1 | 3/2020 | Wierstra et al. | |
| 2020/0090042 A1 | 3/2020 | Wayne et al. | |
| 2020/0090043 A1 | 3/2020 | Mnih et al. | |
| 2020/0090048 A1 | 3/2020 | Pascanu et al. | |
| 2020/0092565 A1 | 3/2020 | Watters et al. | |
| 2020/0104640 A1 | 4/2020 | Poole et al. | |
| 2020/0104645 A1 | 4/2020 | Ionescu et al. | |
| 2020/0104677 A1 | 4/2020 | Rae et al. | |
| 2020/0104679 A1 | 4/2020 | van den Oord et al. | |
| 2020/0104680 A1 | 4/2020 | Reed et al. | |
| 2020/0104684 A1 | 4/2020 | Vecerik et al. | |
| 2020/0104685 A1 | 4/2020 | Hasenclever et al. | |
| 2020/0104709 A1 | 4/2020 | Mohammadi et al. | |
| 2020/0244716 A1 * | 7/2020 | Mehta | G06Q 20/405 |
| 2020/0320431 A1 | 10/2020 | Fly et al. | |
| 2020/0320849 A1 | 10/2020 | Williams, II et al. | |
| 2020/0334470 A1 | 10/2020 | Abeykoon et al. | |
| 2020/0357265 A1 | 11/2020 | Williams, II et al. | |
| 2020/0388144 A1 | 12/2020 | Williams, II et al. | |

(56) References Cited

U.S. PATENT DOCUMENTS

2020/0401966 A1* 12/2020 Miinch ............... G06Q 10/067
2021/0174021 A1* 6/2021 Ishikawa ............ G06F 18/2413

FOREIGN PATENT DOCUMENTS

JP    2016184806 A   10/2016
WO    2015058133 A1   4/2015

OTHER PUBLICATIONS

[No Author Listed], "eContext: Text Classification Technology. eContext helps you gain contextually relevant and rich insights from alol of your text data." Retrieved from the internet under https://www.econtext.ai/text-classificaton-technology/ on May 13, 2021. 4 pages.

Grimes, S., "Contextual Machine Learning: It's Classified". eContext. Published Apr. 12, 2017. 17 pages.

International Search Report and Written Opinion for International Application No. PCT/US2019/036368, mailed Oct. 1, 2019, 16 pages.

U.S. Appl. No. 16/855,550, filed Apr. 22, 2020, Statistic Agent for Computer-Aided Dispatch Systems.

U.S. Appl. No. 16/855,561, filed Apr. 22, 2020, Pattern Agent for Computer-Aided Dispatch Systems.

U.S. Appl. No. 16/855,678, filed Apr. 22, 2020, Coverage Agent for Computer-Aided Dispatch Systems.

**[No Author Listed]—"Algorithmic Impact Assessments: Toward Accountable Automation in Public Agencies", AI Now Institute, Feb. 21, 2018, Updated Apr. 9, 2018, 11 pages, https://medium.com/@AINowInstitute/algorithmic-impact-assessments-toward-accountable-automation-in-public-agencies-bd9856e6fdde.

**[No Author Listed]—"DeepMind: First major AI patent filings revealed", Reddie & Grose, Intellectual Property Law, IP News, Jun. 11, 2018, 3 pages, https://www.reddie.co.uk/2018/06/11/deepmind-first-major-ai-patent-filings-revealed/.

**[No Author Listed]—"Predictive policing: Don't even think about it", The Economist, Jul. 20, 2013, 3 pages, https://www.economist.com/node/21582042/print.

**Brooks—"Market Assessment: Big Data and Visualization Solutions in Law Enforcement", IDC Analyze the Future, IDC White Paper, Sponsored by CSSP-2016-CP-2264, Lead partner: Windsor Police Services, Mar. 2018, 60 pages, https://www.cacp.ca/index.html?asst_id=1639.

**Bunch et al.—"Software Agents for Process Monitoring and Notification", Proceedings of the 2004 ACM Symposium on Applied Computing, Mar. 14-17, 2004, Nicosia, Cyprus, pp. 94-99 http://citeseerx.ist.psu.edu/viewdoc/download?doi=10.1.1.657.2846&rep=rep1&type=pdf.

**Byford—"DeepMind founder Demis Hassabis on how AI will shape the future", The Verge, Mar. 10, 2016, 13 pages, https://www.theverge.com/2016/3/10/11192774/demis-hassabis-interview-alphago-google-deepmind-ai.

**Chang et al—"The Research of Emergency Service Nodes Location Model Based on Improved Genetic Algorithm", 2009 Second International Conference on Information and Computing Science, Manchester, May 21-22, 2009, vol. 4, pp. 355-357, doi: 10.1109/ICIC.2009.400.

**Chu et al.—"A genetic algorithm for the multidimensional knapsack problem", Journal of Heuristics, vol. 4, No. 1, 1998, pp. 63-86.

**Fleming et al.—"Evolutionary Algorithms in Control Systems Engineering: A Survey", Control Engineering Practice, vol. 10, No. 11, Nov. 2002, pp. 1223-1241, Elsevier, doi:10.1016/S0967-0661(02)00081-3.

**Friend—"Predictive Policing: Using Technology to Reduce Crime", FBI Law Enforcement Bulletin, Apr. 9, 2013, 7 pages, https://leb.fbi.gov/articles/featured-articles/predictive-policing-using-technology-to-reduce-crime.

**Jones—"Train a software agent to behave rationally with reinforcement learning", IBM Developer, published Oct. 11, 2017, 8 pages, https://developer.ibm.com/technologies/artificial-intelligence/articles/cc-reinforcement-learning-train-software-agent/.

**Ketter et al.—"A semantic web architecture for advocate agents to determine preferences and facilitate decision making", Proceedings of the 10th International Conference on Electronic Commerce (ICEC), Innsbruck, Austria, Aug. 18-22, 2008, Article No. 10, 10 pages, https://dl.acm.org/citation.cfm?id=1409554.

**Koepke—"Predictive Policing Isn't About the Future—It's about the past", Slate Nov. 21, 2016, 9 pages, https://slate.com/technology/2016/11/predictive-policing-is-too-dependent-on-historical-data.html.

**Koza et al.—"Evolving Inventions", Scientific American, vol. 288, No. 2, Feb. 2003, pp. 52-59, doi:10.1038/scientificamerican0203-52.

**Lohn et al.—"Evolutionary design of an X-band antenna for NASA's Space Technology 5 mission", Proceedings of the 2004 IEEE Antennas and Propagation Society Symposium, Monterey, CA, USA, 2004, vol. 3, pp. 2313-2316.

**Machado et al.—"Vehicle Routing Problem: Doing it the Evolutionary Way", Proceedings of the 4th Annual Conference on Genetic and Evolutionary Computation, Jul. 9-13, 2002, pp. 690-696 (7 pages), Morgan Kaufmann Publishers Inc.

**Marczyk—"Genetic Algorithms and Evolutionary Computation", The Talk Origins Archive, Posted Apr. 23, 2004, 44 pages, http://www.talkorigins/faqs/genalg/genalg.html (2004).

**Miller—"Sisense Pulse uses machine learning to trigger data anomaly alerts", Techcrunch, Apr. 12, 2017, 3 pages, posted by Daniel Laury on Apr. 13, 2017 under <https://www.theexplorergroup.com/sisense-pulse-uses-machine-learning-to-trigger-data-anomaly-alerts/>.

**Moscato et al.—"A Modern Introduction to Memetic Algorithms", In: Gendreeau M., Potvin JY. (eds) Handbook of Metaheuristics, International Series in Operations Research & Management Science (ISOR), Chapter 6, vol. 146, pp. 141-183, Springer, Boston, MA, Sep. 2010, doi:10.1007/978-1-4419-1665-5_6.

**Nguyen et al.—"Surrogate-Assisted Genetic Programming With Simplified Models for Automated Design of Dispatching Rules", IEEE Transactions on Cybernetics, vol. 47, No. 9, Sep. 2017, pp. 2951-2965, doi:10.1109/TCYB.2016.2562674.

**Rezoug et al.—"Guided Genetic Algorithm for the Multidimensional Knapsack Problem", Memtic Computing, vol. 10, Issue 1, Mar. 2018, pp. 29-42, https://core.ac.uk/download/pdf/83937046.pdf. Author manuscript.

**Rieland—"Artificial Intelligence is Now Used to Predict Crime. But is it Biased?", Smithsonian Magazine, Mar. 5, 2018, 4 pages, https://www.smithsonianmag.com/innovation/artificial-intelligence-is-now-used-predict-crime-is-it-biased-180968337/.

**Shah—"Genetic Algorithm for the 0/1 Multidimensional Knapsack Problem", Johns Hopkins University, 5 pages, preprint Jan. 2020, https://arxiv.org/ftp/arxiv/papers/1908/1908.08022.pdf.

*Winston et al.—"A pioneer in predictive policing is starting a troubling new project: Pentagon-funded research aims to predict when crimes are gang-related", The Verge, Apr. 26, 2018, 7 pages https://www.theverge.com/2018/4/26/17285058/predictive-policing-predpol-pentagon-ai-racial-bias.

**Zarandi et al.—"The Large Scale Maximal Covering Location Problem", Scientia Iranica, vol. 18, No. 6, Dec. 2011, pp. 1564-1570, doi:10.1016/j.scient.2011.11.008.

U.S. Appl. No. 16/436,546, filed Jun. 10, 2019, Artificial Intelligence Applications for Computer-Aided Dispatch Systems.

Connelly, C., et al., "Reiki: Serviceability Architecture and Approach for Reduction and Management of Product Service Incidents", publisher: IEEE computer society. (Year: 2009).

United States Patent and Trademark Office, Non-final Office Action dated Apr. 29, 2022, pertaining to U.S. Appl. No. 16/855,550, 67 pages.

United States Patent and Trademark Office, Non-final Office Action dated May 27, 2022, pertaining to U.S. Appl. No. 16/855,561, 64 pages.

(56) References Cited

OTHER PUBLICATIONS

United States Patent and Trademark Office, Non-final Office Action dated Jun. 16, 2022, pertaining to U.S. Appl. No. 16/855,678, 61 pages.
United States Patent and Trademark Office, Non-final Office Action dated Mar. 30, 2022, pertaining to U.S. Appl. No. 16/436,546, 39 pages.
[Anonymously Disclosed] A Method to Enable Efficient Ticket Dispatch in an IT Service Environment, Publication Date: Jul. 5, 2012 (Year: 2012).
United States Patent and Trademark Office, Final Office Action dated Nov. 1, 2022, pertaining to U.S. Appl. No. 16/436,546, 28 pages.
United States Patent and Trademark Office, Final Office Action dated Oct. 17, 2022, pertaining to U.S. Appl. No. 16/855,561, 32 pages.
United States Patent and Trademark Office, Final Office Action dated Oct. 24, 2022, pertaining to U.S. Appl. No. 16/855,550, 37 pages.
United States Patent and Trademark Office, Notice of Allowance dated Jan. 5, 2023, pertaining to U.S. Appl. No. 16/855,678, 22 pages.

\* cited by examiner

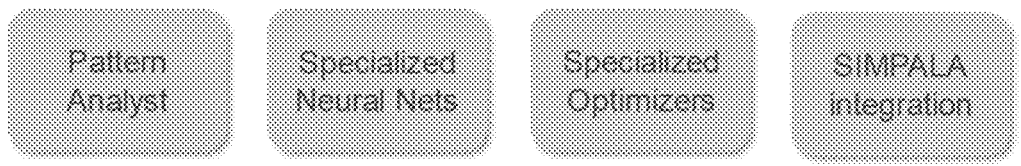
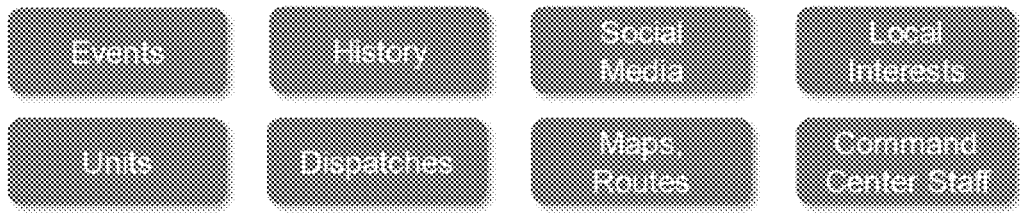
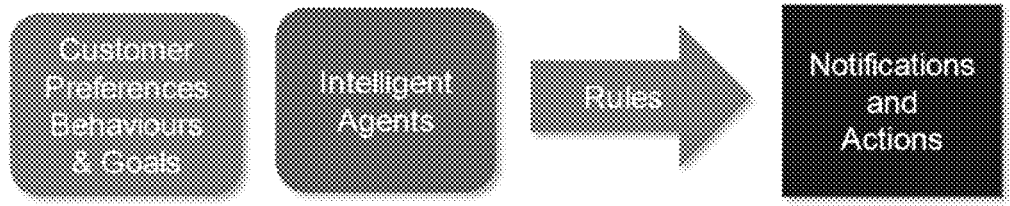
FIG. 3

| Description | Date/Time |
|---|---|
| Similarity Detection<br>Suspect Description / Location Type / M.O. | 02.19.201 |
| Similarity Detection<br>Vehicle Tag # Matches | 02.19.201 |
| Similarity Detection<br>Incident Description Matches Data from Facebook | 02.19.201 |
| Trend Detection<br>Same Incident Type Occurring at or around 3:00 PM | 02.19.201 |

Yesterday and Older

| | |
|---|---|
| Similarity Detection<br>Vehicle Description | 02.18.201 |
| Trend Detection<br>Same Incident Type Occurring at or around 9:00 AM | 02.18.201 |
| Trend Detection<br>Drug Related Incidents on the Rise in D-GROUP 3 | 02.18.201 |
| Similarity Detection<br>Suspect and Vehicle Description | 02.17.201 |
| Similarity Detection<br>Incident Type / Location Type | 02.17.201 |
| Trend Detection<br>Gang Related Activity Increasing in D-GROUP 2 | 02.17.201 |
| Similarity Detection<br>Suspect Description | 02.16.201 |

FIG. 8

|              | PL(Ni) High | Low     |
|--------------|-------------|---------|
| PD(Ni) High  | SHOW        | NO SHOW |
| Low          | SHOW        | SHOW    |

```
BASELINE
1708
Events read TYP in the period from 1/1/2016-9:19 to 9/1/2016-9:47
Top Categories
VEHICLE PVT PROP      46      2.7%
TRASH PVT PROP       116      6.8%
STREET POTHOLE        73      4.3%
STOLEN GARB CART      53      3.1%
SIGNAGE REPAIR        44      2.6%
RECYCLE BINS          84      4.9%
NEW RECYCLE CART      42      2.5%
MISCELLANEOUS        183     10.7%
LIGHTING REPAIR       66      3.9%
INTERIOR VIOL         51      3.0%
ILLEGAL DUMPING       38      2.2%
GARBAGE MISSED        57      3.3%
EXTERIOR VIOL         40      2.3%
DEAD ANIMAL           45      2.6%
DAMAGE GARB CART     148      8.7%
ABANDON VEHICLE       92      5.4%
```

 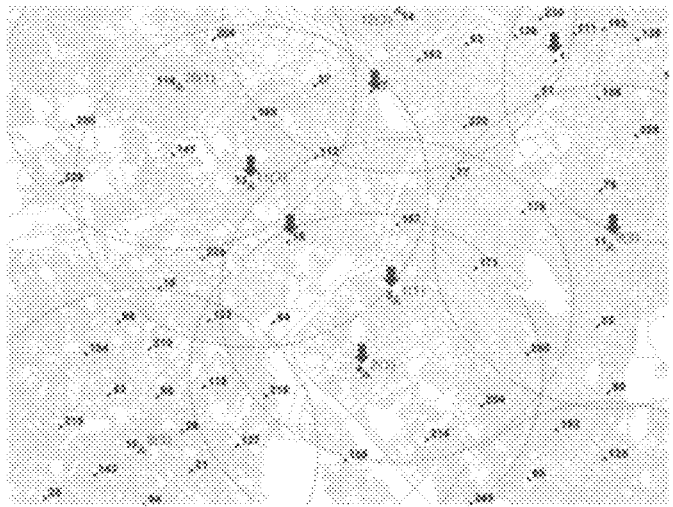
FIG. 32
- Here are some sample move-ups
- Dispatching Unit from Facility # 18
- Dispatching Unit from Facility # 24
- Dispatching Unit from Facility # 9
- Return Unit from Facility # 9
- Return Unit from Facility # 18
- Return Unit from Facility # 18
FIG. 33

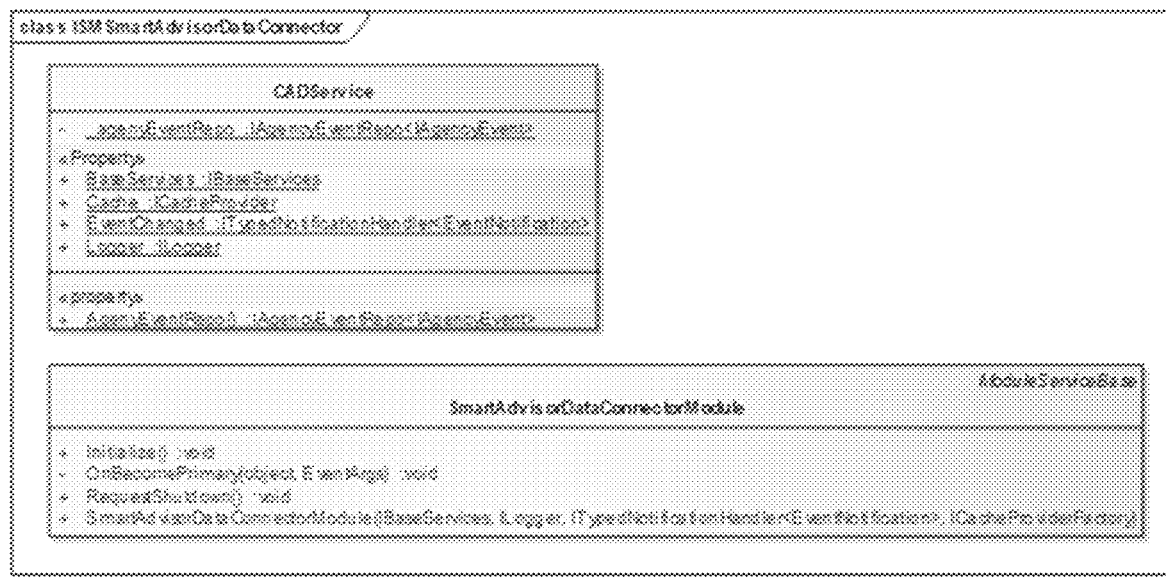
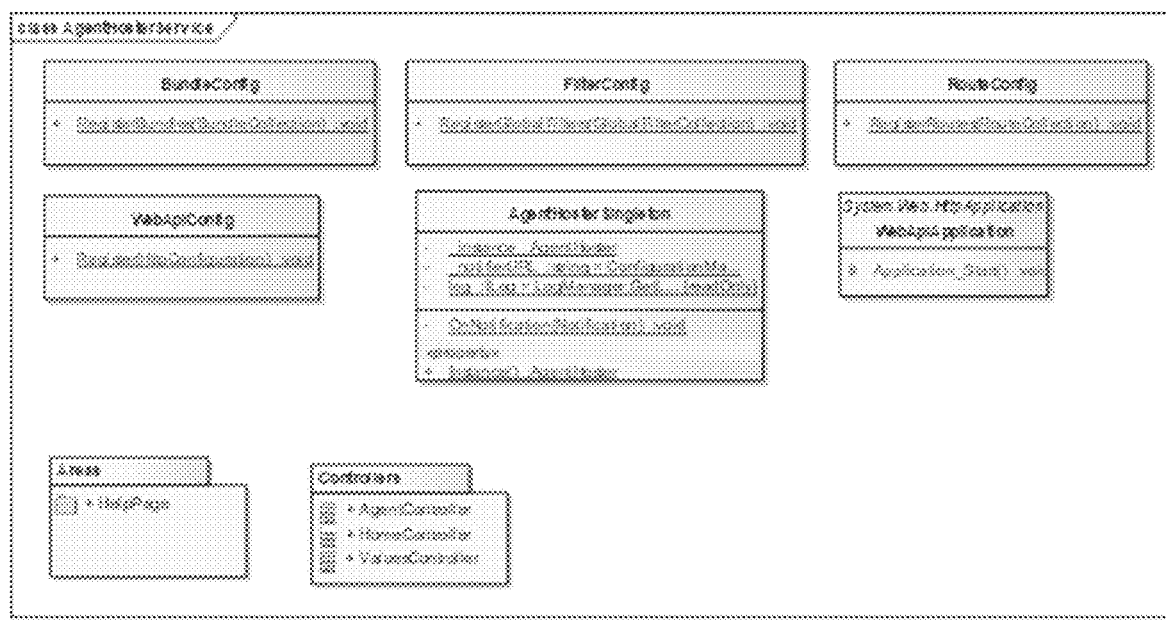
FIG. 42

SIMILARITY AGENT FOR COMPUTER-AIDED DISPATCH SYSTEMS

CROSS-REFERENCE TO RELATED APPLICATION(S)

This patent application is a continuation of, and therefore claims priority from, U.S. patent application Ser. No. 16/436,546 entitled ARTIFICIAL INTELLIGENCE APPLICATIONS FOR COMPUTER-AIDED DISPATCH SYSTEMS filed Jun. 10, 2019, published as United States Patent Application Publication No. US 2019/0378397, which claims the benefit of U.S. Provisional Patent Application No. 62/683,754 entitled Project LAMBDA filed Jun. 12, 2018. Each of these patent applications is hereby incorporated herein by reference in its entirety.

The subject matter of this patent application may be related to the subject matter of commonly-owned U.S. patent application Ser. No. 15/384,874 entitled COMPUTER-AIDED DISPATCH SYSTEMS AND METHOD UTILIZING BIOMETRICS TO ASSESS RESPONDER CONDITION AND SUITABILITY filed Dec. 20, 2016 and published on Jun. 21, 2018 as United States Patent Application Publication No. US 2018/0174430, which is hereby incorporated herein by reference in its entirety.

FIELD OF THE INVENTION

The present invention relates to computer-aided dispatch systems, and more particularly to computer-aided dispatch systems that leverage artificial intelligence to aid in making dispatch decisions.

BACKGROUND OF THE INVENTION

In emergency situations, time is of the essence in dispatching emergency responders. Not only must an emergency responder be able to arrive at an incident quickly, but the right type of emergency responder must be dispatched to deal with the special circumstances of the incident. For example, a hostage situation might require an emergency responder with hostage negotiation skills, while a potential drowning situation might require an emergency responder with water rescue skills.

A computer-aided dispatch (CAD) system is a computer system running specialized software to make, or to assist a dispatcher in making, dispatch decisions for various types of assets such as, for example, personnel (e.g., police officers, firefighters, EMTs and other medical professionals, couriers, field service technicians, etc.), vehicles (e.g., police vehicles, fire trucks, ambulances, med-flight helicopters, boats, livery vehicles, etc.), equipment (e.g., special equipment needed for responding to a particular event or situation, such as "jaws of life" for a car accident), and facilities (e.g., a hospital or other medical care facility that can handle specific types of patients). For convenience, the term "unit" may be used herein to refer to one or more emergency responders and related equipment dispatched to an incident (e.g., a police unit may include a specific police vehicle and one or more police officers who are utilizing that police vehicle).

CAD systems typically gather and store vast amounts of information about the various assets, such as, for example, status, availability, location, capabilities, and usage history. CAD systems typically also gather and store information about each emergency incident, such as, for example, the location and type of emergency, among others. Such information may be gathered and stored automatically (e.g., through any of a variety of computer-based communication systems) and/or by a call-taker who gathers the information and enters it into the CAD system. The CAD system then can assist dispatchers in assigning tasks for the emergency responders, for example, by making a recommendation of which emergency personnel and/or vehicle(s) to assign to a particular emergency incident based upon criteria such as the type of emergency, the proximity of emergency responders to the emergency location, the status of each available emergency responder (e.g., whether or not a particular emergency responder is currently responding to an emergency incident), necessary equipment for the emergency incident (e.g., jaws of life), necessary skills for the emergency incident (e.g. suicide negotiation skills, water rescue skills, etc.), or minimal turns (for long ladder fire trucks), among others.

After responding to an emergency incident, it is often required for a party to be transported to a facility, such as, for example, a hospital or detention center. Therefore, in addition to keeping track of emergency personnel and vehicles, some CAD systems also gather and store information about each of a number of available facilities, such as, for example, the type of facility, the location of the facility, and the services provided by the facility (e.g., general emergency care vs. specialty treatments), among others. The CAD system then can assist dispatchers in assigning an emergency responder to an emergency incident and then to a facility, for example, by making a facility recommendation based on criteria such as the type and severity of care needed by the patient or victim, the capabilities of available facilities, and the proximity of available facilities to the emergency location, among others. For example, a dispatcher typically would prefer to assign an ambulance to the closest hospital, but in some cases the CAD system may recommend a second hospital that is further away (e.g., the closest hospital may only provide general emergency care while the patient within the ambulance may require specialty treatment, such as cardiac care, that is only provided by the second hospital that is further away).

Not only can dispatch decisions be very complex, based on an enormous amount of data collected by the system (e.g., the current disposition and condition of the various personnel, vehicles, equipment, and facilities that are candidates for handling the situation), but also such dispatch decisions generally need to be made quickly. Generally speaking, information from the call is entered into the CAD system using designated graphical user interface screens, and the CAD system can process the entered information along with other information stored in the system to make recommendations to the dispatcher. Such recommendations are generally based on rules specifically programmed by a programmer, e.g., the CAD system may recommend that the nearest ambulance respond to the event and transport the patient to the nearest hospital. In some cases, however, the nearest ambulance may not be the best responder (e.g., the medical personnel are not trained in handling burn victims or the ambulance is not properly equipped to handle burn victims), and the nearest hospital may not be the best facility to treat the patient (e.g., the nearest hospital may be unable to take new incoming patients or may not have appropriate personnel available to treat burn victims). Furthermore, CAD systems must be able to deal with very complex sequences of related or unrelated events, such as, for example, a string of burglaries that occur over a number of days. Again, the CAD system can employ rule-based logic to provide recommendations to the dispatcher.

SUMMARY OF VARIOUS EMBODIMENTS

In accordance with one embodiment of the invention, a computer-aided dispatch (CAD) system comprises a CAD database storing CAD data and at least one server comprising a tangible, non-transitory computer readable medium having stored thereon an agent hoster subsystem and a notification subsystem. The agent hoster subsystem is configured to communicate with a plurality of Intelligent Agents, where each Intelligent Agent is configured to perform a distinct dispatch-related analysis of the CAD data and to produce dispatch-related notifications based on such analysis autonomously without being queried by the user. The notification subsystem is configured to determine, based at least in part on feedback received from a user, whether to present a given notification from a given Intelligent Agent to the user.

In various alternative embodiments, the Intelligent Agents may include a statistic agent configured to detect outliers in the CAD data and to produce a notification when an outlier is detected. The statistic agent may include a machine learning outlier detector trained to detect outliers in the CAD data.

Additionally or alternatively, the Intelligent Agents may include a keyword agent that produces a notification when at least one specified keyword is detected in an event.

Additionally or alternatively, the Intelligent Agents may include a pattern agent configured to detect patterns in the CAD data and to produce a notification when a pattern is detected in an event.

Additionally or alternatively, the Intelligent Agents may include an event match agent configured to detect similar events based on a fuzzy logic analysis and to produce a notification when similar events are detected based on the fuzzy logic analysis. The may include a machine learning pattern detector trained to detect patterns in the CAD data.

Additionally or alternatively, the Intelligent Agents may include a repeated event agent configured to detect recurrent events and to produce a notification when a recurrent event is detected.

Additionally or alternatively, the Intelligent Agents may include a correlation agent that produces a notification when a combination of variables is determined to contribute to the occurrence of an event. The correlation agent may include a machine learning correlation detector trained to detect correlations in the CAD data.

Additionally or alternatively, the Intelligent Agents may include a similarity agent configured to detect similar events based on word frequency and to produce a notification when similar events are detected based on word frequency.

Additionally or alternatively, the Intelligent Agents may include a rule agent that produces a notification when operational variables match a preconfigured rule.

In any of the above embodiments, the notifications presented to the user may provide a mechanism for the user to provide feedback regarding the notification. The system may allow notifications to be shared between users and/or with non-users. The system may attach a notification to a related event. Intelligent agents may be implemented by the at least one server (e.g., on-site) and/or may be implemented remotely from the at least one server (e.g., by a cloud-based machine learning service).

In any of the above embodiments, the agent hoster subsystem, one or more Intelligent Agents, and/or the notification subsystem may be embodied as a computer program in a computer program product comprising a tangible, non-transitory computer readable medium.

Embodiments described and claimed herein have the effect of transforming CAD systems, which may be reactive or may require users to sift through vast amount of data, into a virtual dispatch assist system with Intelligent Agents that can leverage artificial intelligence and machine learning to proactively analyze CAD data and generate useful notifications to assist a dispatcher or automate dispatch operations. For at least these reasons, the activities described and claimed herein provide a technological solution (e.g., leveraging artificial intelligence and machine learning) to a problem that arises squarely in the realm of technology (e.g., computer-aided dispatch systems) in a manner that is not well-understood, routine, or conventional to a skilled artisan in the field of the present invention.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 3 is a schematic diagram showing a data model of the virtual dispatch assist system with Intelligent Agents of FIG. 2, in accordance with certain exemplary embodiments.

FIG. 8 shows a notification history listing in accordance with certain exemplary embodiments.

FIG. 16 shows a fuzzy logic function for determining whether or not a notification is shown to the user, in accordance with one exemplary embodiment.

FIG. 18 shows an example baseline of variables.

FIG. 19 shows an example of an outlier notification with statistics.

FIG. 32 shows an example location redundancy detail screen, in accordance with one exemplary embodiment.

FIG. 33 shows an example of area coverage relocation, in accordance with one exemplary embodiment.

FIGS. 41-51 show class models for the SmartAdvisor and various Intelligent Agents, in accordance with one exemplary embodiment.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions

Figure 1:
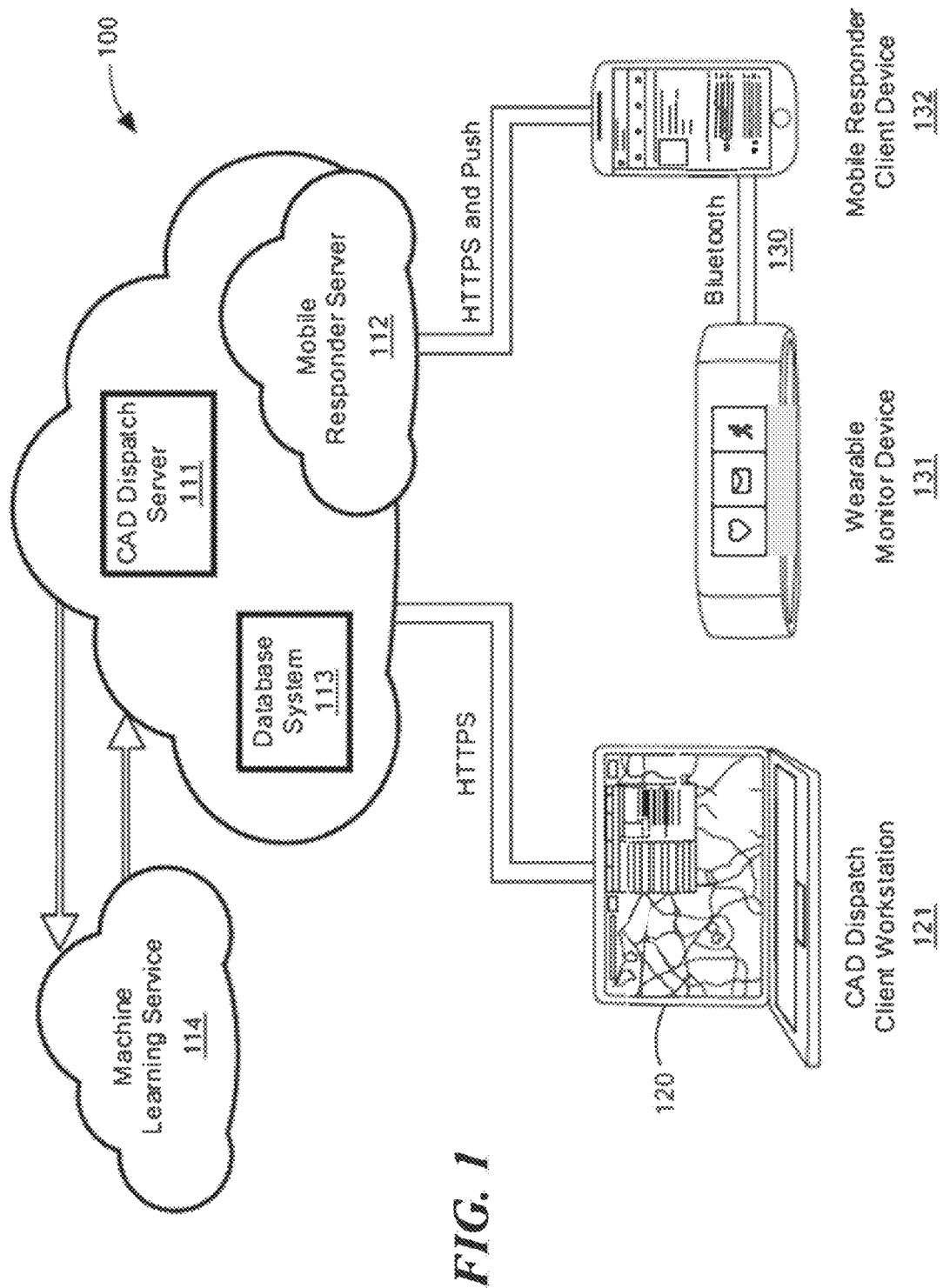
FIG. 1 is a simplified schematic diagram of a computer-aided dispatch (CAD) system, in accordance with certain exemplary embodiments.

As used in this description and the accompanying claims, the following terms shall have the meanings indicated, unless the context otherwise requires.

Generally speaking, rule-based logic is a computer program in which decision logic is specifically programmed by a programmer to produce a particular output based on particular types of inputs. For a simple example of rule-based logic, the CAD system might include a rule that the nearest available responder should respond to an event.

Generally speaking, machine learning (ML) is the application of Artificial Intelligence (AI) to provide software systems the ability to learn and improve themselves, from experience, without being explicitly programmed. Instead, the programmer models the problem to be solved rather than programming the solution itself, and the ML model is trained to perform a given task based on sample data (referred to as "training data") in order to learn how to produce a particular type output based on particular types of inputs. Thus, machine learning is useful for hard-to-solve problems that may have many viable solutions. ML solutions can exhibit non-expected behavior due to the artificial intelligence and can improve over time based on additional training data accumulated over time. A computer program employing machine learning may be referred to herein as a Intelligent Agent.

INTRODUCTION

In this day and age, artificial intelligence (AI) and machine learning (ML) are being used ever more frequently across a wide range of technologies and applications. WIKIPEDIA™ provides a list of exemplary applications for machine learning, including agriculture, anatomy, adaptive websites, affective computing, banking, bioinformatics, brain-machine interfaces, cheminformatics, computer networks, computer vision, credit-card fraud detection, data quality, DNA sequence classification, economics, financial market analysis, general game playing, handwriting recognition, information retrieval, insurance, internet fraud detection, linguistics, machine learning control, machine perception, machine translation, marketing, medical diagnosis, natural language processing, natural language understanding, online advertising, optimization, recommender systems, robot locomotion, search engines, sentiment analysis, sequence mining, software engineering, speech recognition, structural health monitoring, syntactic pattern recognition, telecommunication, theorem proving, time series forecasting, and user behavior analytics. It is recognized that ML programs often fail to deliver expected results, e.g., due to lack of suitable data, data bias, and poorly chosen tasks and algorithms, among other things.

The inventors of the present invention contemplate the use of AI and ML in Computer-Aided Dispatch (CAD) systems for providing real-time, embedded analytics that can be used by a dispatcher or by the CAD system itself (e.g., autonomously) to make dispatch decisions. One significant difficulty in applying AI and ML to CAD systems is in converting the theoretical advantages of AI/ML into a concrete implementation that provides insightful and practical outputs for making dispatch decisions and utilizes dispatcher feedback on an ongoing basis to improve learning and future outputs. Also, because dispatch decisions generally involve a wide range of potential event types involving complex interrelations between collected data types (e.g., data regarding events, event outcomes, personnel, vehicles, equipment, facilities, etc.), the AI/ML, implementation needs to be flexible to allow for incorporation of new types of data sources and new types of outputs that can be used for dispatch decisions. Thus, the present invention does not merely amount to "apply AWL to CAD systems" but instead provides specific ways in which AI/ML can be used in CAD systems to improve dispatch decisions.

FIG. 1 is a simplified schematic diagram of a computer-aided dispatch (CAD) system 100, in accordance with certain exemplary embodiments. Among other things, components of the CAD system 100 can be logically divided into a number of subsystems including a CAD server subsystem 110, a dispatcher subsystem 120, and an optional personnel subsystem 130. Embodiments of the exemplary CAD system 100 can (and typically do) have multiple instances of each subsystem. For example, an exemplary CAD system 100 can include one personnel subsystem 130 for each emergency responder, multiple dispatcher subsystems 120 to allow for multiple emergency dispatchers to handle emergency calls and alerts within a single dispatch center and/or across multiple dispatch centers, and multiple CAD server subsystems 110 at one or more data centers to provide for such things as high-availability service and load balancing.

The CAD server subsystem 110 includes a CAD dispatch server 111 that interfaces with one or more dispatcher subsystems 120 over a first communication network, a mobile responder server 112 that interfaces with one or more personnel subsystems 130 over a second communication network, a database system 113 in which various types of data are maintained by the CAD dispatch server 111 and/or the mobile responder service 112, and optionally a machine learning service 114 (which may be part of the CAD dispatch server 111 or may be separate from the CAD dispatch server 111) that utilizes machine learning to track data over time. As discussed in U.S. patent application Ser. No. 15/384,874, which was incorporated by reference above, the optional machine learning service 114 can be queried (e.g., by the CAD dispatch server 111) for analytical data. The machine learning service 114 can be implemented on-site with the CAD dispatch server subsystems 110 or can be implemented remotely, e.g., cloud-based.

The dispatcher subsystem 120 includes a CAD dispatch client workstation 121 that the emergency dispatcher uses to manage dispatch-related information. For example, among other things, the dispatcher may use the CAD dispatch client workstation 121 to enter information regarding incidents and emergency responders, view the status of incidents and responders, dispatch emergency responders, and interact with emergency responders such as by providing updated incident information.

As discussed in U.S. patent application Ser. No. 15/384, 874, which was incorporated by reference above, the optional personnel subsystem 130 includes a monitor device 131 that is wearable by the emergency responder (e.g., a bracelet-type device) and a mobile responder client device 132 (e.g., a smartphone-type device running a specially-configured mobile responder client application). The wearable monitor device 131 is in communication with (e.g., "paired" with) the mobile responder client device 132 over a wireless communication system (e.g., Bluetooth or WiFi). The mobile responder client device 132 is in communication with the CAD server subsystem 110 over the second communication network, which may include a wireless communication system such as cellular telephone/data network.

The mobile responder client device 132 is specially configured (e.g., using special hardware and/or a purpose-built client application) to transfer various types of information between the wearable monitor device 131 and the CAD server subsystem 110, although certain types of information can be exchanged between the mobile responder client device 132 and the CAD server subsystem 110 exclusive of the wearable monitor device 131. Among other things, as discussed in greater detail below, the mobile responder client device 132 may transfer information from the wearable monitor device 131 and/or the mobile responder client device 132 itself to the CAD server subsystem 110, e.g., to allow for monitoring the emergency responder, and also can receive information from the CAD server subsystem 110 for presentation to the emergency responder on the mobile responder client device 132 and/or the wearable monitor device 131 via transfer from the mobile responder client device 132. The mobile responder client device 132 may provide a special graphical user interface through which the emergency responder can send and/or receive various types of information.

In accordance with certain exemplary embodiments, the wearable monitor device 131 includes one or more interface devices to collect status information about the emergency responder (referred to herein for convenience as "biometric" information). For example, the wearable monitor device 131 may include one or more of a heart-rate sensor, a skin temperature sensor, a galvanic skin response sensor, a blood oxygen level sensor, and/or other sensor for collecting biometric information. The wearable monitor device 131 transmits information derived from the interface devices to the mobile responder client device 132, which may be configured to process the information and/or transmit the information to the CAD server subsystem 110 for processing.

The wearable monitor device 131 and/or the mobile responder client device 132 may include other types of interface devices, such as, for example, a microphone (e.g., to allow the emergency responder to speak to an emergency dispatcher or to monitor for gunshots or other sounds), a speaker (e.g., to allow an emergency dispatcher to speak to the emergency responder or to generate audible alerts to the emergency responder by the CAD server subsystem 110 or the emergency dispatcher), a camera (e.g., to allow the emergency responder to record pictures or videos for evidentiary purposes and/or to send to the CAD server subsystem 110 or emergency dispatcher), a tactile output device such as a vibrator device (e.g., to generate tactile alerts to the emergency responder by the CAD server subsystem 110 or the emergency dispatcher), a "unit emergency alarm" input (e.g., a button to allow the emergency responder to generate an alarm to the CAD server subsystem 110 or emergency dispatcher), a motion sensor such as an accelerometer or gyroscope (e.g., to monitor whether the emergency responder is moving or stationary), a position sensor (e.g., to monitor whether the emergency responder is upright or recumbent), a temperature sensor (e.g., to monitor the environmental temperature in which the emergency responder is operating), and/or a location sensor such as a GPS sensor (e.g., to provide location information to the emergency dispatcher), among others. Information derived from such interface devices may be processed by the mobile responder client device 132 and/or sent to the CAD server subsystem 110 for processing.

Thus, for example, the first responder may be monitored through information obtained exclusively from the wearable monitor device 131 or may be monitored through a combination of information obtained from the wearable monitor device 131 and information obtained from the mobile responder client device 132.

The mobile responder client device 131 may send information to the CAD server subsystem 110 at regular intervals (e.g., via a Web Service API) or upon request from either the responder or the dispatcher. Each paired wearable monitor device 132 and mobile responder client device 131 is uniquely identifiable to the CAD server subsystem 110 and security is preferably implemented to prevent data breaches, e.g., using HTTPS-based communications between the mobile responder client device 131 and the CAD server subsystem 110.

The CAD server subsystem 110 maintains various types of information in the database system 113. For example, among other things, the CAD server subsystem 110 maintains information on the various incident types that may occur, information on each incident that does occur, and information on each emergency responder.

Exemplary embodiments of the present invention provide a virtual dispatch assist system (sometimes referred to herein as the "SmartAdvisor") in which various types of Intelligent Agents (sometimes referred to herein as "SmartAdvisor Agents") are deployed, e.g., as part of a new CAD system architecture or as add-ons to existing CAD systems, to analyze vast amounts of historic operational data in the database system 113 and provide various types of dispatch assist notifications and recommendations that can be used by a dispatcher or by the CAD system itself (e.g., autonomously) to make dispatch decisions. The inventors envision that the virtual dispatch assist system and related Intelligent Agents employing machine learning, artificial intelligence, and real-time analytics will provide a marked improvement and key market differentiator over more traditional CAD systems and will be a springboard to more advanced features such as cloud-enabled features and real-time (and even proactive/predictive) crime centers and "safe cities" applications. In exemplary embodiments, the Intelligent Agents run autonomously in the CAD server subsystem 110 and/or in the optional machine learning service 114, with each Intelligent Agent configured to perform a distinct dispatch-related analysis of data in the CAD database and to produce dispatch-related notifications based on such analysis autonomously and proactively without being queried by the user. In an exemplary embodiment, the notifications are processed by an optional machine-learning filter on a per-user basis so that only notifications that are relevant to a particular user are presented to the user, although alternative embodiments may provide some or all of the notifications from the Intelligent Agents to the users in an unfiltered manner. The Intelligent Agents and optional notifications filter therefore provide inputs to the dispatch decision-making process in a manner that the inventors believe has not been available in CAD systems to date.

Figure 2:
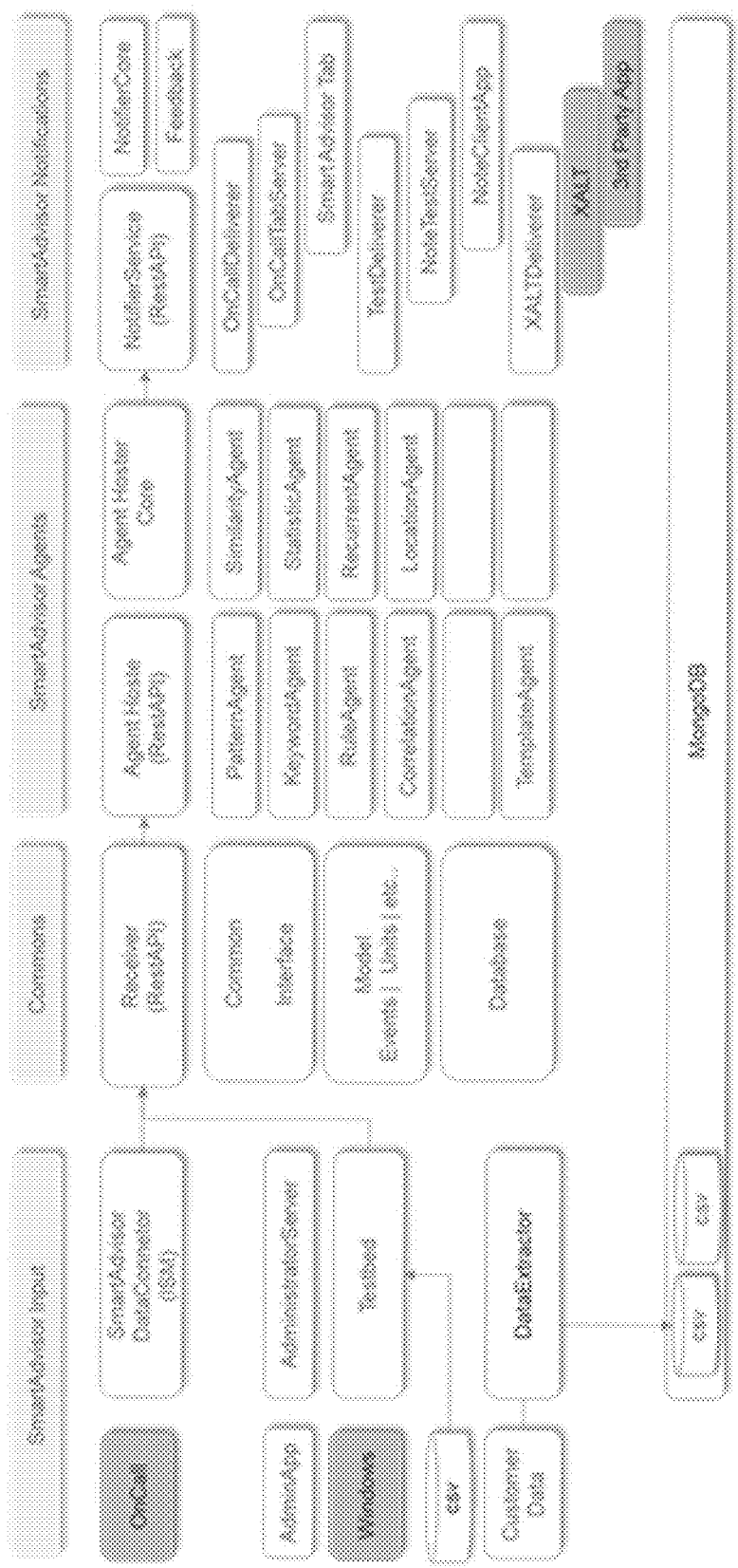
FIG. 2 is a schematic diagram showing a functional model of a virtual dispatch assist system with Intelligent Agents, in accordance with certain exemplary embodiments.

FIG. 2 is a schematic diagram showing a functional model of a virtual dispatch assist system with Intelligent Agents and optional notification filter, in accordance with certain exemplary embodiments. Among other things, the virtual dispatch assist system includes four main sub-systems, namely a SmartAdvisor Input sub-system, a SmartAdvisor Commons sub-system, a SmartAdvisor Agents sub-system, and a SmartAdvisor Notifications sub-system.

The SmartAdvisor Input subsystem accepts inputs from one or more OnCall systems (e.g., 911 and/or various call-in and online input systems), a Desktop system (e.g., from dispatchers), an Administrator system, and a Test Data system (e.g., data used for training the Intelligent Agents).

The SmartAdvisor Commons sub-system includes software and hardware components that allow Intelligent Agents to be used within the system, including a receiver (REST) API allowing the Intelligent Agents to operate within the system and have access to CAD data and other tools.

The SmartAdvisor Agents sub-system includes an agent hosting module ("AgentHoster") that communicates with various Intelligent Agents, with each Intelligent Agent configured or trained to produce notifications based on a specific type of analysis of the historic operational data (e.g., one Intelligent Agent might detect patterns across events, another Intelligent Agent might detect similarities between events, etc.). The virtual dispatch assist system can support virtually any type of Intelligent Agent and provides for Intelligent Agents to be added to and removed from the system in virtually any desired combination of Intelligent Agents. Intelligent Agents can be implemented on-site with the CAD dispatch server subsystems 110 and/or can be implemented remotely, e.g., by a cloud-based machine learning service. Thus, the AgentHoster may be configured to host on-site agents and interface with remote or cloud-based agents, e.g., passing events and other CAD data to the agents and receiving notifications and other data back from the agents. FIG. 2 shows some possible types of Intelligent Agents that can be included in the virtual dispatch assist system, including a Statistic Agent, a Rule Agent, a Pattern Agent, a Keyword Agent, an Event Match Agent, a Correlation Agent, a Recurrent (Repeated Event) Agent, a Location Agent, a Template Agent, and a Similarity Agent; these and some other possible types of Intelligent Agents are described in more detail below.

The SmartAdvisor Notifications sub-system includes modules for deciding which types of events to present to a dispatcher and for handling feedback from the dispatcher in response to notifications, e.g., adjusting the types of future events that are presented to the dispatcher or providing the feedback for re-training one or more Intelligent Agents in order to improve functionality of the Intelligent Agent. All of these subsystems have access to the database system 113 (referred to here as the "SmartAdvisor Database" and depicted as being accessible to the four SmartAdvisor sub-systems) for accessing historic operational data and storing new data. With reference to the components shown in FIG. 1, the components of the virtual dispatch assist system shown in FIG. 2 may be implemented as part of the CAD Dispatch Server 111 or distributed between the CAD Dispatch Server 111 and the Machine Learning Service 114 (e.g., some of the Intelligent Agents could be implemented in the Machine Learning Service 114). Thus, Intelligent Agents may be cloud-based and/or integrated/on-premises.

Figure 39:
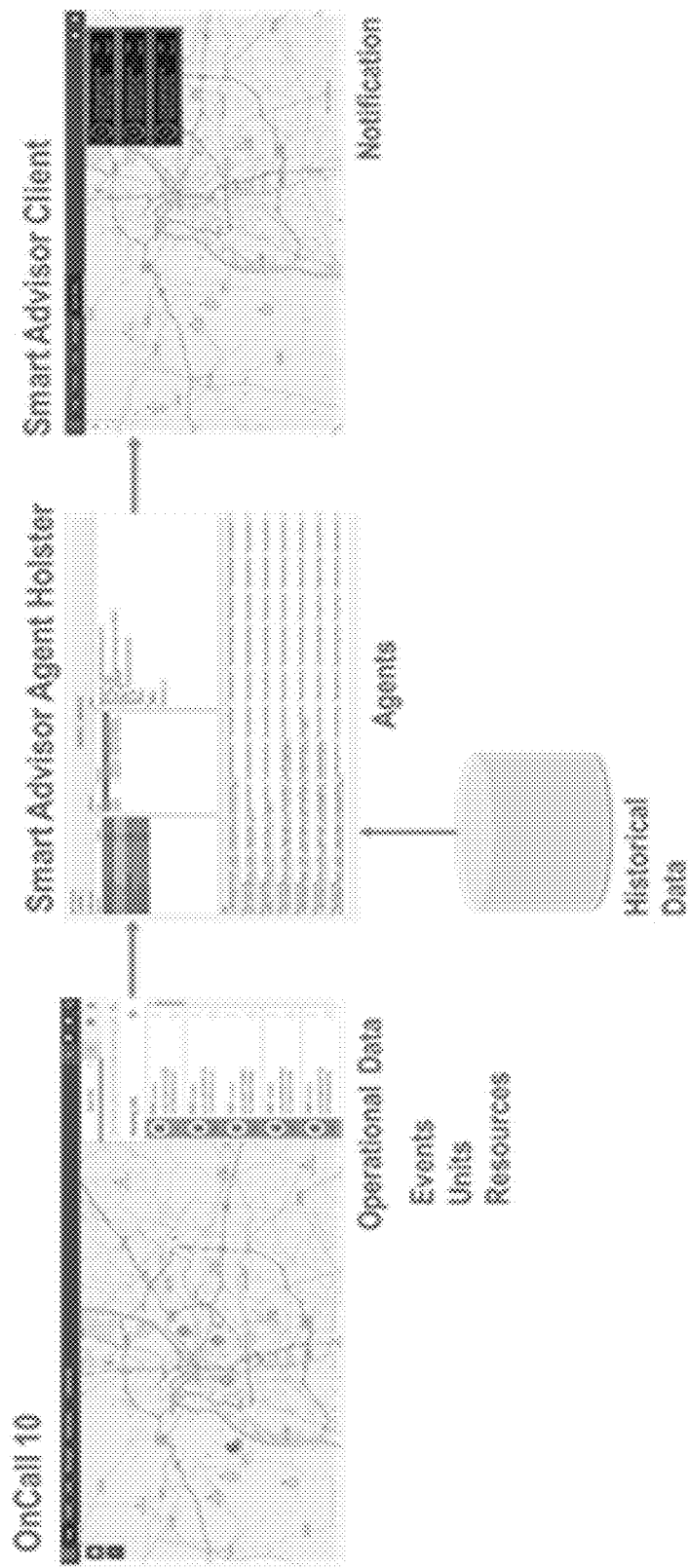
FIG. 39 is a schematic diagram showing the relationship between the CAD dispatch server (referred to here as OnCall 10), the SmartAdvisor AgentHoster, and the CAD Dispatch Client Workstation, in accordance with one exemplary embodiment.
Figure 40:
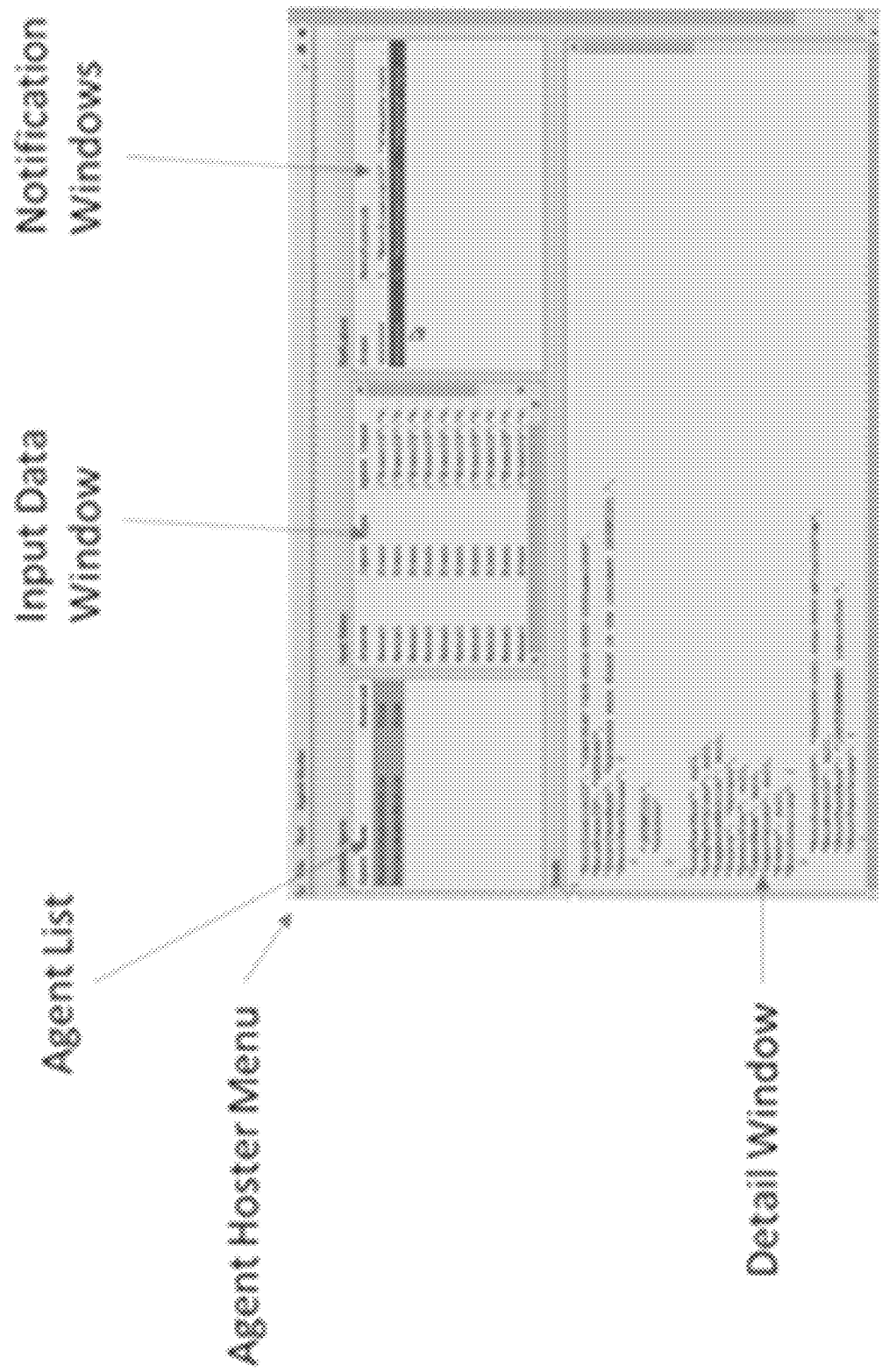
FIG. 40 shows a SmartAdvisor AgentHoster graphical user interface screen, in accordance with one exemplary embodiment.
Figure 41:
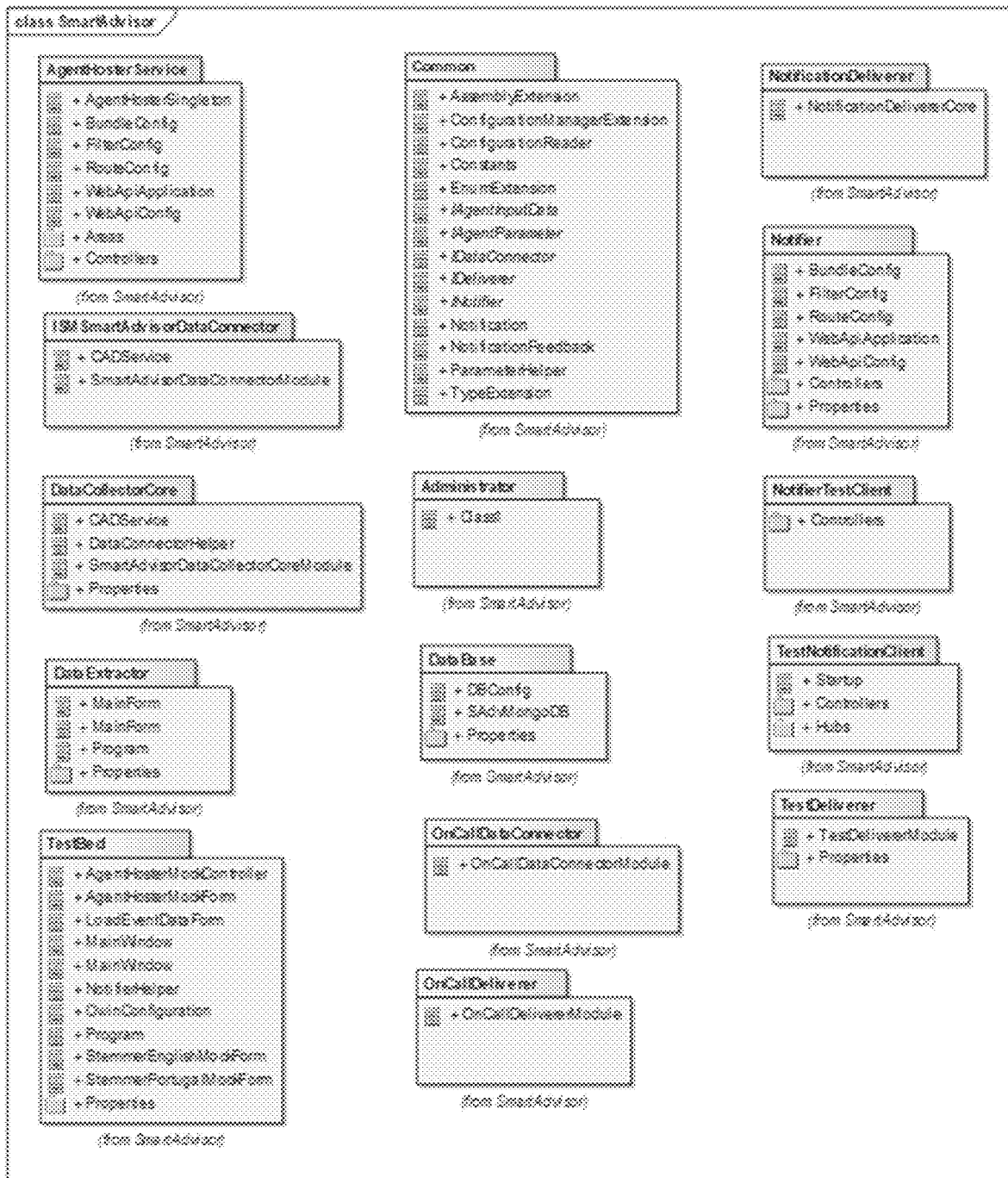
Figure 43:
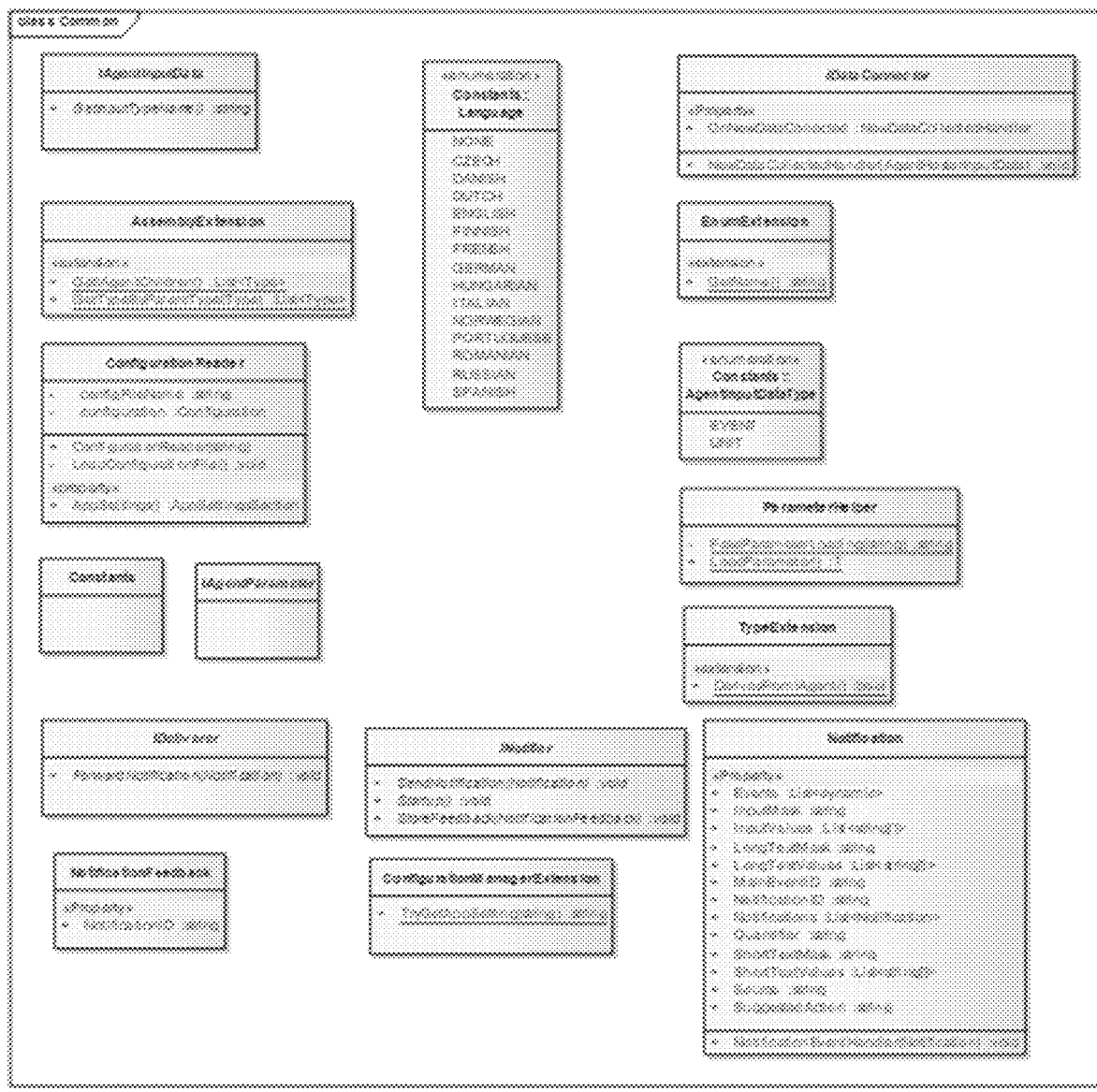
Figure 44:
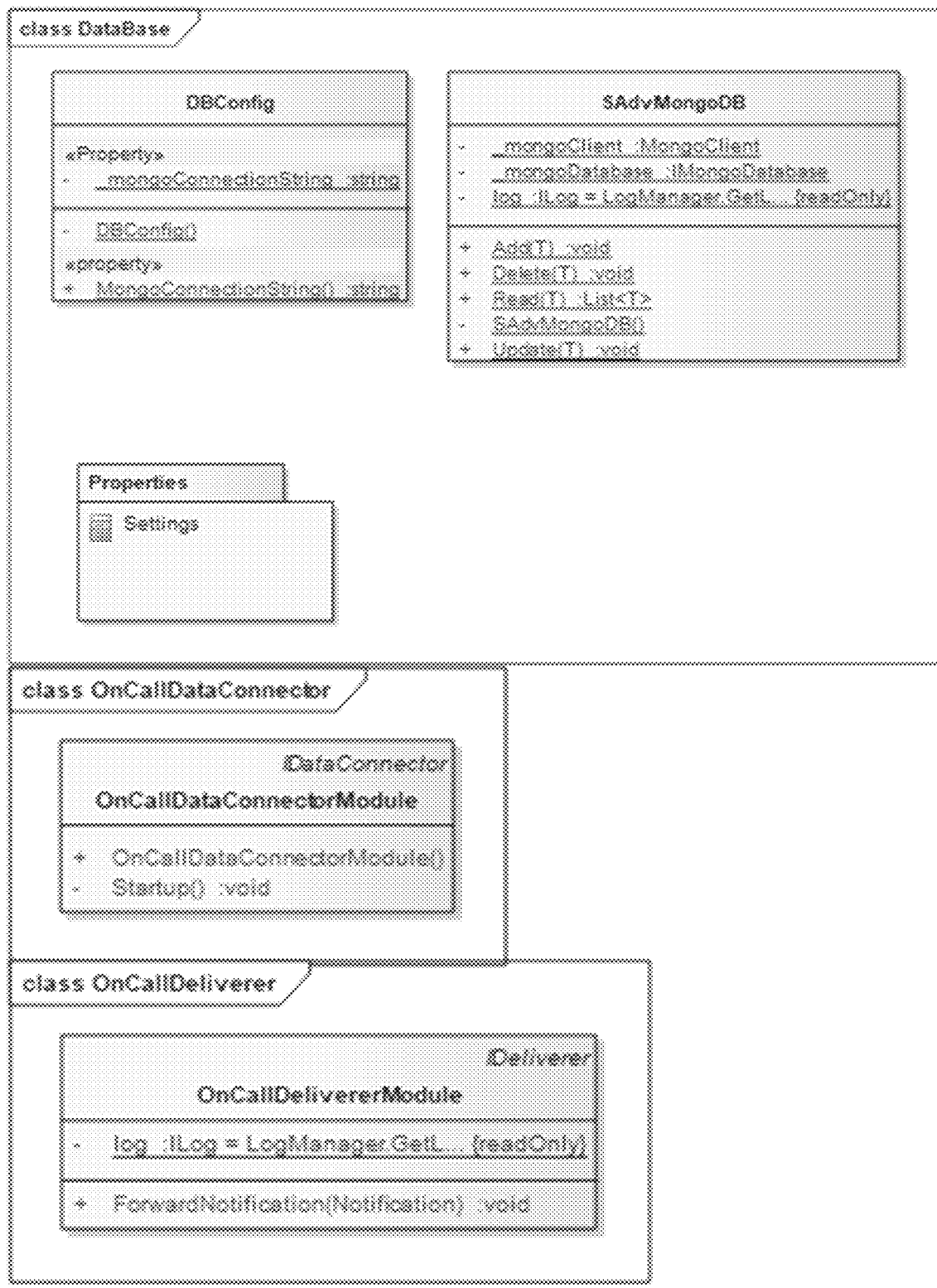
Figure 45:
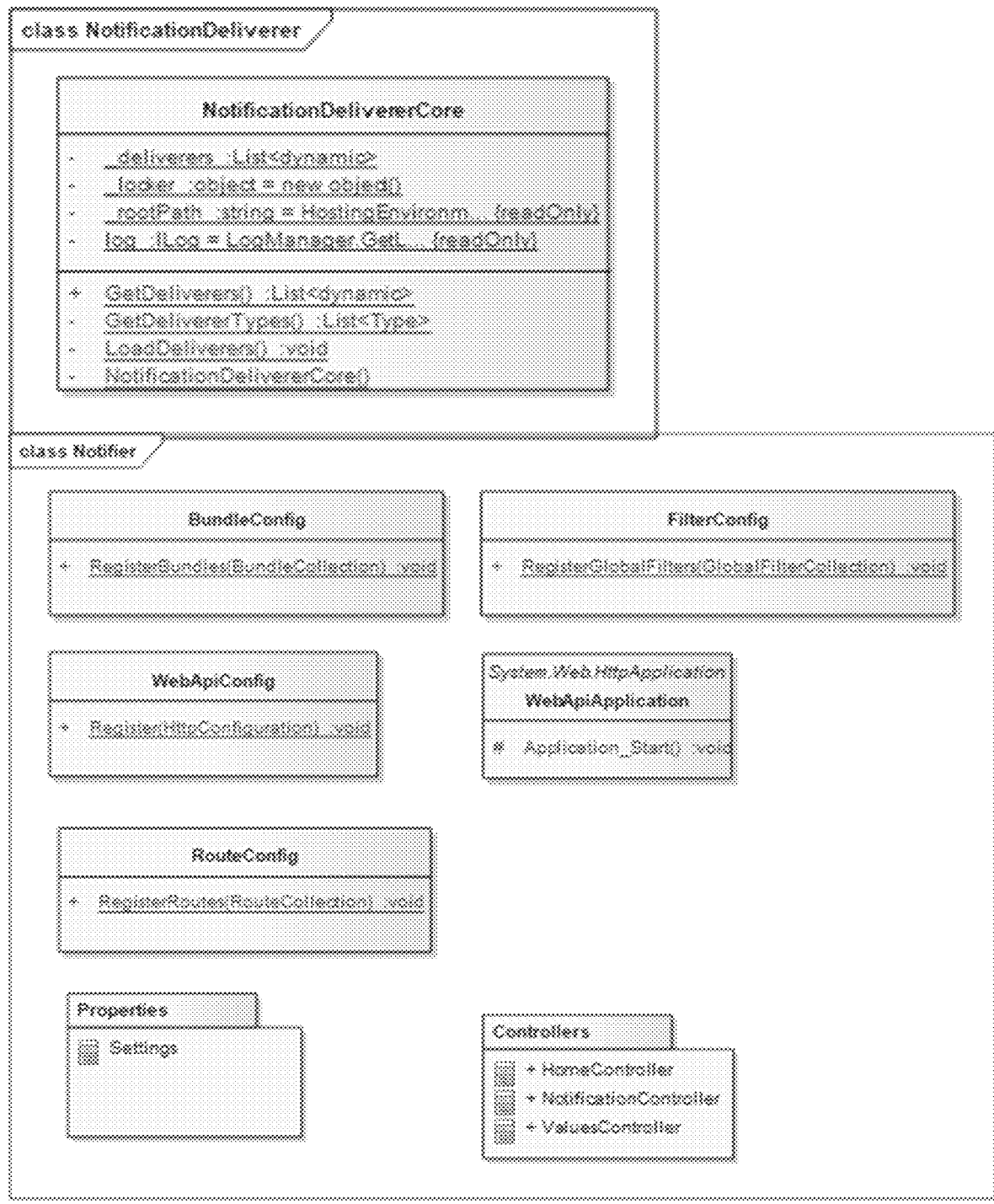
Figure 46:
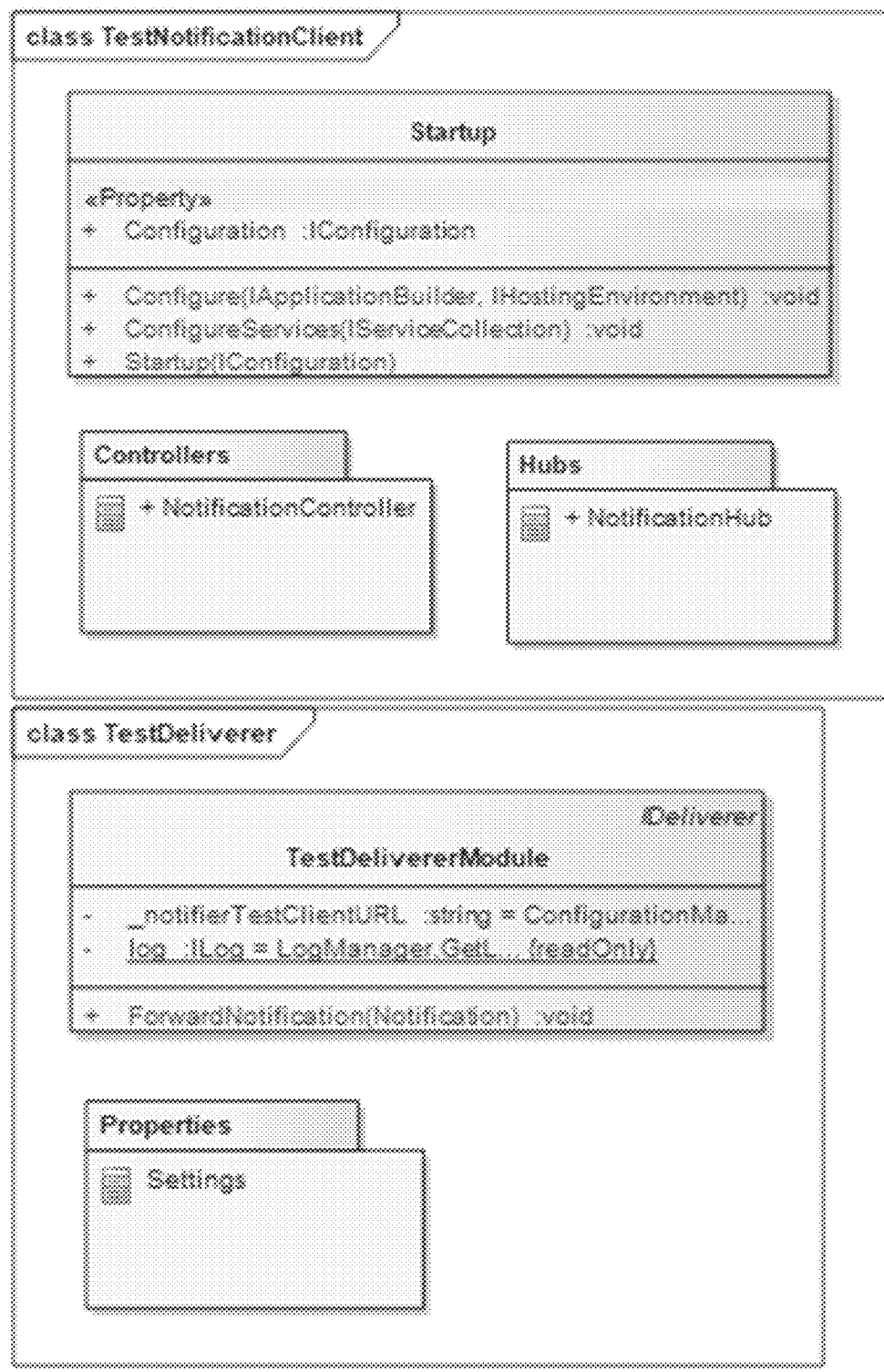
Figure 47:
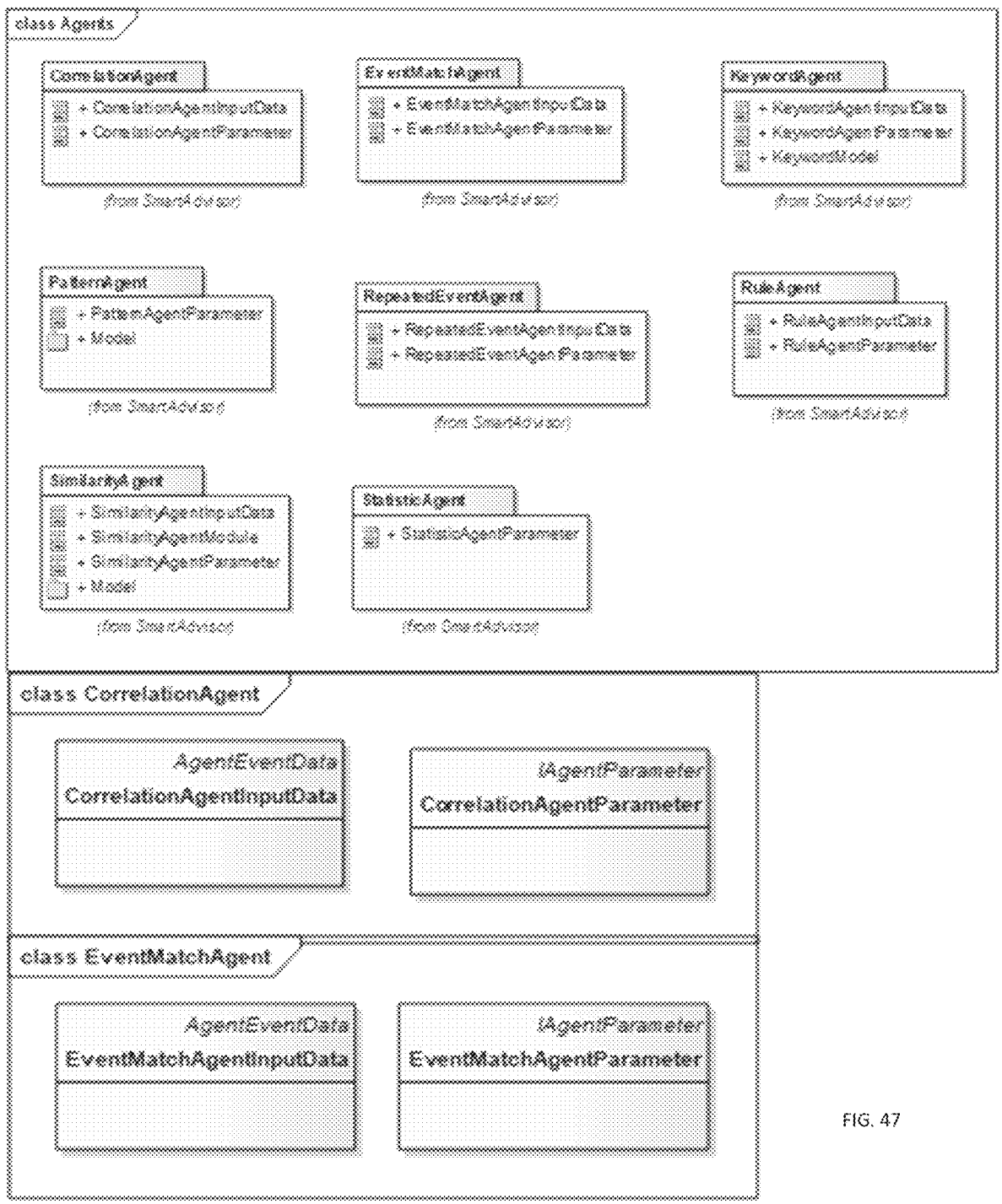
Figure 48:
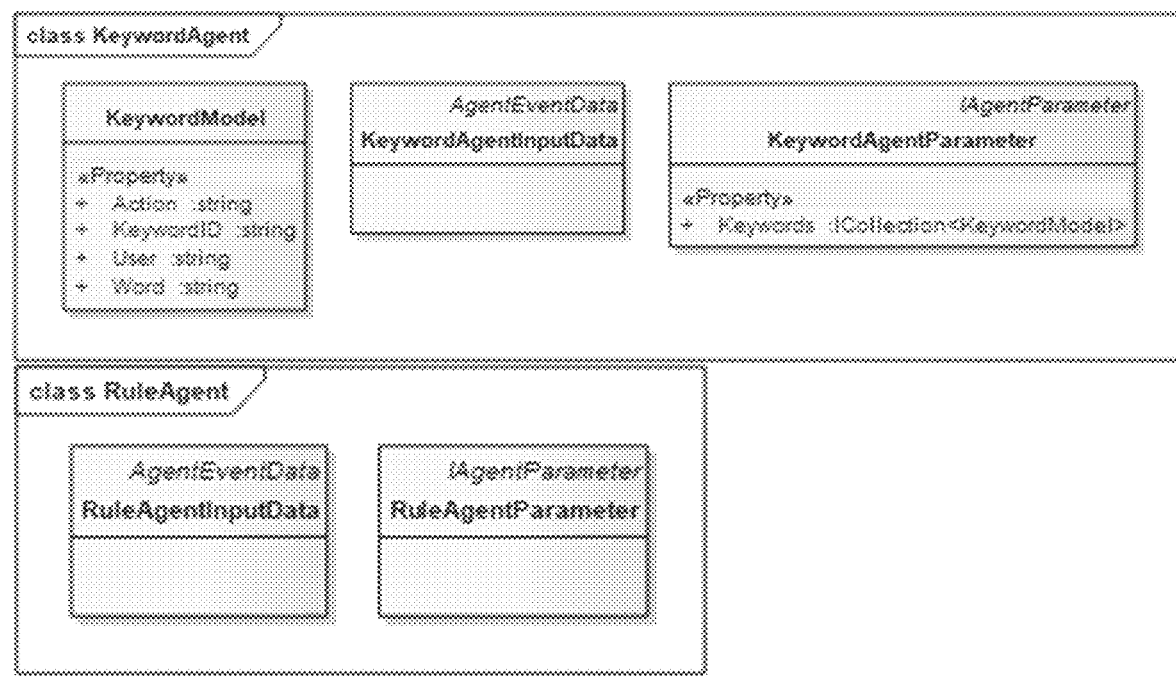
Figure 49:
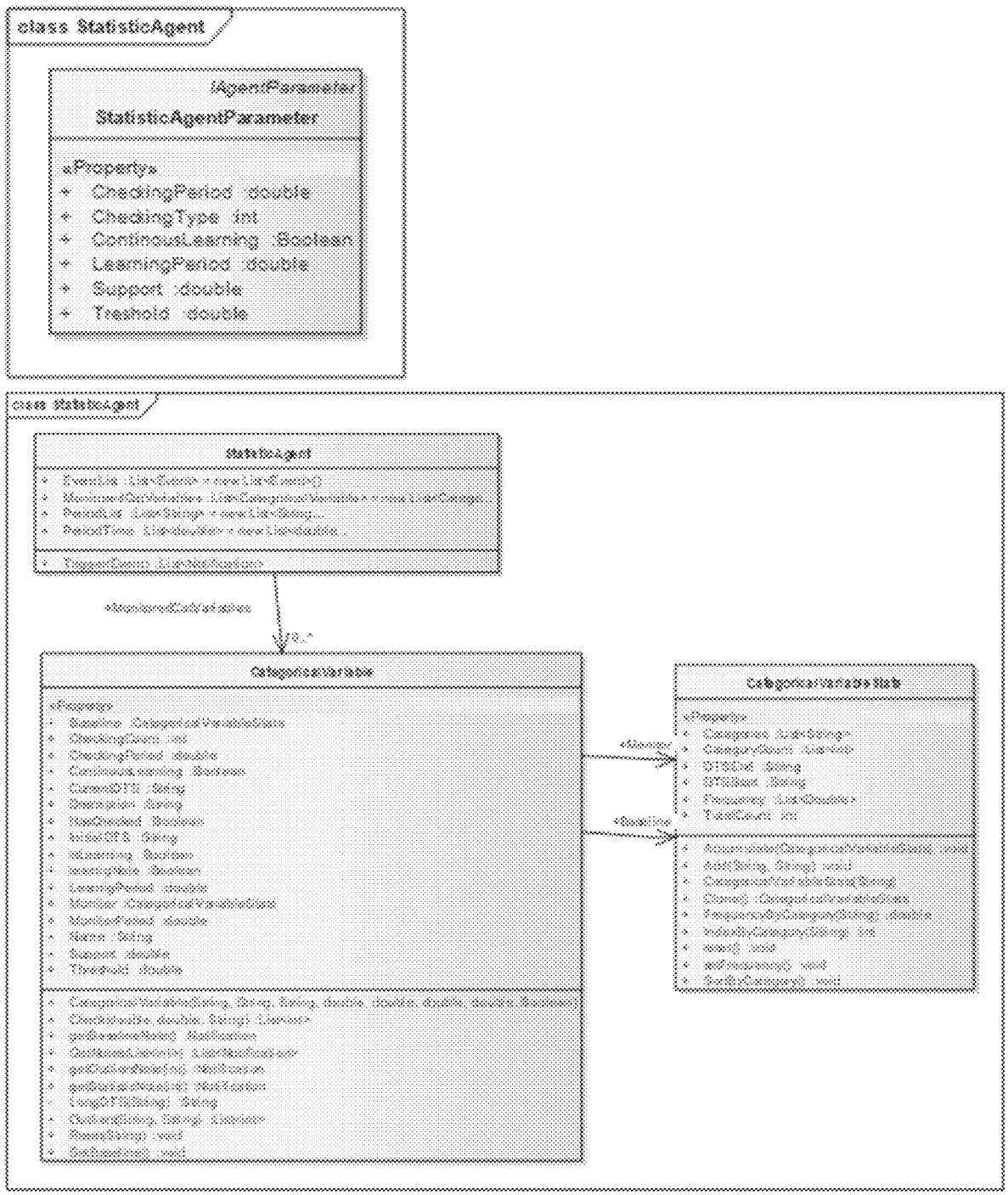
Figure 50:
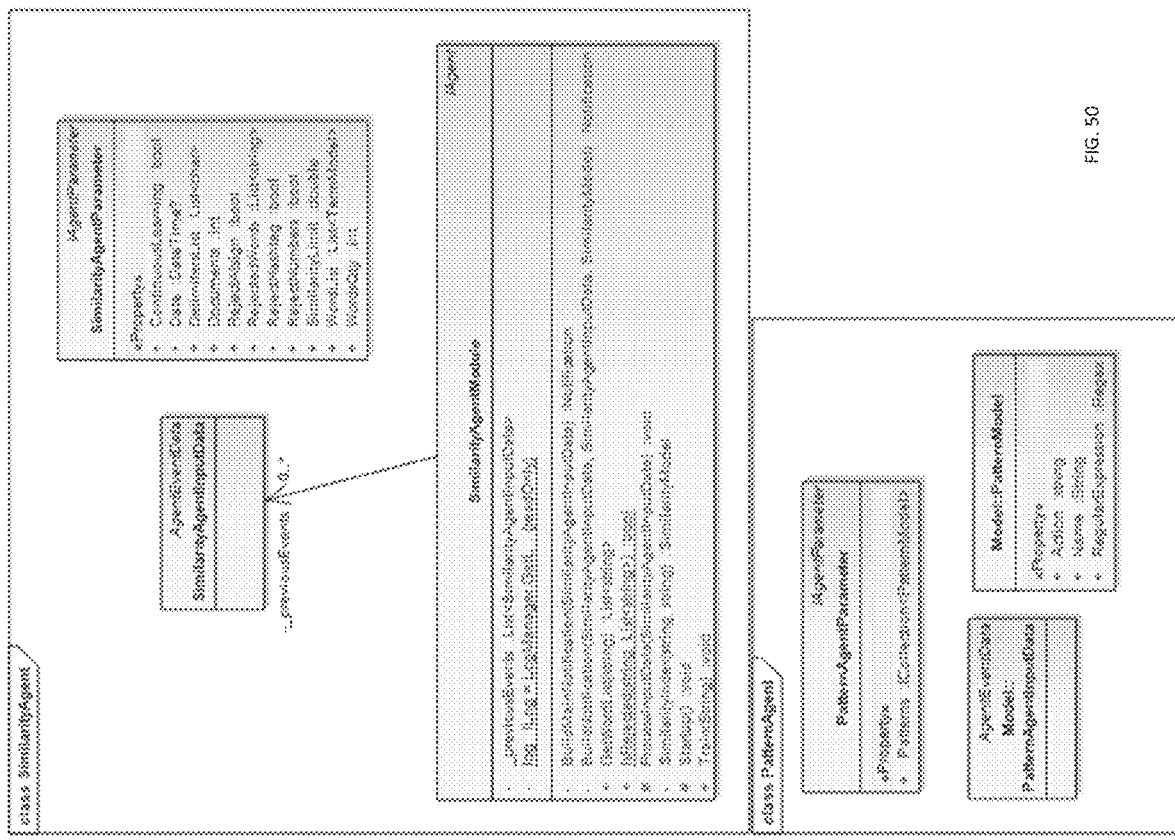
Figure 51:
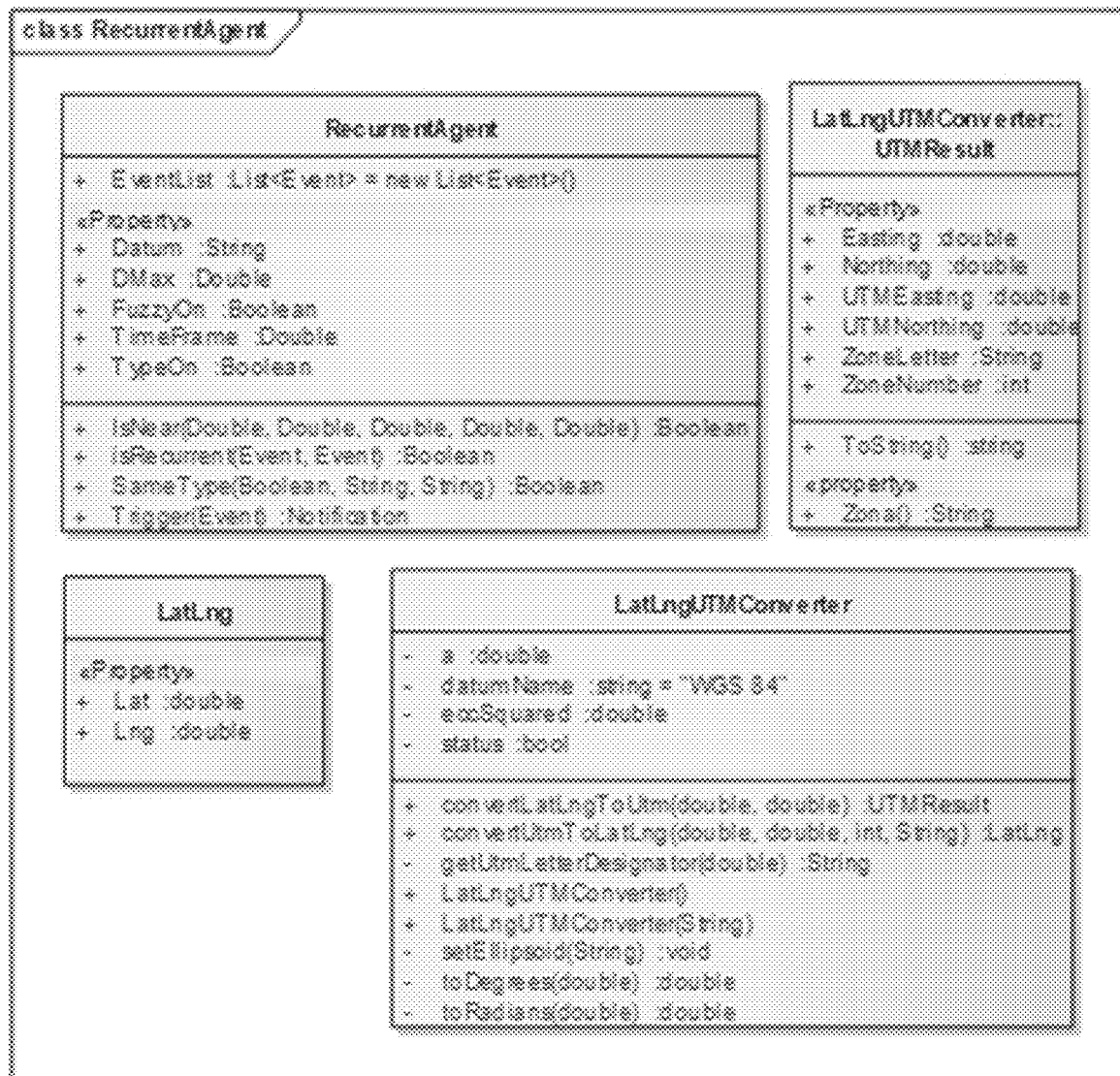

Generally speaking, each Intelligent Agent has special "skills" and operates proactively to constantly analyze operational and other data to provide notifications of specific environmental events. In an exemplary embodiment, CAD data is transferred via the REST API to the AgentHoster, which stores the data for historical purposes and for the Intelligent Agents to have access to the CAD data. The AgentHoster provides notifications from the Intelligent Agents to the SmartAdvisor Notifications subsystem for possible display on a dispatcher client device. In turn, the dispatcher can provide feedback (e.g., the usefulness or value of a particular notification) from which the virtual dispatch assist system can learn the dispatcher's notification preferences and improve its own performance for generating future notifications. FIG. 39 is a schematic diagram showing the relationship between the CAD dispatch server (referred to here as OnCall 10), the SmartAdvisor AgentHoster, and the CAD Dispatch Client Workstation, in accordance with one exemplary embodiment. FIG. 40 shows a SmartAdvisor AgentHoster graphical user interface screen, in accordance with one exemplary embodiment. Here, the user can view available agents, input history, notifications, and other details of the operation of the Intelligent Agents.

FIG. 3 is a schematic diagram showing a data model of the virtual dispatch assist system with Intelligent Agents of FIG. 2, in accordance with certain exemplary embodiments. Here, the Intelligent Agents utilize local operational data as well as other data such as pre-defined customer preferences, behaviors, and goals to generate notifications and recommendations which can be filtered through a set of rules (which themselves may be machine-learned) to determine which notifications and recommendations ultimately are presented to the dispatcher.

The following is a sample event data structure used in certain exemplary embodiments of the present invention:

FIG. 2). In this context, a Notification is the product or output of an intelligent analysis that communicates relevant information to the user. The following is a proposed notification data structure format, in accordance with certain exemplary embodiment:

ID (String) Sequential Number
Type (String) Code related to the Origin or type of the Notification
Number (String) A quantified (INTEGER) figure related with the Notification
Value (String) a value (percentage, distance, FLOAT) related to the Notification
TextLong (String) Short Text of the Notification
TextShort (String) Complimentary text, or action related to the Notification
Link (String) Action item or 2nd Layer of information
Keywords (List<String>)—List of keywords related to the Notification
RelatedNotes (List<Notification>) (optional)
EventID (List<Event>)—List of Events related to the Notification (optional)
UnitID Unit or list of units related to the Notification (optional)

Figure 4:
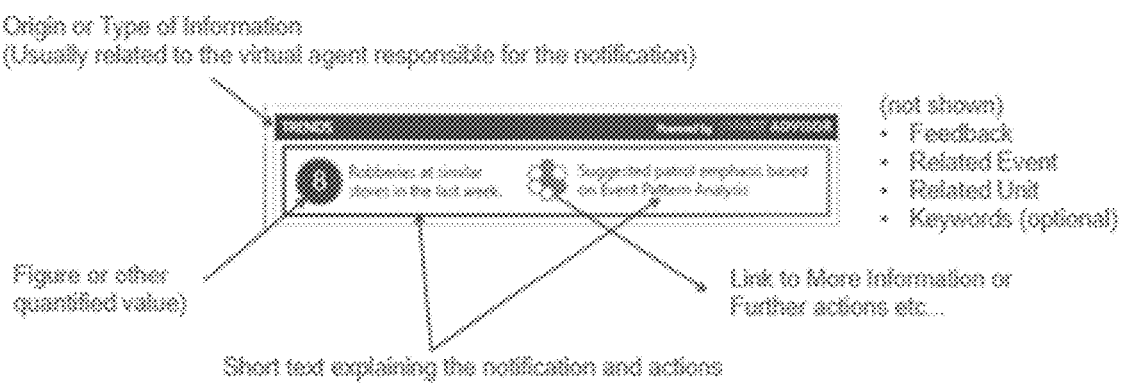
FIG. 4 shows one sample notification format.

FIG. 4 shows one sample notification format.

| Field | Description | Data Type | Data Format/ Data sample |
|---|---|---|---|
| EventID | Unique event identification may be used to relate to more useful external information | Unique String Key | UNICODE "S2887502" |
| Description | String of unstructured text that describes the event. Sometimes the description is written to the field agents, but many times a simplified version is written and most of information is done on audio. | String | UNICODE |
| Remarks | Additional information that is associated with the event. This may be a non-structured short text with punctuation and more than one sentence | String RTF (short text) | |
| Type | Type code of the event, related to an event type table | Integer or Unique Key | 21 |
| SubType | Subtype of the Type, usually a detail of the type | Integer or Unique Key | |
| TimeStamps | Date and Time of the Creation of the event, where we can derive: Time, Date, Hour, Day of the Week. We may have different time stamps (start, arrival, departure, finished, etc.) | Date time | 20160501000519ES 20160526213714E5 20160527034230ES |
| EventDuration | Time from two-time stamps. Time to arrive (from departure to arrival), time to execute (from arrival to finished), etc. | Time in hours | Float 0.00740 |
| Location | Geographic coordinates of the event, of the many events in the process: creation, dispatch, arrival, leave, etc.. | Lat, Long or UTM coordinates | 34543862, 738733055 |
| Address | Given Address, that can be geocoded to the Location | String | |
| UserID | Some identification of the caller (this may be classified, or simple nonexistent in some services) | Text or Unique String Key | |
| UnitID | Identification of the dispatched Unit and its group | Unique String Key | |
| DispatcherID | Identification of the dispatcher and its group | Unique String Key | |

Figure 5:
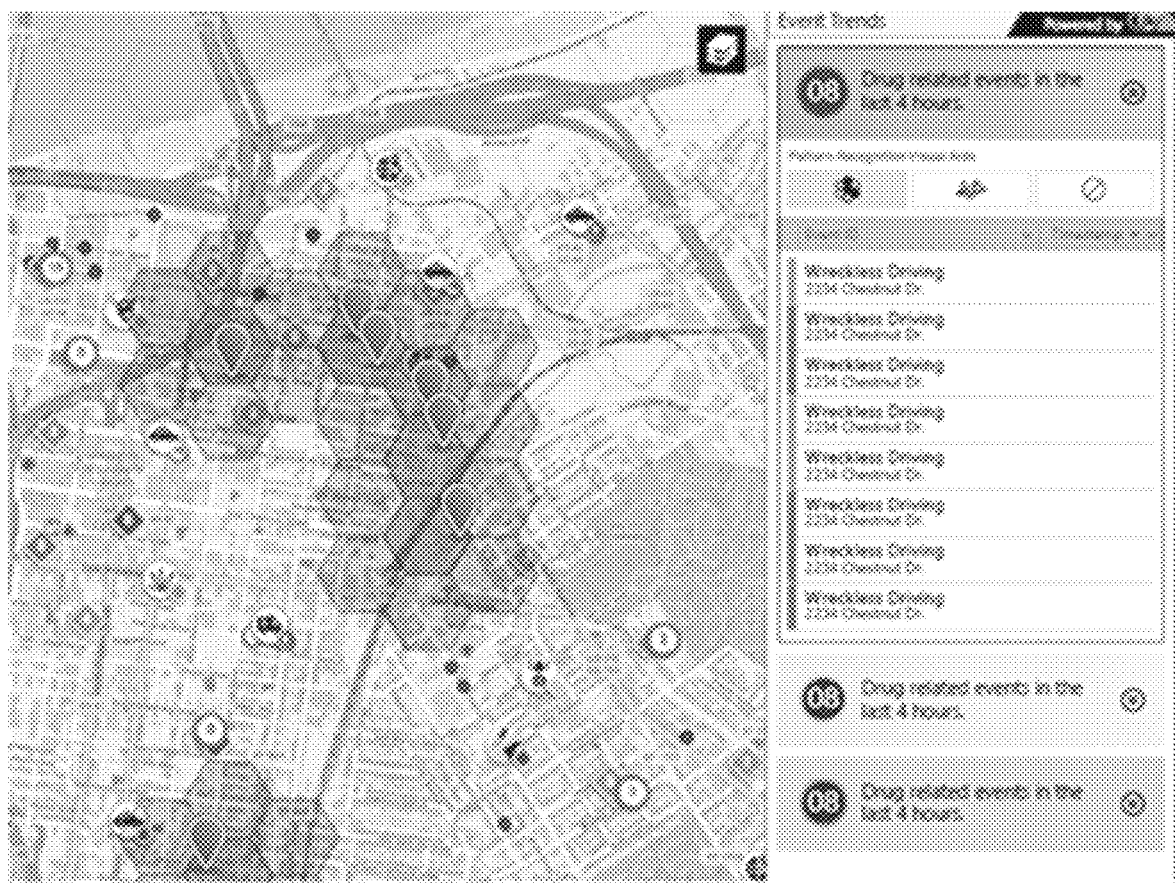
FIG. 5 shows another sample notification format with more detailed information and an OnCall map.

The SmartAdvisor will communicate with its users by issuing Notifications (represented by the Notifier block in FIG. 5 shows another sample notification format with more detailed information and an OnCall map.

In an exemplary embodiment, Notifications may include a user interface through which the user can provide feedback regarding the value of the notification, e.g., a LIKE/DISLIKE button or other type of rating input (e.g., high/medium/low or a rating from 1-10). The SmartAdvisor classifies Notifications based on the user feedback (represented by the Feedback block in FIG. 2) to define, beforehand, whether or not the user is willing to receive a particular type of Notification. In an exemplary embodiment, the technology used is a Bayesian Classifier that uses characteristics of previous liked and disliked Notifications as guidelines for future ones. The system learns by tracking user feedback provided in previously presented Notifications. This filtering can be user-specific, e.g., learning each user's preferences separately. To assure some randomness to the Filter, a small percent of Notifications (e.g., defaulting to 5% but optionally configurable by the administrator) are left unclassified such that users may receive a small percentage of unwanted/disliked Notifications. Related Notifications may be filtered as a group, e.g., if an original event Notification is not shown to the user, then Notifications related to the original event also may not be shown to the user. Notification filtering is performed by the DelivererManager block in FIG. 2.

Figure 6:
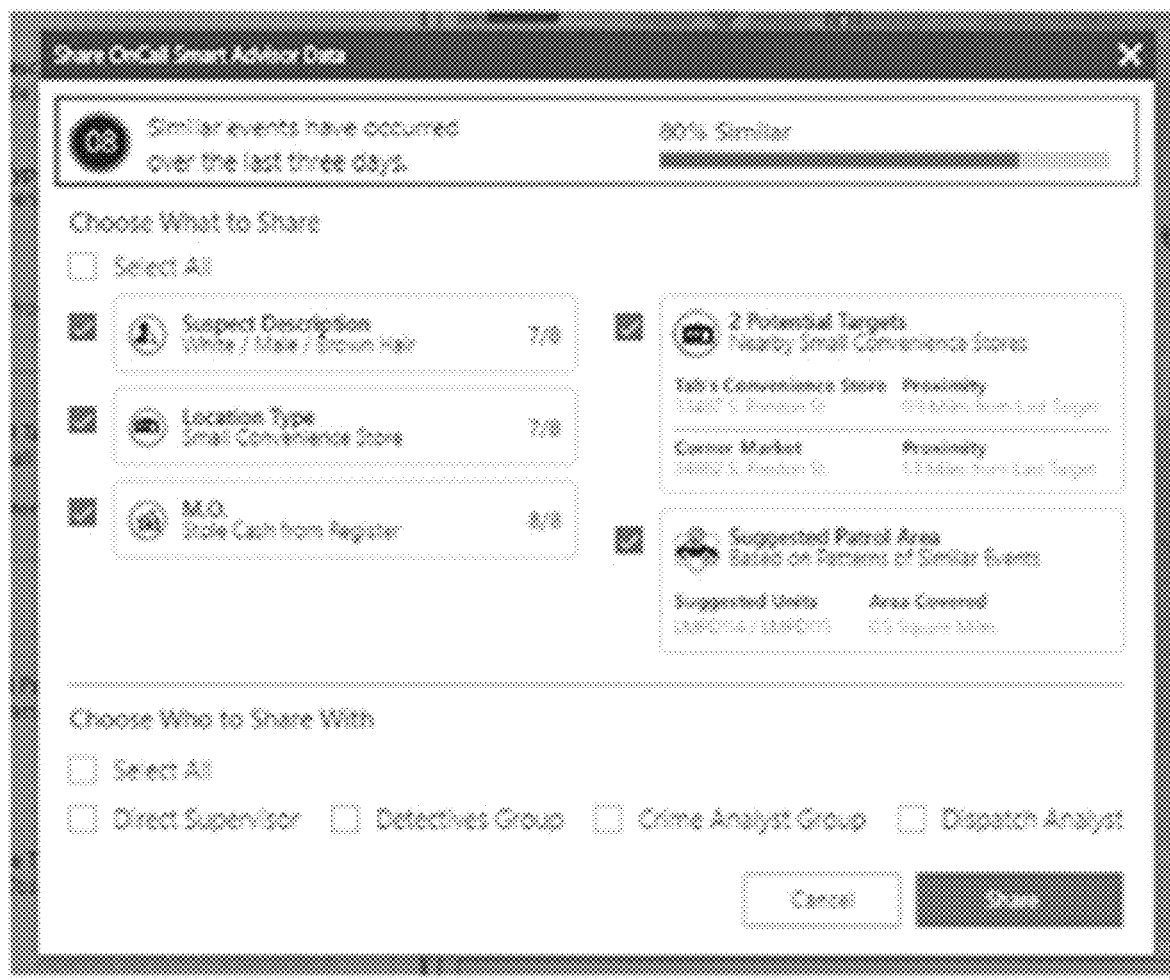
FIG. 6 shows a shared notification in accordance with certain exemplary embodiments.

In an exemplary embodiment, a user can create a shared notification, which in an exemplary embodiment is a portable link (URL) that can be exchanged among users to communicate relevant SmartAdvisor discoveries and causes rendering of a webpage that duplicates the original Notification information and optionally also other links and information. The system can restrict shared notifications to users of the system (and even to specific users) or can allow shared notifications to be shared with others outside of the system. FIG. 6 shows a shared notification in accordance with certain exemplary embodiments.

Figure 7:
FIG. 7 shows a graphical user interface for attaching a Notification to an event, in accordance with certain exemplary embodiments.

In an exemplary embodiment, a user can attach a notification to an event, e.g., as a special remark or comment, optionally along with additional information such as a list of users who liked or disliked the Notification. Among other things, attaching a notification to an event can allow users to understand how the Notification was created and why the information is relevant. The attached Notification can be used as part of auditing or standard procedure reviews. FIG. 7 shows a graphical user interface for attaching a Notification to an event, in accordance with certain exemplary embodiments.

In an exemplary embodiment, Notifications are stored in the SmartAdvisor Database along with user feedback, allowing for reviewing the history of notifications. FIG. 8 shows a notification history listing in accordance with certain exemplary embodiments.

Machine Learning and Cad Applications

Machine-learning is a broad term and can be used in many different ways. Real-world applications usually integrate more than one type of learning. There are many "ready to use" algorithm libraries with Bayesian, Neural Network and many Clustering functionalities. All these techniques generally involve some problem modelling and data formatting. Although a lot of emphasis today is in Deep Learning, this is not the only way and to create Machine-learning systems. Genetic Programming and Rule-based programming also can be used in optimization and to trigger warnings that come from other analysis/learning machines.

The following is a brief discussion of some machine learning styles and some possible applications of these machine learning styles to CAD systems.

The Symbolist learning style is based on rules and deductive reasoning. Knowledge is represented by a set of rules, which can be represented by decision trees and random forests, and the output is based on inferences from these trees/rules. The rules may be updated using fuzzy logic, and the trees can be trained. In terms of possible CAD applications, the Symbolist learning style involves storing a set of rules in the system and therefore is relatively easy to implement, may consider existing data or more elaborate data sets, and can generate powerful results for inferring on large data sets. The following are some examples of possible real-time CAD warnings based on the Symbolist learning style:

Unexpected increase in the number of events in the last two hours.
Number of critical events above normal level—Alert supervisor.
Hazardous event created within 200 meters of a Public School—Evacuation may be required.
Fire reported closed to a sensitive site—Land security alert required.

The Bayesian learning style is based on statistics and probability. Knowledge is gathered in probabilistic terms, and the occurrence of events changes the chance of other events. Learning is based on these statistics. Applying statistics can unhide rules that lead to conclusions. Finding correlation among the data may lead to existing causation that can be explored by the CAD system. In terms of possible CAD applications, the Bayesian learning style can support rule-based intelligence using probability, e.g., using Bayes theorem and Markov chain. The following are some examples of possible CAD applications based on the Bayesian learning style:

There is a 95% chance of happening a new event in sector X in the next hour—Dispatch a patrol unit?
There is a relevant increase in the occurrences of car accidents in sector Z in the last 3 days—Dispatch a routine check?
Last month there was an uncommon increase in domestic violence events on Sundays—Most events happened in sectors A, D and G.

The Analogizer learning style is based on group similarities, clusters, and patterns. Learning comes from finding similarities in the data. Algorithms look for events that are closer to each other and classify events by assigning similar characteristics to the group. It uses algorithm like the nearest neighborhood, support vector, and clustering. The following are some examples of possible CAD applications based on the Analogizer learning model:

Trying to classify an event by grouping similarities.
Grouping closer events may lead to better geographic decisions
Endemic events (related to a site) can be unveiled with this analysis.
Once a cluster of similar events is identified, the events can be treated the same way, or a previous successful response can be applied to the events, and the CAD system can learn from the past success.

The Evolutionism learning style is based on Natural Evolution and the Genetic Algorithm. This is essentially nature's learning algorithm, i.e., the survival of the fittest. A population of possible solutions (DNA) are evaluated and the fittest survive to create the next generation. It also can use techniques of "crossover" and "mutation" to create new alternatives. Generally speaking, there are only two basic requirements: 1) being able to generate the "DNA" of a solution, and 2) being able to evaluate a solution. Using a lot of computer power, the genetic and evolutionary algorithms can create unique and innovative solutions. Genetic Algorithm can help improve other styles of learning (e.g., Neural Networks, Analogies, etc.).

The Genetic Algorithm evolves solutions using Natural Evolution techniques (Darwinian evolution). The solution is represented by a DNA like structure. A Fitness function is associated with the solution (DNA) and it is used to evaluate adaptation. A population of possible solutions (DNAs) is randomly initialized and evaluated, and the fittest individuals survive to create the next generation. Optimization can be understood as an evolution towards an optimum. The genetic algorithms can create unique and innovative solutions. Since there is low control of the solution, two separate runs may give two completely different solutions. Restrictions to the solution can be easily modeled as penalties on the fitness function.

Figure 9:
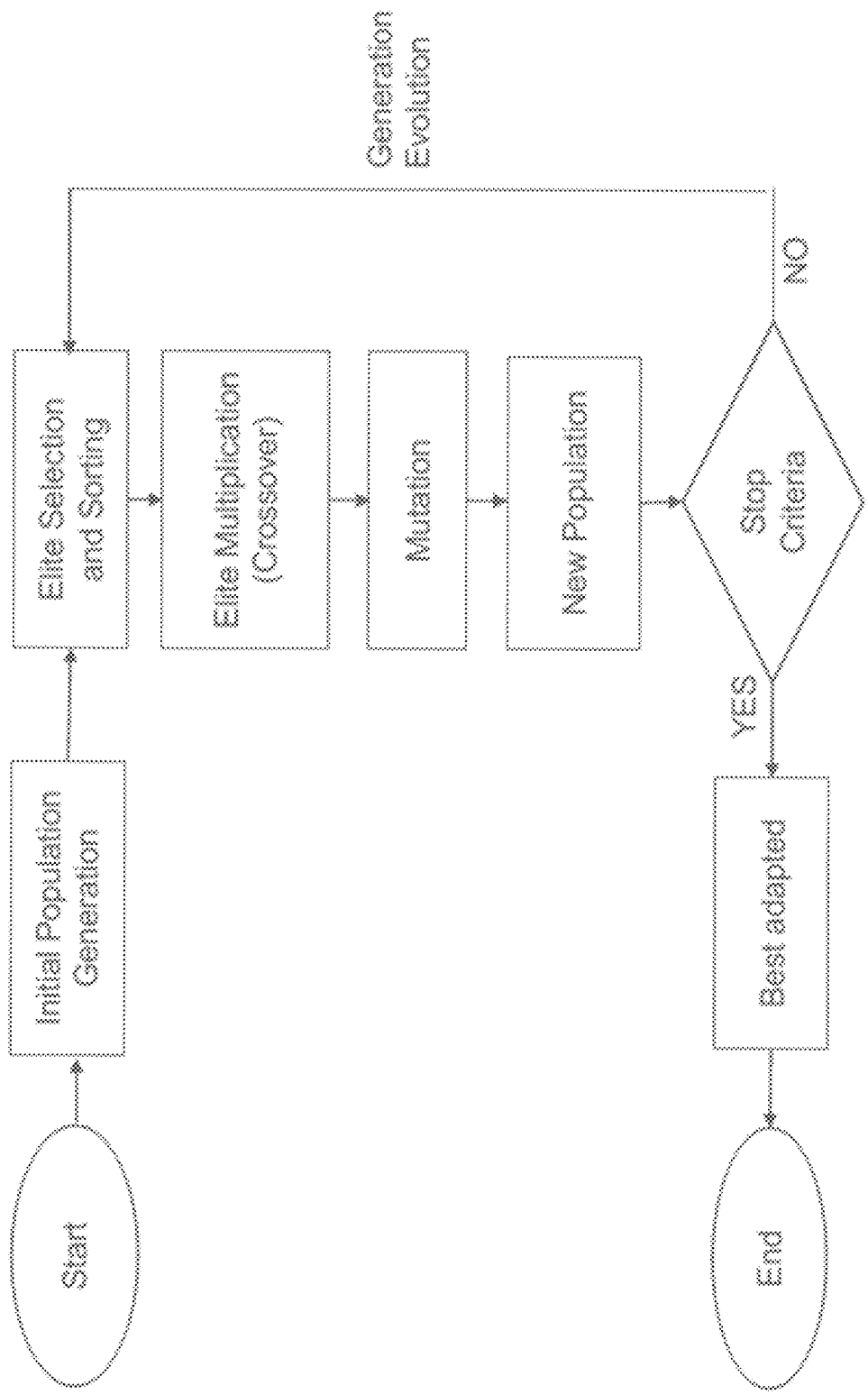
FIG. 9 is a schematic diagram showing a genetic algorithm workflow, in accordance with certain exemplary embodiments.

FIG. 9 is a schematic diagram showing a genetic algorithm workflow, in accordance with certain exemplary embodiments. Each of a number of successive population generations, beginning with an initial population generation, is analyzed to select and sort the fittest (elite) members of the population according to predetermined criteria. These elite members represent the best adapted members of the current generation (and possibly the best adapted overall, if predetermined stop criteria are reached). For each successive population generation, a new population is generated by multiplication (cross-over) and/or mutation of the elite members of the previous generation.

Figure 10:
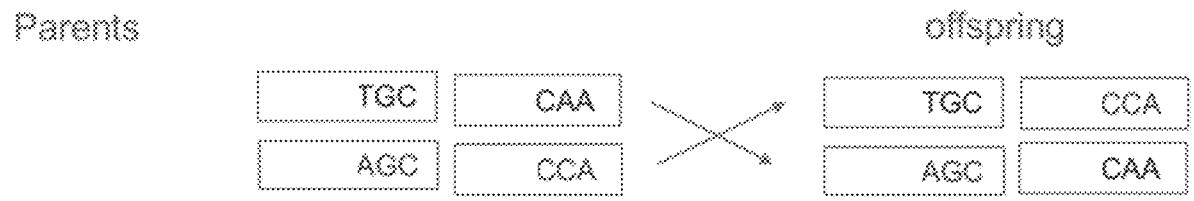
FIG. 10 shows an example of a multiplication (crossover) operation, where two most fit individuals (i.e., the parents) are divided into two sections (the cut point may be random) and the resulting sections are combined such that each offspring includes one piece from each parent.
Figure 11:
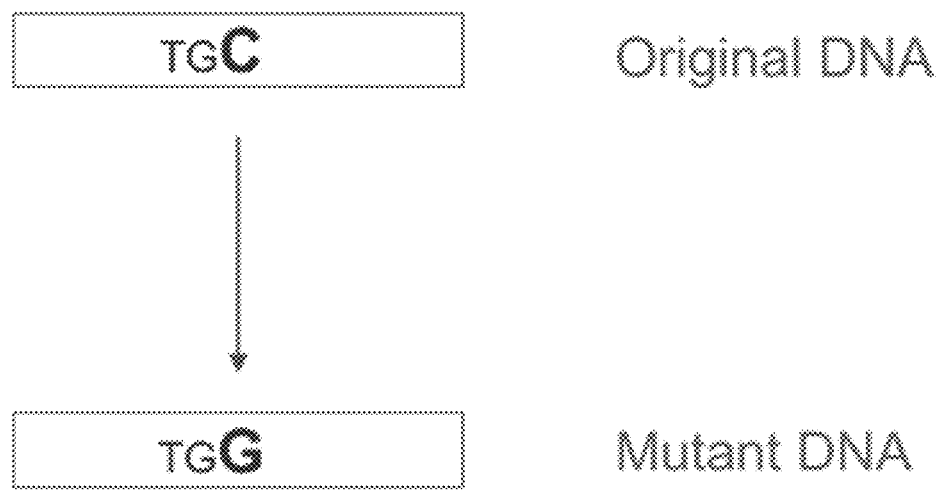
FIG. 11 shows an example of a mutation operation, where a portion of the elite population receives a mutation which can be random or rule-based.

This algorithm can be demonstrated by example using a DNA analogy. Each population generation includes a set of individual DNAs. The initial population can be totally random. The population evolves over a number of generations. The fitness function relates a chromosome (individual) to a value proportional to the quality of the solution. The function will define the adaptability of the solution, to select the most adjusted. Population evaluation is usually the most complex and time-consuming part of a genetic algorithm. It may utilize a heuristic evaluation and may accommodate local improvements (e.g., a memetic algorithm—Genetic Local Search). The elite population is defined as a percentage of the most adapted (e.g., 20%). The elite population then reproduces/evolves to ensure that the best solution is moving towards an even better solution. This reproduction/evolution involves multiplication (cross-over) and mutation. FIG. 10 shows an example of a multiplication (cross-over) operation, where two most fit individuals (i.e., the parents) are divided into two sections (the cut point may be random) and the resulting sections are combined such that each offspring includes one piece from each parent. FIG. 11 shows an example of a mutation operation, where a portion of the elite population receives a mutation which can be random or rule-based.

The Evolutionism learning model is especially useful for optimization and multiple objection solutions. The following are some examples of possible CAD applications based on the Evolutionism learning model:
Vehicle routing with special restrictions.
Facility location and capacity for optimal response.
Re-location/Move Ups optimization.
Automatic Dispatch Planning.

The Connectionist learning style is based on Artificial Neural Networks and is generally considered the "state of the art" in machine learning, as exemplified by Deep Learning, a multi-level neural network. Learning is stored in a manner similar to brain "synapses." The basic structure is the Artificial Neural Network. The Network is trained by applying an input and a known output. This creates the "synapses" and, with time, the network is able to give the correct output to other inputs. Inputs/Outputs can be almost any type of data. The Connectionist learning style can be very useful for classification (supervised classification) and generally needs a lot of training. The following are some examples of possible CAD applications based on the Connectionist learning model:
Image recognition.
Event classification (e.g., type, urgency, etc.).
Event detection.
Alarm classification.
Time and distance measurement (e.g., better ETA).

Technology Overview

The following is an overview of some AI/ML technologies that can be employed by various Intelligent Agents in accordance with an exemplary embodiment.

Rule-Based Logic

A rule, in the context of the SmartAdvisor, is a logical expression that results in a true or false statement. We could state that every rule has an expression like this:

if (logical expression) then (issue a notification)

This technology usually encompasses a symbolic processing and a rule evaluation engine, but in some cases the logical expression can be simplified to a list of variables and limits in a structured way, for example:

if (variable.OPERATOR.limit) then (issue a notification)

Or in a more generic form:

if ((variable1.OPERATOR.limit1) AND (variable2.OPERATOR.limit2) AND . . . )

then (issue a notification)

Here, we only consider the operator .AND. to join the list of expressions because the operator .OR. is the same of having two rules.

In an exemplary embodiment, the logical operators for the logical expressions are:

| OPERATOR | Description |
|---|---|
| .EQ. | Equal |
| .GT. | Greater Than |
| .GE. | Greater of Equal |
| .LT. | Less Than |
| .LE. | Less or Equal |

The Variables are system variables that will be translated into a real number, and the limits are all real numbers or other system variables. To evaluate an expression, the system brings the values for the variable and the value for the limit and executes the operator, repeating this for all pairs of Variable and Limit.

Fuzzy Logic

While boolean logic deals with true and false usually associated with 1 and 0, fuzzy logic is a variation of the logic where the values may be any number from 0 to 1. Fuzzy logic includes 0 and 1 as extreme cases of truth, or facts, but also includes the various states of truth in between them, so it considers partial truth and is often used to facilitate the expression of rules and facts like something that is "near to", "far from", "close to", and "like the", for instance.

The goal of the fuzzy logic is to relate a set of partial truths to a final logical decision of true or false. It is a method that resembles human reasoning and thus is considered part of Artificial Intelligence (AI) applications: the representation of generalized human cognitive abilities in software so that, faced with an unfamiliar task, the AI system can find a solution.

The inventor of fuzzy logic, Lotfi Zadeh, observed that humans, unlike computers, make decisions considering possibilities like "definitively", "maybe yes", "I don't know", "possibly", "absolutely" that are variations of the yes (true) or no (false), but at the end, humans sometimes must decide into a "yes" or "no". The typical algorithm for a Fuzzy Logic Problem can be:

1. Define the input variables
2. Transform these variables into fuzzy sets with the Fuzzyfier
3. Construct a set of rules mapping the input to the output
4. Implement these rules in the FuzzIntelligence
5. Evaluate the inputs and generate the output Fuzzy logic can be implemented in systems with various sizes and capabilities in software and even in hardware. In an exemplary embodiment, the fuzzy logic system is simplified into two modules referred to herein as The Fuzzyfier and the FuzzyIntelligence. The Fuzzyfier module transforms generic inputs (which may come in various formats) into a set of fuzzy values (i.e., numbers from 0 to 1) that are input to the FuzzyIntelligence module. The FuzzyIntelligence module simulates the human reasoning process by making fuzzy inferences on the fuzzy values based on IF-THEN rules to produce a logic output. A third component could be used to "Defuzzyfy" and transform the logic output into an output action or value.

Another useful application is a Membership Function. This allows quantification of a linguistic term and representation of a fuzzy set graphically. A membership function for a fuzzy set A on the universe of discourse X can be defined as $\mu A: X \to [0,1]$.

Among some of the advantages of the fuzzy logic include simplicity and the possibility of translating a complex problem from many fields into a simple solution in human-like decision making. One disadvantage of using a fuzzy logic is that there is no generic approach or automatic learning; instead, every problem must be adapted to every situation.

As an example of matching events using a fuzzy logic system, let's consider creating a fuzzy logic engine that solves the problem:

Two events may be the same if they occur close to each other and are reported at almost the same time. They may have the same type, but sometimes users describe the events differently such that they result in different types. Given two events (e1, e2), are they the same?

Thus, given two events e1(x1, y1, t1, s1) and e2(x2, y2, t2, s2) where:

x1, x2, y1, y2—reported UTM location of the events
t1, t2—Date-times of the events
s1, s2—types of the event 1 and 2

The Fuzzyfier module translates these data into fuzzy inputs. To make the final decision, the system needs the following fuzzy information:

Are the two events near each other?
Did the events happened at the same time?
Are the two events of the same type?

Figure 12:
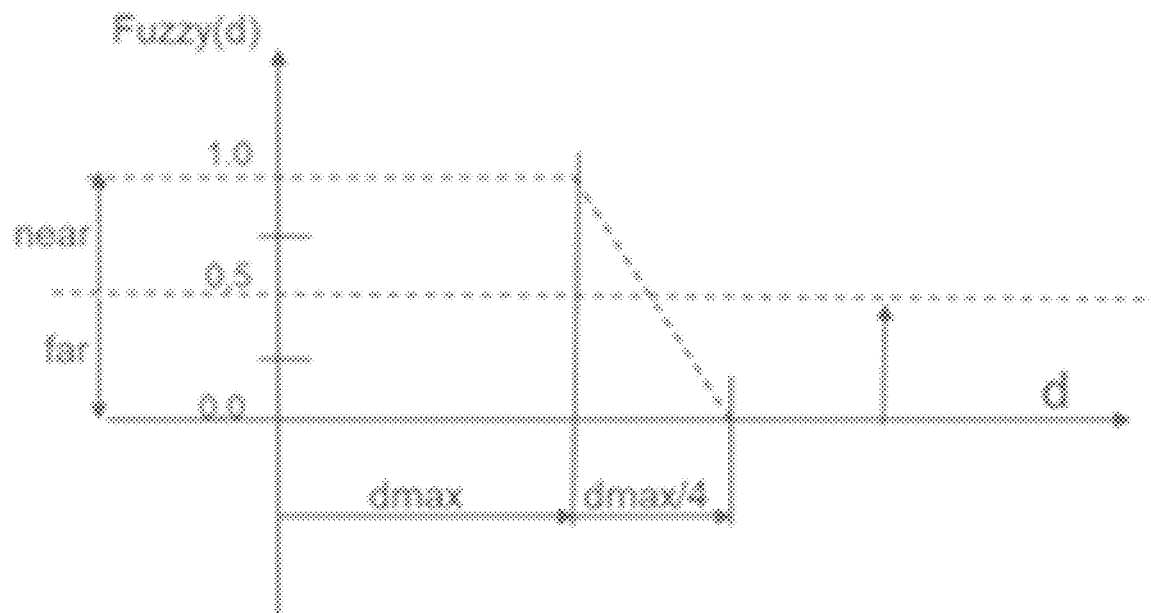
FIG. 12 shows a fuzzifier function for determining if two events are near to one another, in accordance with one exemplary embodiment.

In one example of determining if two events are near each other, let d be the Euclidean distance from one event to the other. If $d < d_{max}$ then we can say they are close to each other, where for instance $d_{max} = 100$ m. But if d=101 m are they still close to each other? And if they are 105 m? To have a consistent solution, an exemplary embodiment can use a fuzzifier function like the one shown in FIG. 12, where:

$$\text{Fuzzy}(d) = \begin{cases} 1 \text{ if } d \le d_{max} \\ 1-(d-d_{max})/\left(\dfrac{d_{max}}{N}\right) \text{ if } d_{max} < t \le \left(\dfrac{(N-1)d_{max}}{N}\right) \\ 0 \text{ if } x \le \dfrac{(N+1)d_{max}}{N} \end{cases}$$

Here, we are using $$\dfrac{d_{max}}{N}$$

as an arbitrary fraction of $d_{max}$. With the help of this function, the event will be considered "near" if Fuzzy(d) <0.5 (or other arbitrary number<1.0).

Figure 13:
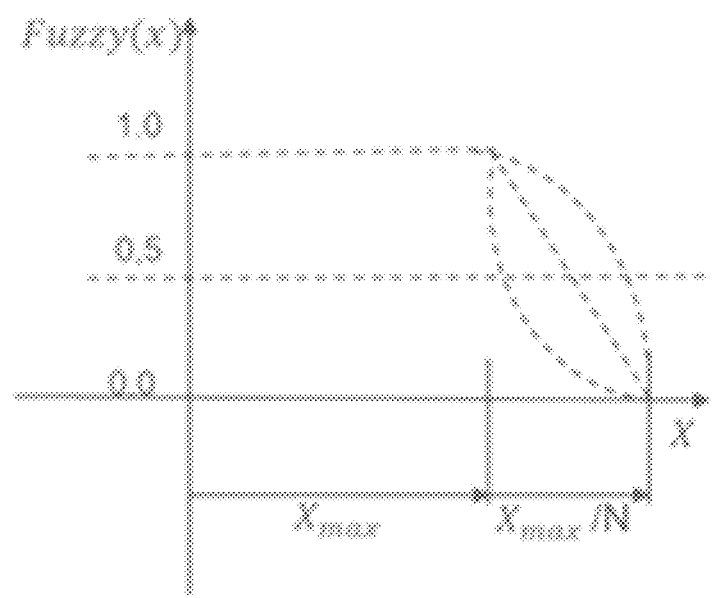
FIG. 13 shows a fuzzifier function for determining if two events happened at the same time, in accordance with one exemplary embodiment.

To determine if events happened at the same time, the same approach can be applied to time, with the help of a similar generalized Fuzzifier function that can have different function variations, for example, like the one shown in FIG. 13, where:

$$\text{Fuzzy}(d) = \begin{cases} 1 \text{ if } x \le x_{max} \\ 1-(x-x_{max})/\left(\dfrac{x_{max}}{N}\right) \text{ if } x_{max} < t \le \left(\dfrac{(N-1)x_{max}}{N}\right) \\ 0 \text{ if } x \le \dfrac{(N+1)x_{max}}{N} \end{cases}$$

To determine if two events are of the same type, we can consider the exact type or a family of types, or even a scale of types. One exemplary embodiment considers the exact types.

With these three types of fuzzy information (i.e., the events are near, the events happened at the same time, and the evens have the same type) we can now formulate a Fuzzy Intelligence function, for example, as represented by the following decision tree that can be translated into these logical expressions:

IF (near and same_time) THEN return True (Same)

IF (not_near and not_same_event) THEN return False (not Same)

IF (not_near and same_time) THEN

IF (same_type) THEN return True (Same Event)

ELSE return False (not Same)

Other functions of the same type can be implemented with different results.

Basic Statistics

For the basic statistics of the events in a CAD operation, an exemplary embodiment will be based on the assumption that the events are distributed in a Normal (Gaussian) distribution. Thus, the concepts of Mean Value and Standard deviation can help to represent the data. The Maximum and Minimum values are also monitored, as well four different time frames: hour (short time frame), day, day of week (DOW—a number from 1-7), and month (long time frame). In an exemplary embodiment, the following information is tracked for each event type:

| DataType | DT | HODnn | HOUR (last hour) | Day Dddmm | DOW 1-7 | Month Mmmyyyy |
|---|---|---|---|---|---|---|
| Counting | N | DT_N_HOD01 | DT_N_HOUR | DT_N_D1503 | DT_N_DOW3 | DT_N_M032017 |
| Average | AVR | DT_AVR_HOD01 | DT_AVR_HOUR | DT_AVR_D0120 | DT_AVR_DOW1 | DT_AVR_M012018 |
| Std Deviat. | STD | DT_STD_HOD01 | DT_STD_HOUR | DT_STD_D1503 | DT_STD_DOW3 | DT_STD_M012018 |
| Maximum | MAX | DT_MAX_HOD01 | DT_MAX_HOUR | DT_MAX_D0120 | DT_MAX_DOW2 | DT_MAX_M112018 |

The following is an overview of the statistical algorithm in accordance with an exemplary embodiment:
Given a new event ei of type Ti
Process new event
    Process Statistics for All Events—EVENT
    Compute Counting, Average, Std Deviation And Maximum
    Check Event Rules—Issue Notifications
    Process Statistics for Type T events—TYPE[t]
    Compute Counting, Average (AVR), Standard Deviation (STD), Maximum
    Check Type Rules—Issue Notifications
    Save Event Status
where:

$$AVR = \frac{\Sigma\, e_i}{N}$$

$$STD = \sqrt{\frac{\Sigma(e_i - AVR)^2}{N-1}}$$

Now, let limit be the percentage that is allowed for a notification be issued, e.g., limit=1.25 (25% above the expected value) so, using the example above, there will be a notification when:
    DT_N_HOUR>DT_AVR_HODBefore*limit
    DT_N_HOUR>DT_MAX_HODBefore (setting anew maximum for this hour)
    DT_N_DAY>DT_AVR_DOWCurrent*limit
    DT_N_DAY>DT_MAX_DOWCurrent (setting anew maximum for this DOW)

Correlation Statistics

This is a simple algorithm for the detection of possible correlations among variables by identifying outliers in a simple statistical analysis of a set of uncorrelated events. The study applies this analysis to a sample of the data and can be processed whenever a relative large amount of data is available.

Given a set of non-correlated events $E=\{e_1, e_2, \ldots e_n\}$ where each event has a set of independent characteristics $e_{ij}$, where: $e_i=(c_{i1}, c_{i2}, \ldots, c_{im})$, that can assume some known set of finite values.

Each value for each characteristic are assumed independent of the value of the other characteristic, although each characteristic can have its own probabilistic distribution.

For example, let $c_1$ be the day of the week and $c_2$ be the type of the event. It's fair to assume the types of event are distributed evenly among the days of the week, whatever is the type of the event. (i.e. the probability of $p(c_1)$ is equal to $p(c_1/c_2)$ $$p(c_1) \sim p(c_1 \kappa c_2 = C)$$

If a certain type of event is more common in a certain day or the week, there is a correlation among that type of event and that day of the week. This trend can be traced if we compare the probability of occurrence of the event in that day with the probability of occurrence of all events in that day. Indicating a possible correlation of the characteristic $c_1$ with the value $c_2=C$.

$$p(c_1|c_2=C) \neq p(c_1)$$

This inference is a direct application of a Bayesian inference, where we compute directly $P(c_1)$, as the a-priori probability of the time to execute, equals the probability of the day (as if there is no relation). And $P(c_1 \kappa c_2=C)$ the a-posteri probability of the time to execute given the day. When they diverge, the data indicates a relation between the two variables.

In the example, let's say that the completion of an event in the weekends could be shorter than other days; we could say that there is a possible correlation of the time to complete an event with the weekends.

All the above relations need a level of significance in the data sample. Small data sets could be limited to identify these phenomena.

Algorithmically, given a set of events with associated variables identify the pair or variables that may be correlate. The correlation is observed if the pair of variable data occurs more frequently than it is expected.

The probability of an event variable to appear in an event is the ratio of the number of events where this variable appears to the totality of possible events. Thus, if a variable influences the occurrence of an event, the probability conditioned to that variable will be greater than the probability without the presence of the variable. By comparing these two probabilities we can identify possible influences:

Given two characteristics $c_1$, $c_2$ in an event data set $E=\{e_1, e_2, \ldots e_n\}$
where $e_i=(c_{i1}, c_{i2}, \ldots, c_{im})$,
Repeat for every value C of $c_2$
Let $p(c_2=C)$ and $p(c_1)>\alpha$ (where $\alpha$=level of significance)
If $p(c_1|c_2=C)>\beta*p(c_1)$ (where $\beta$=level of influence)
Then $c_1$ is influenced by $c_2=C$ The main evidence that there is an influence among the variables of an event is when there is an unexpected behavior in the presence of a given factor. It is assumed that the occurrence of events follows a random pattern. When the hypothesis of randomness is not confirmed, an influence between the variables is identified. The software seeks to identify repetitive behaviors that escape what can be considered as expected. We want to identify the set of events that insist on behaving outside the mean of the behavior of the other events, the so-called "outliers."

For example, we can test the hypothesis that traffic accidents occur more on weekends we can compare the likelihood of a traffic accident occur on a day of the week to the frequency of all types of accident to occur on that day. If there is an influence of the day of the week, the probability will be significantly higher on this day. Note that this approach is associated with the absolute number of events, that is, there must be a high number of events to the ratio have some statistical significance. This technique is similar the technique known as Market Basket Analysis which is a common technique in the analysis of purchases in a supermarket in search of the association of the purchase of products. Identifying unusual characteristics and consumption patterns.

This type of study allows analyzing the correlation of any 2 variables recorded for the events. But it cannot be confused with a causal relationship between variables. This means that the fact that two variables are correlated is not an evidence that one variable is the cause of the other. Common causes can influence both variables and cause correlation.

To exemplify the application, we will analyze historical data of a typical emergency health care system. The system operates answering emergency calls in the city. Each call is classified according to predefined complain list types (TYCOD). Let's look at the influence of the Day of the Week, Time of Day, and Location on the several types of events. In addition to the type of complaint and date are recorded: the place of service with geographical precision, time of arrival, a sub-classification of the type of event, the service unit, etc.

One exemplary study correlating between type of event (TYCOD) and days of the week (DOW) with a factor of influence of 20% identified the following influences:

Influence of TYCOD=04 [01.3%] in D.O.W=01 is higher than average [057.2%]
Influence of TYCOD=04 [01.3%] in D.O.W=07 is higher than average [026.5%]
Influence of TYCOD=23 [01.4%] in D.O.W=01 is higher than average [035.6%]
Influence of TYCOD=29 [05.2%] in D.O.W=07 is higher than average [023.3%]
Influence of TYCOD=30 [02.2%] in D.O.W=01 is higher than average [025.9%]
where:

| TYCOD | Type Description |
| --- | --- |
| 4 | Sexual Assault/Violence |
| 23 | Overdose/Poisoning (Ingestion) |
| 29 | Traffic Accidents/Transportation |
| 30 | Traumatic Wounds |

The result reports that there is above average growth on the number of events of aggression, overdose, traffic accidents and traumatic on weekends (DOW) (where 1=Sunday, 7=Saturday). A more in-depth investigation into these events may show, for instance, that they are associated with a higher alcohol consumption on weekends.

Figure 14:
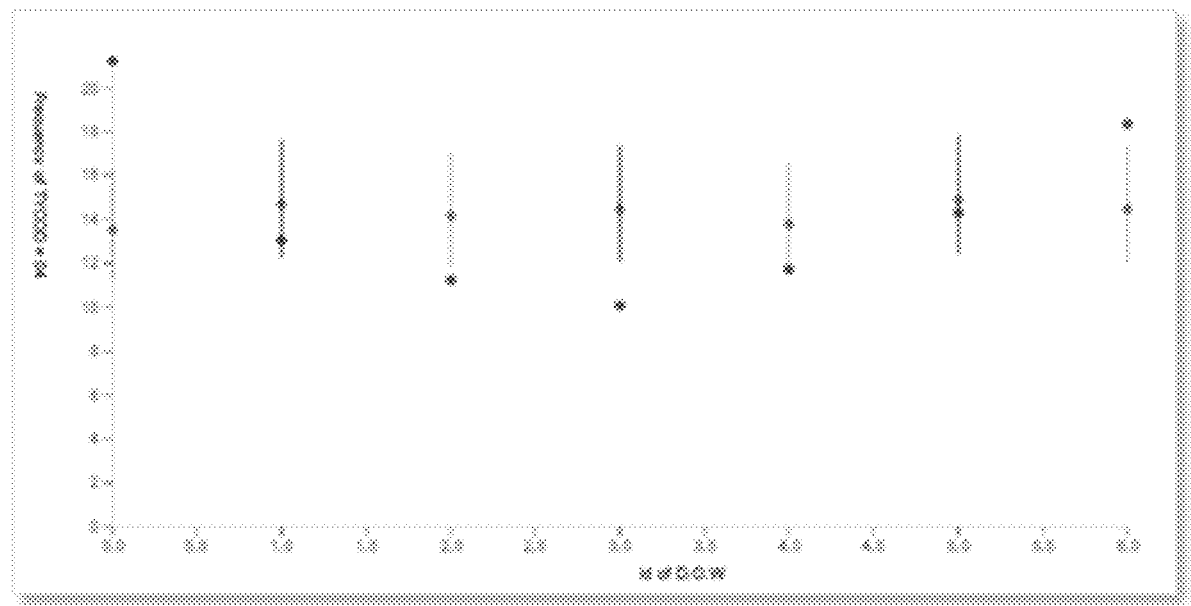
FIG. 14 is a graphical view of the results of a correlation analysis showing the average value of the events for all codes and the selected 20% influence range for the case of TYCOD=4 (Aggression/Sexual Violence) correlated by Day of Week (DOW), in accordance with one exemplary embodiment.
Figure 15:
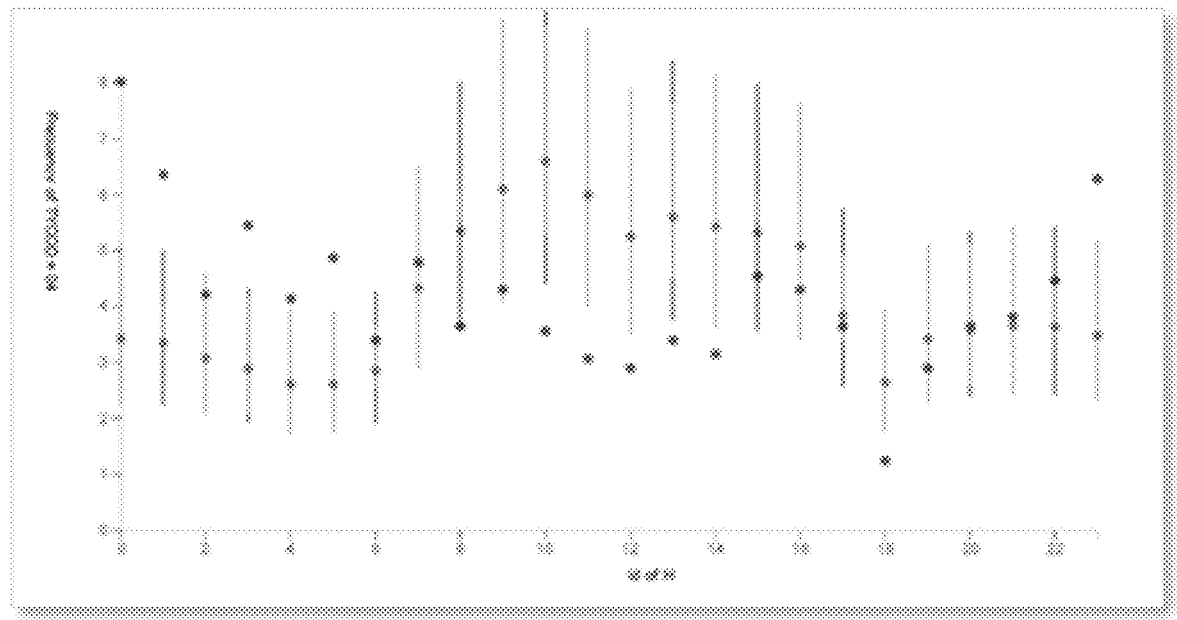
FIG. 15 is a graphical view of the results of a correlation analysis showing the average value of the events for all codes and the selected 20% influence range for the case of TYCOD=4 (Aggression/Sexual Violence) correlated by Hour of Day, in accordance with one exemplary embodiment.

This may be the common cause that causes more accidents on these days. In an exemplary embodiment, correlation analysis will indicate that there is a cause to be investigated, but not what it is. This analysis also provides a graphical view for each of these codes. For example, FIG. 14 shows the average value of the events for all codes and the selected 20% influence range for the case of TYCOD=4 (Aggression/Sexual Violence) correlated by Day of Week (DOW) and FIG. 15 shows the average value of the events for all codes and the selected 20% influence range for the case of TYCOD=4 (Aggression/Sexual Violence) correlated by Hour of Day. It can be observed that when DOW=1 and 7, there is a substantial increase in the frequency of events, indicating the correlation.

Natural Language Processing (NLP)

Natural Language Processing refers to the use of communicating to computers using a natural language, in opposite to a structured command language. This is a field of Artificial Intelligence and involves reading as well as writing. For this technology note, we will limit the application of reading a text and making decisions based on it, we will not consider, in this study, the use of Speech, although this is part of NLP.

The NLP is commonly divided into NLU—Natural Language Understanding—that is making sense of a text input, and NLG—Natural Language Generation—that is producing meaningful phrases and sentences. We will study only NLU.

Understanding a Natural Language is very hard, as the languages a rich in form and structure. There are many layers of understanding:

Lexical—is a very primitive, in a word level, and it consider that the word belongs to the language ("bread" is an English word)

Semantic—is also associated with the language, and it considers the meaning of the word. ("bread" is a type of food made of flour and usually baked)

Syntax—considers the use of the word in the phrase. (Bread is delicious means that the "bread" has a characteristic of being "delicious")

Referential—Considers the referring words using pronouns (Bread is delicious. It is made of flour—the it refers to bread)

The same phrase/word can have many interpretations and can lead to many meanings, and analysis.

NLP has usually five steps: Lexical, Syntactic/Parsing, Semantic, Discourse and Pragmatic.

Lexical Analysis—It involves identifying and analyzing the structure of words. Lexicon of a language means the collection of words and phrases in a language. Lexical analysis is dividing the whole chunk of txt into paragraphs, sentences, and words.

Syntactic Analysis (Parsing)—It involves analysis of words in the sentence for grammar and arranging words in a manner that shows the relationship among the words. The sentence such as "The school goes to boy" is rejected by English syntactic analyzer.

Semantic Analysis—It draws the exact meaning or the dictionary meaning from the text. The text is checked for meaningfulness. It is done by mapping syntactic structures and objects in the task domain. The semantic analyzer disregards sentence such as "hot ice-cream".

Discourse Integration—The meaning of any sentence depends upon the meaning of the sentence just before it. In addition, it also brings about the meaning of immediately succeeding sentence.

Pragmatic Analysis—During this, what was said is re-interpreted on what it meant. It involves deriving those aspects of language which require real world knowledge.

Some AI applications can be accomplished at the level of lexical and other need a syntactic and a semantic understanding.

| NLP Level | Application | Technology |
| --- | --- | --- |
| Lexical Analysis | Text Pattern Identification | Regular Expression Extracting Repeated Event Identification |
| Syntactic Analysis (Parsing) | Notification Likelihood Analysis Event Pattern Analysis | Bayesian Classification Similarity Analysis |

Text Pattern Identification

One of the possibilities of finding patterns in a text is to define a regular expression pattern a highlight whenever the expression appears on a text. A regular expression in a pattern that consists of one or more literals characters, operators, and other text structures. Most programming languages have tools for extracting the text that matches a regular expression. The regular expression is described by a set of constructs, and when the input text matches these expressions we have the desired pattern.

The following are some exemplary REGEX expressions for text patter identification:

| Item | Expression |
|---|---|
| City, state and zip | #\d+ ([^,]+), ([A-Z]{2}) (\d{5}) |
| | (\d*)\s+((?$[\w+\s*-]+[\,]\s+([a-zA-Z]+)\s+([0-9a-zA-Z]+) |
| Phone numbers | @"(\(?[0-9]{3}\)?)?\-?[0-9]{4}" |
| License Plates and Registration | [A-Z]{1,3-}[A-Z]{1,2-}[0-9]{1,4} |
| | ^[A-Z]{1,3}-[A-Z]{1,2}-[0-9]{1,4}$ |
| Social Security Number | ^((?!000)(?!666)(?:[0-6]\d{2}\|7[0-2][0-9]\|73[5-6][0-9]\|77[0-2]))-((?!00)\d{2})-((?!0000)\d{4})$ |

Keywords Identification

One of the possibilities of finding patterns in a text is to define a set of pre-defined keywords, and when some of these keywords are found in the event description, the system generates an appropriate notification, e.g., to a specific user who requires this information.

Notification Likelihood Analysis

The user feedback (e.g., thumbs up or thumbs down) will teach the Virtual Assistant whether or not similar Notifications should be transmitted to the user. In other words, the system can estimate the likelihood probability of a notification, e.g., if the user, based on previous information, will like the notification or not. One exemplary way of doing that is by a Bayesian classifier, as described below.

The result of the classifier is to give an estimation of the probability of the likelihood (of a notification, given the previous information of the feedback from this user for the notifications he had received until now. We can also estimate the probability of the dislike of the information.

Let PL(Ni) be the Probability of Likelihood, where the closer to 1.0 means the user will probably like the notification. Let PD(Ni) be the Probability of the user dislike the notification, based on previous dislikes. With PL(Ni) and PD(Ni) we can use fuzzy logic, and create a Fuzzy Intelligence logic to decide whether or not the Notification is shown to the user, for example, as shown in FIG. 16.

An exemplary embodiment also includes some serendipity, e.g., by providing some small random number of notifications to the user, regardless of the classification. This gives the user the chance to review his or her preferences.

The Bayesian Classifier

One technique used to automatically classify notifications is the Bayesian Classifier. It is based on the statistical theorem of Bayes, that estimates the conditional probability of an event, given the previous knowledge that another related event has occurred. In this case, we can estimate the probability that the notification will be liked by the user, that is the Notification is of class C given that a set of parameters T (notification description) was used to describe it. In other words, we will estimate the likelihood of the user liking the notification based on previous likes given by the user in other notes.

This technique is like the one used to classify spam in emails or to classify important and promotional emails in our inbox. It looks for the frequency of certain words and makes a prediction, that can be corrected by the user with new feedback.

Let the Bayes Theorem be expressed by:

$$P(C|T) = \frac{P(T|C) * P(C)}{P(T)}$$

where:
P(C|T) is the conditional probability of a class given a set of parameters T, the wanted result;
P(T|C) is the conditional probability of a given parameter in the class C (estimated by the history of previous occurrences);
P(C) is the probability of the Class, also estimated from previous events;
P(T) is the probability of the occurrence of a given parameter, also estimated from previous events, as the parameter set is composed of an individual item:

$$T=\{W_1, W_2, \ldots W_n\}.$$

For a Notification, we can have, for instance: Notification Type, Notification Location, Notification Text (set of words), etc.

The P (T|C) can be expressed as:

$$P(T|C)=P(W_1|C)*P(W_2|C)* \ldots *P(W_n|C)$$

and $$P(C=(C|T)=P(W_1|C)*P(W_2|C)* \ldots *P(W_n|C)*P(C)$$

An implementation may be structured into two phases: Training and testing. In the training phase, parse, eliminate the rejected words the phrases, eliminate the rejected words, and count the remaining ones for each class. In the testing phase, receive a text input, parse the input, and calculate the probability of the input belonging to each class, selecting for the most probable one.

Probabilities are estimated by the counting of the words, as:

$$P(C) = \frac{1}{N}\sum_{i=1}^{N} T_i(C)$$

and $$P(W_n|C) = \frac{\Sigma\, T(W_i|C)}{\Sigma\, T_i(C)}$$

Event Pattern Analysis

The feature of Event Pattern Analysis goal is to highlight events that share a similar pattern. There are many ways to define a pattern in this context, but one exemplary embodiment will consider two different approaches: Repeated Event Identification and Event Similarity.

Repeated Event Identification

This feature looks for repeated events in the historic data base that have the same place and type. It is goal is to find repeated offenders rather simple crimes that may escalate in their consequences, like domestic violence, etc.

For this Notification, we can use the same technique of the event match with a fuzzy-logic comparison of the events, with a very tight tolerance in the distance and the same type, and do not regard the date in the analysis.

Event Similarity

This is the technology involved in assessing short texts and evaluating their distance, or in other words, their similarity. Two texts may be considered similar if they are referred to the same event. This definition can consider simply the syntax of the text (word and terms used in the text) or the semantics (meaning) of the words and the text. This will be explored by NLP—Natural Language Processing techniques to find patterns while comparing events and social posts. One exemplary embodiment defines a cosine text similarity as a value between 0 (no similarity) and 1 (very similar, or equivalent).

Distance also can be considered when dealing with the fuzzy logic comparisons, like near, far, close to, sooner, later than, etc. For example, given two sets of features:

$$x_i=(x_{i1}, x_{i2} \ldots x_{id}) \text{ and } x_j=(x_{j1}, x_{j2}, \ldots x_{jd})$$

where d is the dimensionality of the feature set, the relationship between these two sets can be evaluated as a distance. A distance can be used to measure continuous features, while qualitative variables can use the concept of similarity.

A generic distance formula is known as Minkowski distance, and is expressed by:

$$D_{ij} = \left( \sum_{l=1}^{d} |x_{il}| - |x_{jl}|^n \right)^{1/n}$$

If n=1 the formula represents the Manhattan or "city block" distance, while if n=2 the formula represents the Euclidean distance, as shown in the table below (from http://www.molmine.com/magma/analysis/distance.htm):

| | |
|---|---|
| Euclidean | $d(x, y) = \sqrt{\Sigma(x_i - y_i)^2}$ |
| Squared Euclidean | $d(x, y) = \Sigma(x_i - y_i)^2$ |
| Manhattan | $d(x, y) = \Sigma|(x_i - y_i)|$ |
| Canberra | $d(x, y) = \Sigma \dfrac{|x_i - y_i|}{|x_i + y_i|}$ |
| Chebychev | $d(x, y) = \max(|(x_i - y_i)|)$ |
| Bray Curtis | $d(x, y) = \dfrac{\Sigma |x_i - y_i|}{\Sigma x_i + y_i}$ |
| Cosine Correlation | $d(x, y) = \dfrac{\Sigma (x_i y_i)}{\sqrt{\Sigma (x_i)^2 \Sigma (y_i)^2}}$ |
| Pearson Correlation | $d(x, y) = \dfrac{\Sigma (x_i - \bar{x})(y_i - \bar{y})}{\sqrt{\Sigma (y_i - \bar{y})^2} \sqrt{\Sigma (y_i - \bar{y})^2}}$ |
| Uncentered Peason Correlation | $d(x, y) = \dfrac{\Sigma x_i y_i}{\sqrt{\Sigma (y_i - \bar{y})^2} \sqrt{\Sigma (y_i - \bar{y})^2}}$ |
| Euclidean Nullweighted | Same as Euclidean, but only the indexes where both x and y have a value (not NULL) are used, and the result is weighted by the number of values calculated. Nulls must be replaced by the missing value calculator (in dataloader). |

Cosine Text Similarity

To define one short text description (d1) to another short description (d2) we can use some analogies to vector distance. A popular measure is the Euclidean distance, defined by the root of the square differences between the two vectors:

$$\text{Euclidean}(d_1, d_2) = \sqrt{(d_2-d_1) \cdot (d_2-d_1)}$$

Where A·B considers the inner product of the two vectors, giving the measure a unique real value. To compare two measures, we need to define a scale. Another very used measure among vectors that has its own scale is the cosine of the angle of two vectors, that may be expressed by:

$$\text{Cos}(d_1, d_2) = \frac{d_1 \cdot d_2}{\sqrt{d_2 \cdot d_{12}} \sqrt{d_1 \cdot d_1}}$$

Two vectors are close to each other if the cos is close to 1 and they are apart if cos is zero, this gives a nice approach to a percentage of similarity. Considering each short text description as a sequence of words:

$$d=\{w_1, w_2, \ldots, w_N\}$$

then $$d_1=\{w_{11}, w_{12}, \ldots, w_{1N}\}$$

$$d_2=\{w_{211} w_{22}, \ldots, w_{2N}\}$$

and $$d_1 \cdot d_2 = d_1 \cdot d_2 = +w_{12}w_{22}+ \ldots +w_{1N}w_{2N}$$

or $$d_1 \cdot d_2 = \sum_{i=1}^{N} (w_{1i} w_{2i})$$

As this equation shows, the more words they share, the closer they are. But not words can be considered equally important in the descriptions. In a police description, for example, the characteristics of the suspect is more important than the fact that was an armed robbery or the list of stolen items. To consider this difference among the words, one exemplary embodiment uses the TF-IDF algorithm as a weight ($f_i$) in this summation, as follows:

$$d_1 \cdot d_2 = \sum_{i=1}^{N} (f_i w_{1i} w_{2i})$$

TF-IDF Algorithm

TF-IDF stands for term frequency-inverted document frequency. This index tends to filter uncommon terms from a short text:

$$tfidf(w,d,D)=tf(w,d) \cdot idf(w,D)$$

where:
- tf(w,d)—indicates the frequency of the word w in the document; and
- idf(w,D)—measures the inverse term (w) frequency in the whole collection of documents (D).

The value of tf(w,d) is zero (if the word does not appear in the document) or greater than 1, and we can assume 1 and consider every word individually. The use of a square root and a logarithmic function helps to increase the rate among the distribution and promote the less frequent terms:

$$idf(w, D) = \log\left(1.0 + \left(\frac{ND}{Nw}\right)\right)$$

Exemplary Intelligent Agents

The inventors contemplate various types of Intelligent Agents that can be incorporated in the system, likely with different Intelligent Agents and different Intelligent Agent types deployed for different customers. The agent hoster generally allows Intelligent Agents to be added, removed, and replaced as needed or desired. Without limitation, the following are some exemplary Intelligent Agents contemplated by the inventors.

A StatisticAgent can be included to monitor the operational variables of the system and notify of outliers. An outlier is a variable which value exceeds an expected limit. In an exemplary embodiment, the expected value is determined by measuring the variable during a training period when the allowed limit is predefined. The main impetus for monitoring operational variables is that normal operation should be expected to remain substantially stable, i.e., the expected values of the monitored variables should remain within acceptable limits, so when a variable crosses this limit, some abnormality may be happening in the operation and thus it must be alarmed. The more stable the operation, the more important deviation alarms are, as they will probably reflect a non-expected occurrence in the operation. If the operation is very volatile, i.e. there is not much recurrence of events, the deviation alarms have a minor relevance, as there it is natural for this operation to change the number of occurrences without an external reason.

For purposes of the following discussion, the following terms are defined:

Categorical variables are operational variables that are expressed in terms of a category. For example, the event type is a categorical variable. The monitoring of a categorical variable is done by counting the variable during a period and observing the frequency of this category among all categories.

Continuous variables are operational variable expressed by a real value. For example, the Time to Arrive at an event in minutes. The monitoring of a continuous variable can also be done by estimating the average value during a period.

Outlier is a measurement of a monitored variable that is beyond some expected limit. The expected value is determined by measuring the variable during a training period, and the allowed limit if predefined.

Training is the period during which the variable is monitored to define the expected values for each category (if it is categorical), or the average value (if it is continuous).

Checking—Period, after the training period, that the variable is verified for outliers. This period can be repeated indefinitely.

Threshold is the limit value, expressed as a percentage deviation, that is a variable is considered an outlier, e.g., a threshold of 50% means that if the frequency during checking exceeds 50% of the expected value, we have an outlier.

Support is the minimum frequency of a variable that is considered statistically relevant. If a variable frequency is below the support value, the outlier is not discharged. The use of a support value is to avoid estimating statistics from very infrequent events.

In an exemplary embodiment, variables are classified into two types: categorical variables (that has the value defined in categories, like the event type), and continuous variables (that the values range from a minimum to a maximum continuously, like the time to arrive at the event). Each variable will be managed differently. The categorical statistic will be measured by the number of events per unit of time, e.g., measured in hours. It should be noted that continuous variables can be monitored as categorical, e.g., by organizing them into categories.

In an exemplary embodiment, each variable is defined by the following data structure:

| Parameter | Description | Typical Value |
| --- | --- | --- |
| Name | Name of the available variables | TYP |
| Description | Description of the Monitored Variable | Hourly Event Type |
| DTS Start | Initial date and time stamp for monitoring | $1^{st}$ Event DTS |
| Learning Period | Initial period for creating a baseline | Week (168) |
| Checking Period | Repeated Checking period | Hour (24) |
| Threshold | % difference that configures an outlier | 50% (0.5) |
| Support | Frequency where we consider relevant to monitor | 2% (0.02) |
| Continuously Learning | If the Agent should learn after every checking period or keep the initial baseline | Yes |

The Periods can be standard as Hour, Shift, Day, Week, Month and any other time expressed in time, as follows:

| Period | Hours |
| --- | --- |
| Hour | 1 |
| Shift | 8 |
| Day | 24 |
| Week | 168 |
| Month | 720 (approx.) |

The following are Monitored Variables of the CAD Operation in an exemplary embodiment:

| Var. Code | Variable Type | Variable Description | Typical Checking Period |
| --- | --- | --- | --- |
| TYPE | Categorical | Event Type | Day |
| STY | Categorical | Event Subtype | |
| HOD | Categorical | Hour of the Day | Day |
| DWO | Categorical | Day of the Week | Week |

-continued

| Var. Code | Variable Type | Variable Description | Typical Checking Period |
|---|---|---|---|
| DRG | Categorical | Dispatch Group | Day |
| ETA | Continuous | Time to Arrive at the event | Less than a Day |

In an exemplary embodiment, the StatisticAgent has three major classes, as follows:

StatisticAgent—main class that stores a list of Categorical Variables for monitoring and receives events continuously, parses the monitored variables, and passes them to Monitored variables. When the variables identify outliers, they issue notifications that are returned to the Agent.

Categorical Variable—its main concern is to monitor a variable. It identifies automatically each category and monitor its occurrences. During an initial learning phase, the input is used to train a model that defines a baseline that is the expected value, that will be checked against the monitored variable that is checked periodically.

CategoricalVariableStats—this class holds the list of categories and the frequencies.

Figure 17:
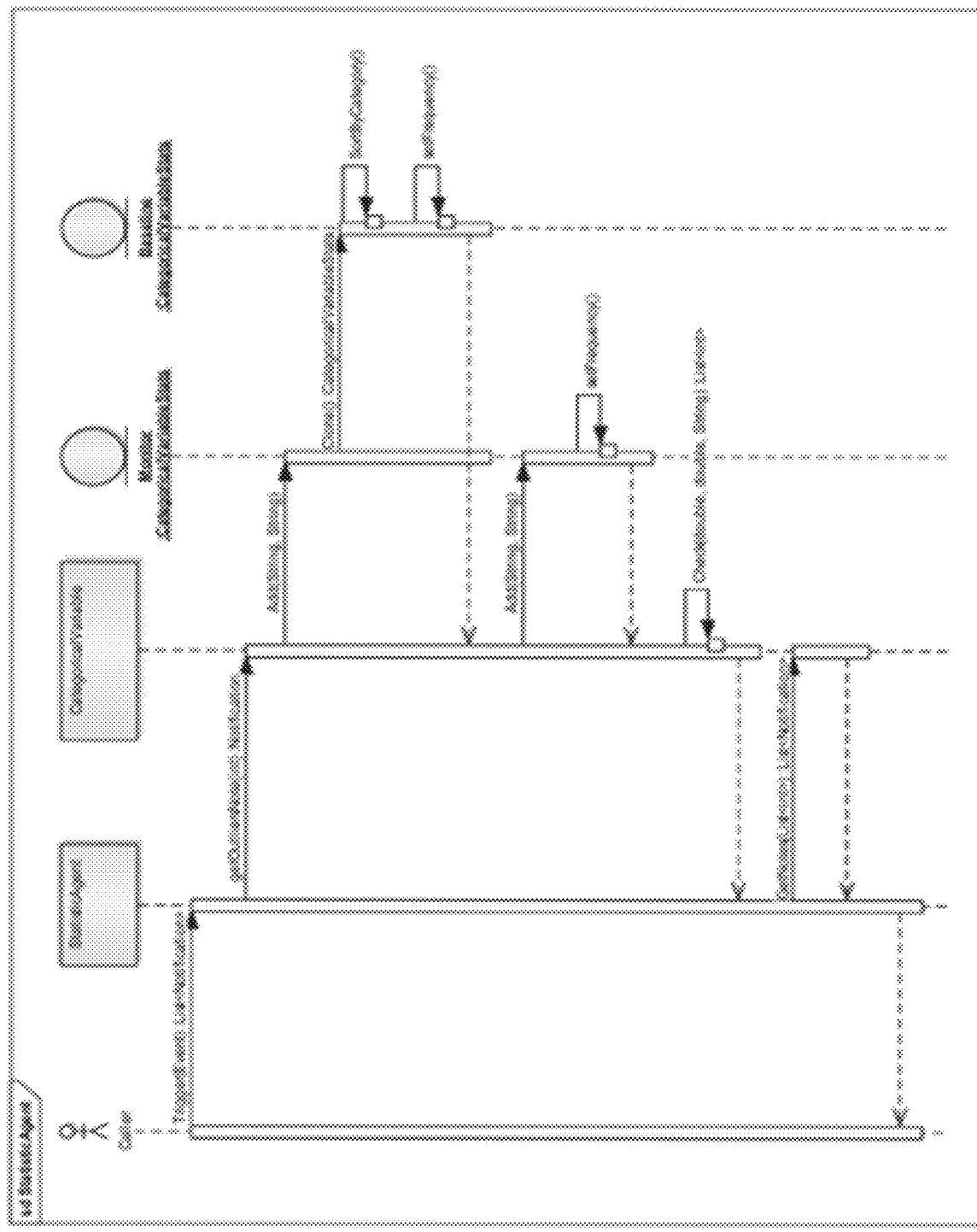
FIG. 17 depicts the main workflow for the StatisticAgent in accordance with an exemplary embodiment.

In an exemplary embodiment, the agent is set up by adding a list of monitored categorial variables, suggested as the table of monitored categorical variables of CAD operation. After this setup, the agent follows continuously the main workflow for every event if receives. FIG. 17 depicts the main workflow for the StatisticAgent in accordance with an exemplary embodiment. First, the external Caller inputs sequentially a series of events and gets as a return a list of Notifications (Method—Trigger). Then, the Agent extracts from the Event the features for each categorical Variable and sends the feature data to the corresponding CategorialVariable that monitors it, requesting from them a list of possible outliers (Method—getOutliersNote). During the training phase, the Monitor stores the feature and calculates the frequency for each variable (Method—Monitor.Add). At the end of the training phase, the Monitor is cloned to a Baseline (Method—Monitor.Close). The Baseline is sorted and the frequency is calculated (Baseline.SorteByCategory, Baseline.setFrequency). During each Checking cycle, the feature is stored in the Monitor (Method—Monitor.Add). At the end of a Checking cycle, the Monitor is compared with the Baseline with via a Check method and a set of outliers can be issued (Method—Check). The Outliers are transformed into Notifications at the end and the Notifications are returned to the Caller, as an output (Method—GetNotes).

Figures 18, 19:
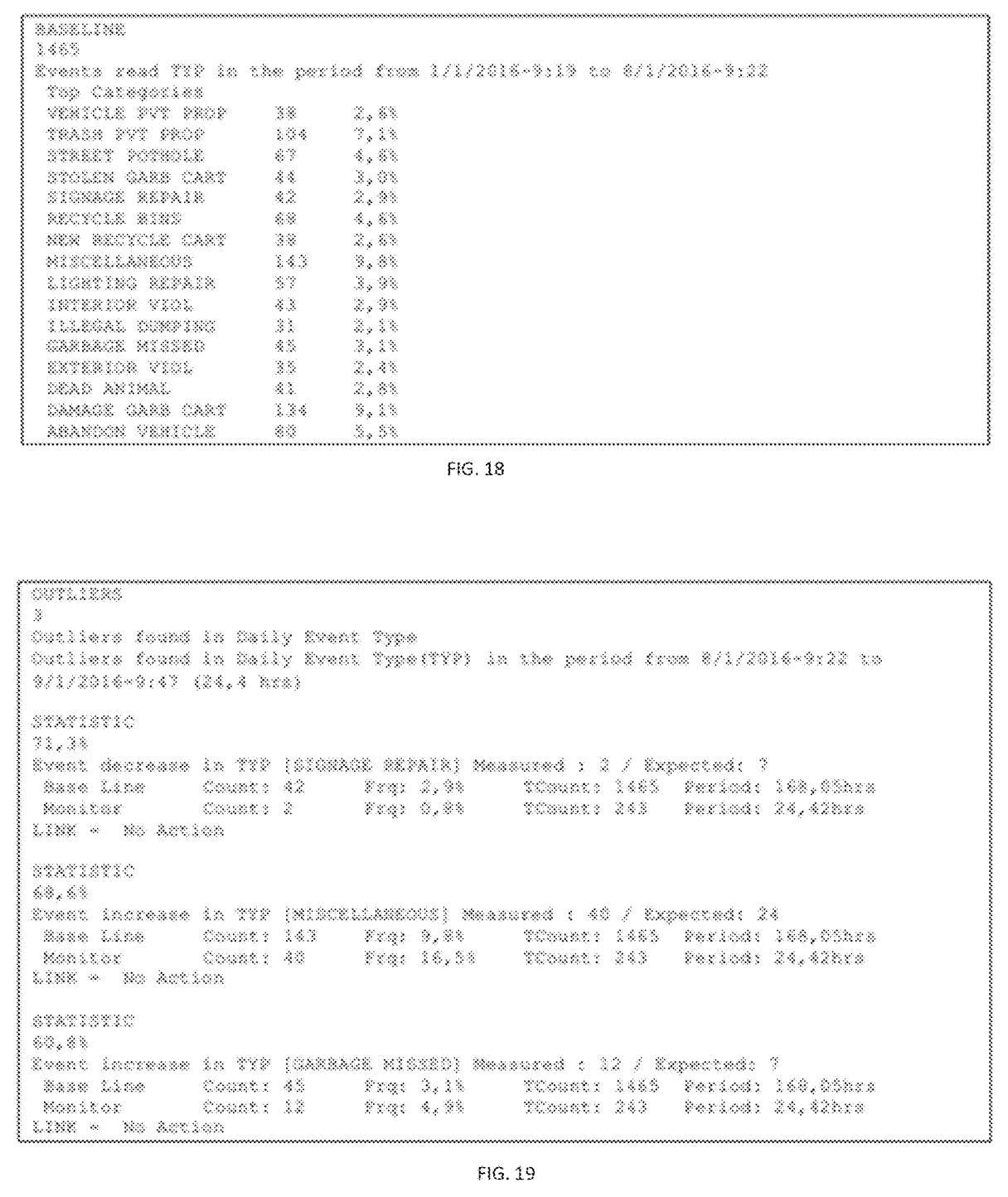

FIG. 18 shows an example baseline of variables.

FIG. 19 shows an example of an outlier notification with statistics.

Figures 20, 21:
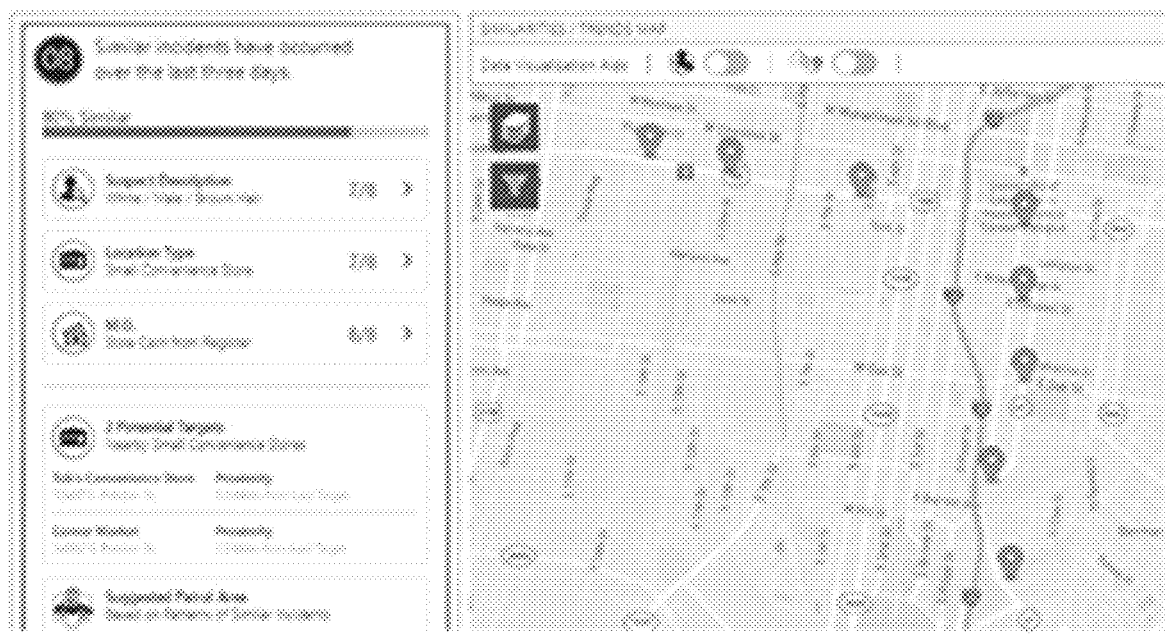
FIG. 20 shows an example updated baseline for the above example.
FIG. 21 shows an example of related events shown in a map, including the ability of the user to display event information such as to identify the original event and related events.

In this example, there was a 68% increase of MISCELLANEOUS events (expected 24 events and was registered 40 events), and a 60.8% increase in GARBAGE MISSES (expected 7 and measured 12) in this period (24 hours). There also was a 71.3% decrease in SIGNAGE REPAIR in the same period. An updated Baseline incorporating this week's data is generated, as the algorithm is continuously learning. FIG. 20 shows an example updated baseline for the above example.

The following are some examples of main statistical notifications:

| Example | Additional Information |
|---|---|
| 10 Outliers found in the Hour = 16h00 | Each outlier notification |
| 4 Outliers found last Week of 20/03/2019 | Each outlier notification |
| 3 Outliers found in the Month of March/2019. | Each outlier notification |

The following are some examples of outlier notifications:

| Example | Additional Information |
|---|---|
| 45% Car accident event type exceed exceeds the expected frequency observed in the last day. | List of related events in the map Statistic Graph |
| 60% increase In Domestic violence-event type in the last month | List of related events in the map Statistic Graph |

A Statistic Graph may be presented to the user. A Statistic Graph displays, in graph form, the outliers of a statistical analysis. In an exemplary embodiment, the graph shows the expected value and the actual value and identifies why this is an outlier. baseline graph may be available to show the expected values in a separate Notification, once the learning phase is done. If the number of items is very large, a limited number of items can be displayed, e.g., the top 20% or by limiting the number of bars.

A RuleAgent can be included to monitor some user-defined rules involving operational variables and issue notifications when the rules are verified. In an exemplary embodiment, the list of available operational variables is pre-defined and may include the statistical monitored variables (see StatisticAgent above). The limits and thresholds can be fixed values or can be combinations with system variables. Rules as well as rule-related notifications are defined by the user. In an exemplary embodiment, a rule is generally defined as follows:
if (logical expression) then issue a notification
The following is an example rule and notification configuration:
If ((Number of Robberies in the last Hour)>5)
Then ("More than five robberies in the last Hour, warn the chief of Police")
The following are some examples of rule warning notifications:

| Example | Additional Information |
|---|---|
| 5 rules checked in the last events | Rule Individual Notification |
| 2 rules checked in the last hour | Rule Individual Notification |

The following are some examples of Rule Individual Notifications:

| Example |
|---|
| 3 Armed-robberies have occurred in the last 4 hours with a proximity to each other 50 ft is the distance of this event to a public school. Consider evacuation procedure. |

A PatternAgent can be included to identify a pre-defined pattern expression in the event description (e.g., type, description, remarks, comments, location) and to issue a Notification to the users with an associated action along with it. A pattern expression describes a defined configuration of numbers, letters, and/or symbols, e.g., a regular expression. The action can incorporate the identified pattern in it, e.g., a URL/Link or an to API call that relates to the external action. The PatternAgent works on a list of Named Patterns with the associated regular expression and the action associated with it. In an exemplary embodiment, a set of pre-defined expressions is provided, but users are free to create their own, using the Regular Expression syntax. There is a regular expression that represents phone numbers, emails, hashtags, plate numbers, social security numbers, etc.

The following are some examples of Pattern Warning Notifications:

| Example | Additional Information |
| --- | --- |
| 5 patterns found in the event C2344-AS | Individual Pattern Notification |
| 2 patterns found in the event 2340-ABC | Individual Pattern Notification |

The following are some examples of Individual Pattern Notifications:

| Example | Additional Information |
| --- | --- |
| License plate id [NNN-NNNNN] identified in event descriptions. Check it with DMV? | Additional information can include a vehicle database information report |
| Phone number [XXX-XXXXXX] identified in the Event Description. | Additional information can include an option for the user to call the phone number |

A KeywordAgent can be included to detect keywords in the event description and alerts users on actions related to the keywords. In an exemplary embodiment, the keyword must be detected literally. Every word on the keyword must be present and no typos are allowed. The words may appear in a different order and they still are considered. The words are not case-sensitive. Partial words are also considered, so, for example, the keyword "Manifest" would match the word "Manifestation" in the event description by the keyword "Manifestation" would not match the word "Manifest" in the event description. Typos and synonyms are not considered at this phase, although alternative embodiments could consider typos and synonyms, e.g., using a simple word proximity measure to catch typos. Synonyms could be used with natural language processing (NLP) tools already available.

The following is an example of matching and non-matching keywords:
Key Word: Main Square Manifestation
Action: Warn the mayor (phone 2034-0293)
Matches: Manifestation on the Main Square
  Main Manifestation Square
  There is no manifestation on the main square.
No Match: Huge demonstration on the main square
  Central square manifestation
  2000 people are manifesting on the main square The following are some examples of keyword warning notifications:

| Example | Additional Information |
| --- | --- |
| 5 keywords found in the event XYS-002 | Individual Keyword Notification |
| 3 keywords found in the event ABC-2340 | Individual Keyword Notification |
| 1 keyword found in the event C32450 | Individual Keyword Notification |
| The following keywords [keyword list] were recently reported in the event [EventID]. Action required: Please inform Detective Joe (435-09029) | |

The following is an example of an Individual Keyword Notification:

The following keywords [keyword list] were recently reported in the event [EventID]. Action required: Please inform Detective Joe (435-09029)

An EventMatchAgent can be included to identify similar events among the current open events even if the description (e.g., event type, location, date) is slightly different. In an exemplary embodiment, the comparison uses a fuzzy logic approach that can accommodate some variations and therefore identify some minor variations. Fuzzy logic considers terms like "close" and "near" into the comparison. It translates these "fuzzy" terms into a logic of comparison. In an exemplary embodiment, a fuzzy logic tolerance parameter [Fuzzy] is defined, e.g., 25% by default.

The following is an example of a Matching Events Warning Notification:

| Example | Additional Information |
| --- | --- |
| 3 Events share the same characteristics with event C234509 | Related events on the Map |

FIG. 21 shows an example of related events shown in a map, including the ability of the user to display event information such as to identify the original event and related events.

A CorrelationAgent can be included to analyze a pair of variables and their possible correlation to the occurrence of events. A notification is issued when there is some probability that the combination of these variables may be contributing to the occurrence of the event (note that this is a correlation, not necessarily causation). In an exemplary embodiment, the unit for estimating the statistic is the number of events per unit of time measured in hours, and the variables are measured by counting the events, so every new event is counted and measured to define the expected values and the outliers. In an exemplary embodiment, the technique used is called "a priori" analysis and the following are defined for the CorrelationAgent: List of Variable1, Variable2, Checking Period, Threshold, and Support. Variable1 and Variable2 are operational Variables to be analyzed. Checking is the Period, after the training period, that the variable is verified for outliers. Threshold is the limit probability that is considered an outlier, e.g., 50% means that if the frequency during checking exceeds 50% of the expected value, there is an outlier. Support is the minimum frequency that is considered relevant. If a variable frequency is below the support value, the outlier is not measured. Lift is the percent of increase on the expected value. The lift must be higher than the Threshold for the correlation to be considered.

The following are some examples of Correlational Warning Notifications:

| Example | Additional Information |
|---|---|
| 10 Correlations found in the last week. | Individual Correlation Notification |
| 4 correlations found in the last shift | Individual Correlation Notification |

The following are some examples of Individual Correlation Notifications:

| | |
|---|---|
| 40% more Drug Related events Type associated with Sunday reported in last week | Map of the events that are correlated. Graphic of the distribution of Correlation |
| 110% more Overdose event Type associated with the Downtown Region in the last Month | Map of the events that are correlated. Graphic of the distribution of Correlation |

A RepeatedEventAgent (sometimes referred to as a RecurrentAgent) can be included to identify events that have happened within a specified time span [TSPAN, e.g., TSPAN=180 for 6 months or TSPAN=365 for 1 year] in the past (perhaps repeatedly) and to warn the dispatcher that this may be a recurrent event. Sometimes, a simple event (e.g., a domestic disturbance) can scale to a larger event due to its recurrence, and in such cases it sometimes is important to warn field personnel. Sometimes, dispatchers like to assign units that may have had previous knowledge of an incident. Reminding that an event had happened in the past may be useful for assigning a unit to respond. This agent needs access to past events that may be stored in the CAD system. In an exemplary embodiment, the search is done by location and event type. In an exemplary embodiment, the RepeatedEventAgent considers the exact location (e.g., same home address) as opposed to approximated ones, although alternative embodiments could broaden the search (e.g., same neighborhood).

The following is an example Repeated Events Warning Notification:

| Example | Additional Information |
|---|---|
| The event 23A-ESR has happened 4 times in the past year | List of events and event data |

A SimilarityAgent can be included to find events that are similar to the current event (e.g., a new event entered into the system) based on their description (e.g., type, description, remarks, comments, location, etc.). Two similar events share relevant information, although they may not have the same type, date or location. In an exemplary embodiment, this similarity index takes into account the words used in the description and remarks of the event. In an exemplary embodiment, the algorithm values less frequently used words so when they appear in different events, the similarity index grows. The agent learns by analyzing the frequency of the words used in a corpus of events, and it is constantly learning and updating the list of words and creating a dictionary model. In an exemplary embodiment, no typo correction or synonyms are considered in this phase, although alternative embodiments could consider typos and synonyms. Clusters can help find patterns in geographic information and in other forms of data. Embodiments may find patterns in the geographical distribution and include other information in the analysis. Clustering techniques can help find "clusters" of similar events. A text/keyword analysis is used to infer potentially unobvious relationships between events. Through a dashboard/monitor (or OnCall notifications), the system can display potential linked events and other information that may be relevant to the user. The SimilarityAgent could be extended for a Major Event Prediction module/workflow when a pattern becomes frequent.

In an exemplary embodiment, the following are defined for the SimilarityAgent: Similarity Threshold, Rejected Word List, Tokenizer List, and Rejected Numbers. Similarity Threshold [similarity] is an index from 0 to 1 above which the two descriptions are considered similar, e.g., default [similarity=0.8]=80%). Rejected Word List (File) is a list of words that are not considered in the analysis, usually words that are very common and without a relevant information. Tokenizer List is a list of symbols that are used as word separators. Reject Numbers (yes/no) defines whether or not to reject all numbers in the description (default=yes).

In an exemplary embodiment, the SimilarityAgent is based on a combination of tf-idf (e.g., https://en.wikipedia.org/wiki/Tf%E2%80%93idf) and a cosine similarity of the two events (e.g., https://en.wikipedia.org/wiki/Cosine_similarny), where the frequency of words in the event description are analyzed, less-frequently used words are considered to be more important, and then cosine similarity is used to determine the ultimate similarity score. In an exemplary embodiment, users may tag specific keywords, e.g., locations of interest, people, places, etc. If these keywords appear, a notification is issued. Embodiments also can look for similarities in tweets and other social media text messages. Search criteria (e.g., a hashtag or location) can be used to select such social media text messages for analysis.

The following are some examples of Similarities Warning Notifications:

| Example | Additional Information |
|---|---|
| 5 events are similar to the event [EventID] | Individual Similarity Notification |
| 1 events are similar to the event [EventID] | Individual Similarity |

The following is an example Individual Similarity Notification:

| Example | Additional Information |
|---|---|
| 80% of similarity between these events, possible correlation. | Similar events and data report |

Figure 22:
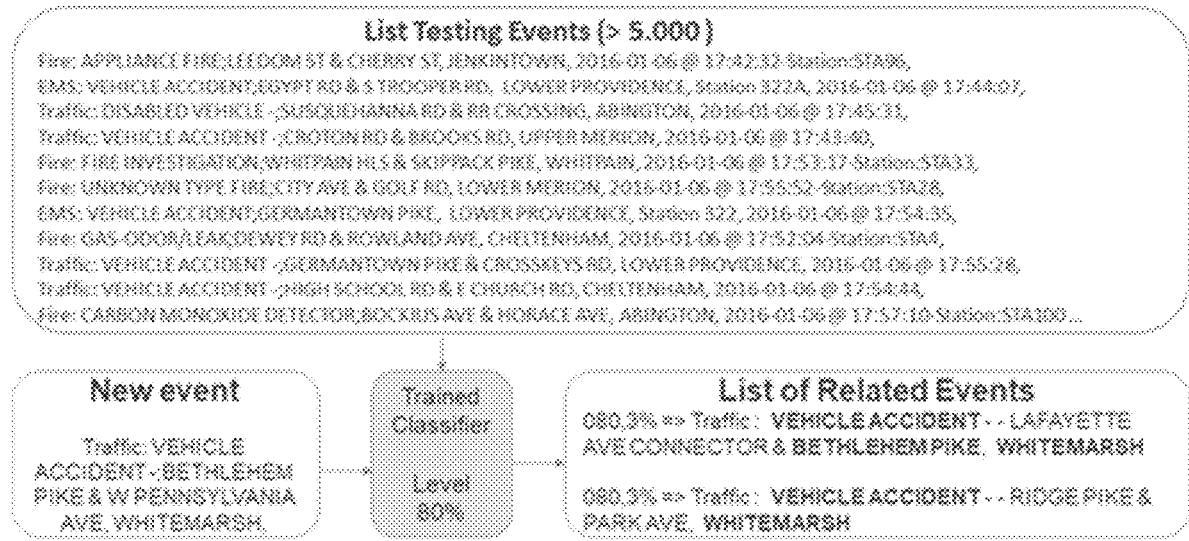
FIG. 22 shows a more detailed example of similarity analysis in accordance with an exemplary embodiment.

FIG. 22 shows a more detailed example of similarity analysis in accordance with an exemplary embodiment. Here, the SimilarityAgent includes a trained classifier that compares the details of a new event to details of past events (shown in the figure as "List Testing Events" obtained from https://data.louisvilleky.gov/) and identifies related events that are considered by the trained classifier to have a similarity of at least 80%.

An EventClassificationAgent can be included to define event agency, type, priority or urgency based on the event description and other available data. Here, an to automatic classifier is trained with historical data (e.g., a pre-classified set of events). Feedback can be used by the EventClassificationAgent to learn from mistakes and improve classification with time. Without limitation, some exemplary applications supported by the EventClassificationAgent include speeding up the call taking process, selecting an agency in a multiagency site, defining urgency on incoming messages, detecting sentiment on incoming messages, and Automatic Event Creation (pre-creation).

Figure 23:
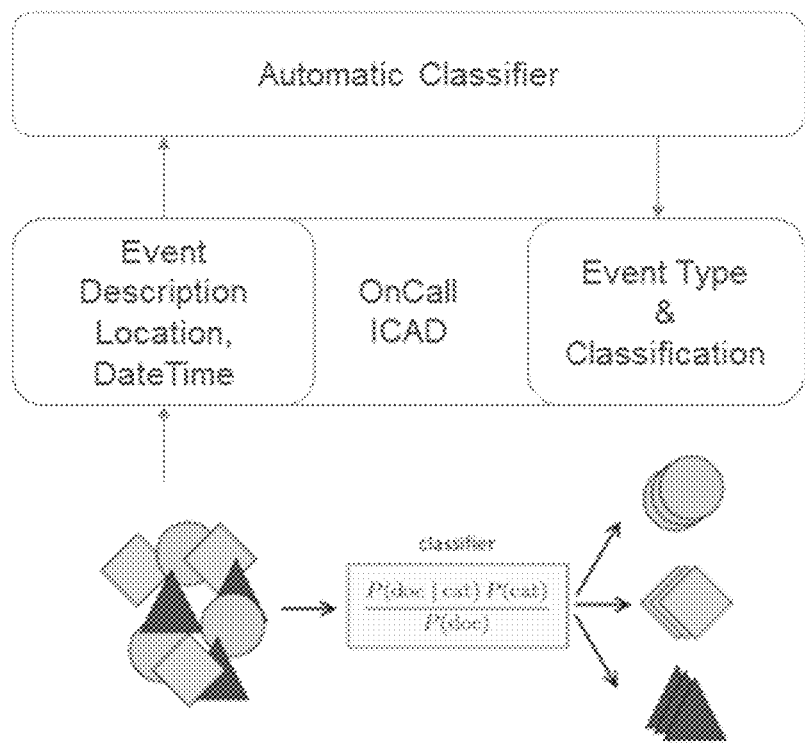
FIG. 23 shows the architecture of the EventClassificationAgent in accordance with an exemplary embodiment.

FIG. 23 shows the architecture of the EventClassificationAgent in accordance with an exemplary embodiment. This exemplary embodiment uses the following Bayesian Classifier (conditional probability):

$$P(A|B)=P(B|A)P(A)/P(B)\text{—Bayes Theorem}$$

More specification, Event Classification is based on the following:
Probability of a Class (C) given a Text (T)
Probability of a Class (C) given the Words (Wi) of the Text (T)

$$P(C|T)=P(T|C)P(T)/P(C)$$

$$P(C|T)=P(W1|C)*P(W2|C)*\ldots P(T)/P(C)$$

Figure 24:
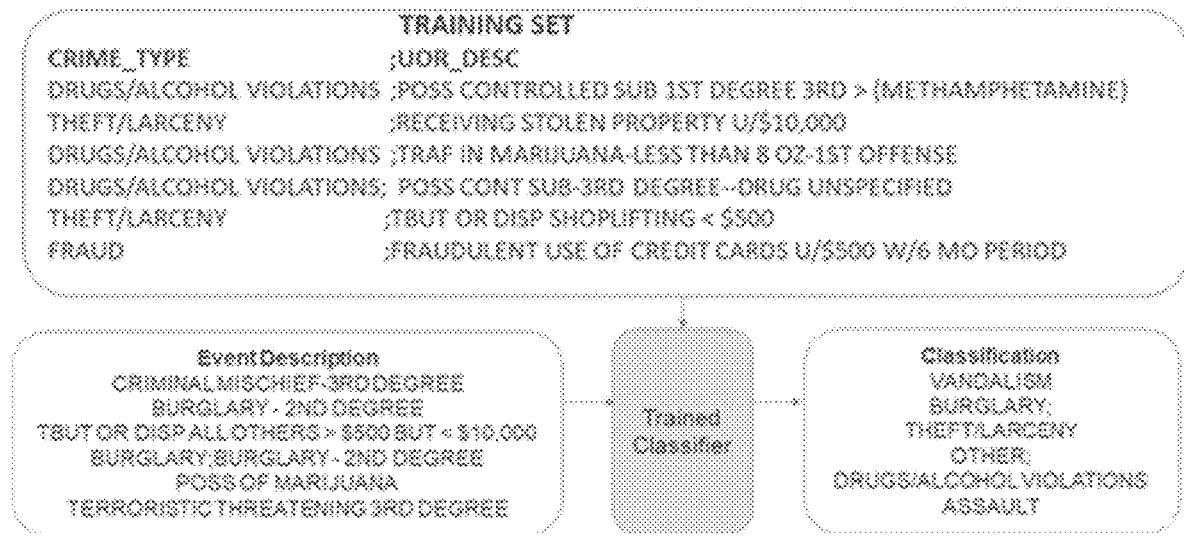
FIG. 24 shows a detailed example of event classification.
Figure 25:
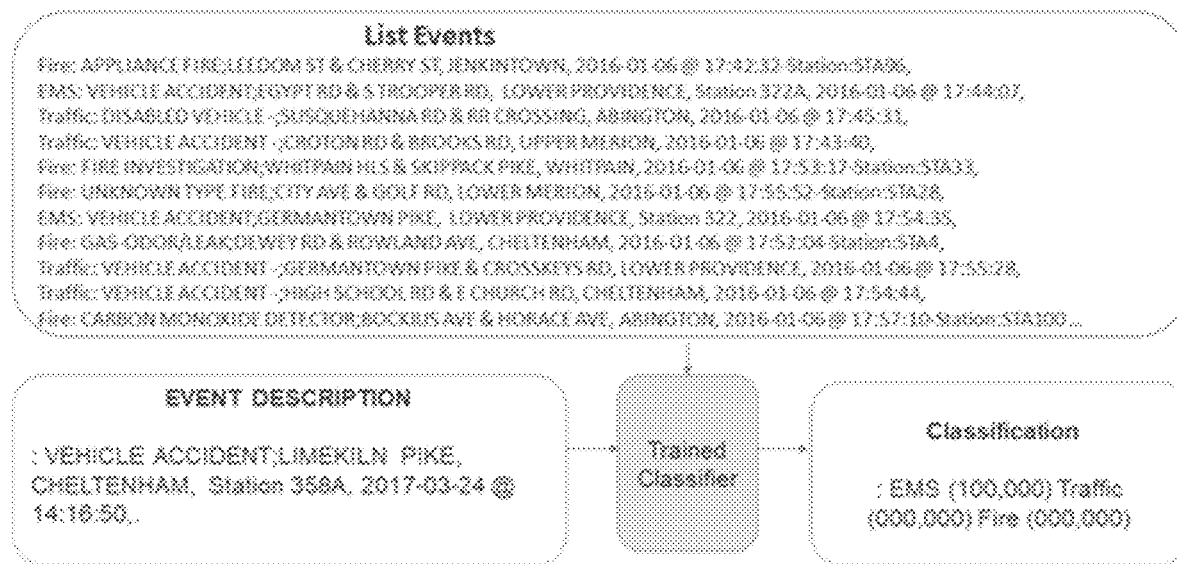
FIG. 25 shows another example of event classification.
Figure 26:
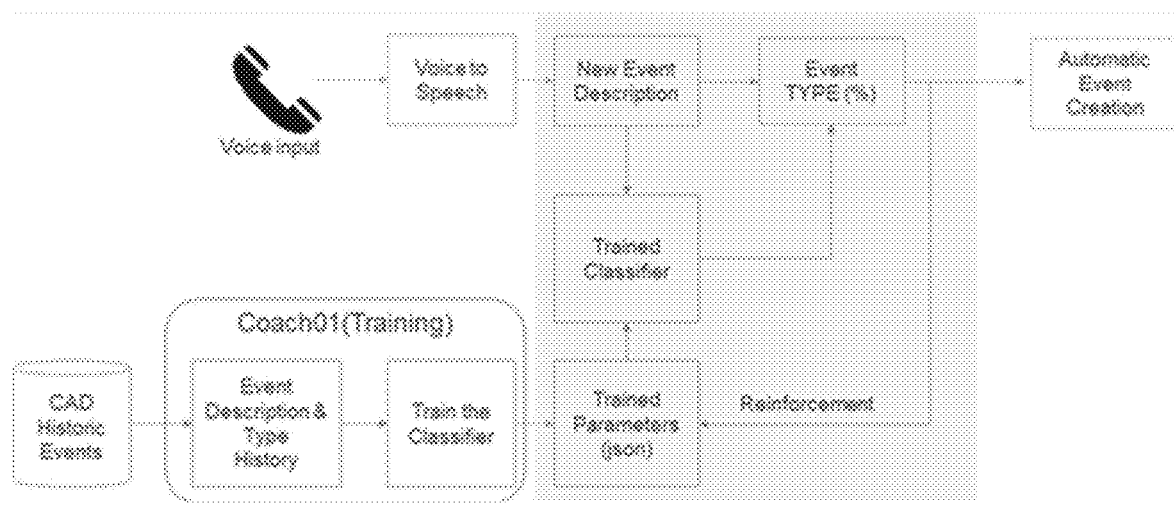
FIG. 26 shows the architecture of voice-to-text integration in accordance with an exemplary embodiment.

Training=estimate the P(Wi|C)=create a bag of words for each class.
Testing=calculate P(C|T) for each class, and sort the result by the probability.
Constant Learning=review the bag of words and statistics.
FIG. 24 shows a detailed example of event classification. FIG. 25 shows another example of event classification. The EventClassificationAgent can include voice-to-text integration for automatically classifying events received through a voice-based system. FIG. 26 shows the architecture of voice-to-text integration in accordance with an exemplary embodiment.

A ClusteringAnalysisAgent can be included to identify clusters of events. Without limitation, some exemplary applications include optimal positioning of service centers (e.g., help place service centers to improve response time; can be applied to patrol cars, rescue and emergency vehicles; minimize the distance between events and the service centers), finding patterns among the events (e.g., find regions in the data where event density has a given characteristic; identify and evaluate the spread of events on the map, locate regions where a type of event is more prevalent), and monitoring of endemic phenomena (e.g., diseases like Dengue and Zika are usually related to presence of standing water, and the constant monitoring of the formation of a cluster of events can be an early indicator of this type of endemics).

Figure 27:
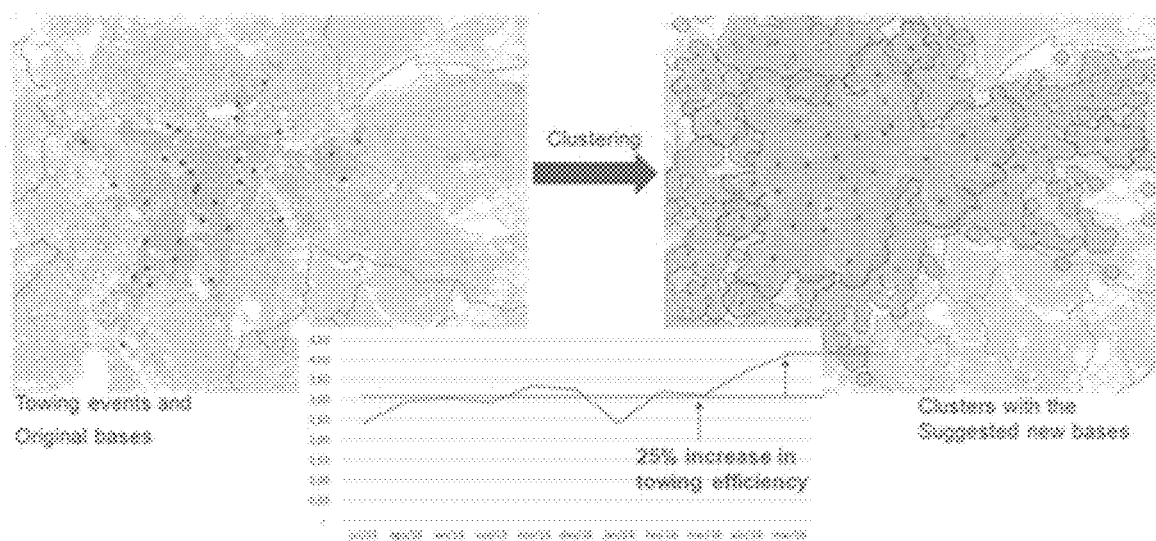
FIG. 27 shows an example of how the ClusteringAnalysisAgent can help identify the best location for placement of tow trucks based on a history of towing events, in accordance with one exemplary embodiment.

FIG. 27 shows an example of how the ClusteringAnalysisAgent can help identify the best location for placement of tow trucks based on a history of towing events.

Similar techniques can be applied to plan EMS, Police units, utilities, fire brigades, maintenance units, and other ICAD-like resources with a similar approach.

A RouteOptimizationAgent can be included to analyze a given set of events and to propose a route to visit the maximum number of events. The Agent can continuously optimize the routes and suggest the best allocation of a particular unit. The dispatcher can accept the proposal and assign the events to a unit manually. Without limitation, route optimization can be used to minimize the route in terms of distance or time (e.g., to save in time on travel), maximize the number of events that fit in a shift (e.g., 6 hours), start and end at a given location (e.g., base station), schedule the events to take an average time to be executed according to the type of the event. Route optimization can consider the time to move from one event to another such as from traffic, if available.

To put the route optimization problem into perspective, suppose there are 30 tasks to do but only 10 can be done. The problem then is how to select the best 10 tasks to be done in a selected order. The number of possibilities=30×29×28×27×26×25×24×23×22×21=109 billion alternatives. Even if it took 0.0001 seconds to evaluate each possibility, it would take 345 years to select the best set of 10. An alternative approach might be to always select the closest one (e.g., could just select the first 10), but that may not result in the best or most important 10 being done. Therefore, an exemplary embodiment applies a genetic algorithm such as discussed herein to select an optimal route. Without limitation, some algorithm considerations include maximizing the importance of the events or its associated income; maximizing the number of executed events if all events are equally important, minimizing the route transportation cost, minimizing the resource costs by using the least expensive resources, scheduling the execution of events to end at or near a given location, limiting the amount of time to execute the events to a given shift, skipping events for which there are not available resources, considering traffic and other information affecting routes, considering fees and service level agreement (SLA), and modeling unit and event type restrictions.

Figure 28:
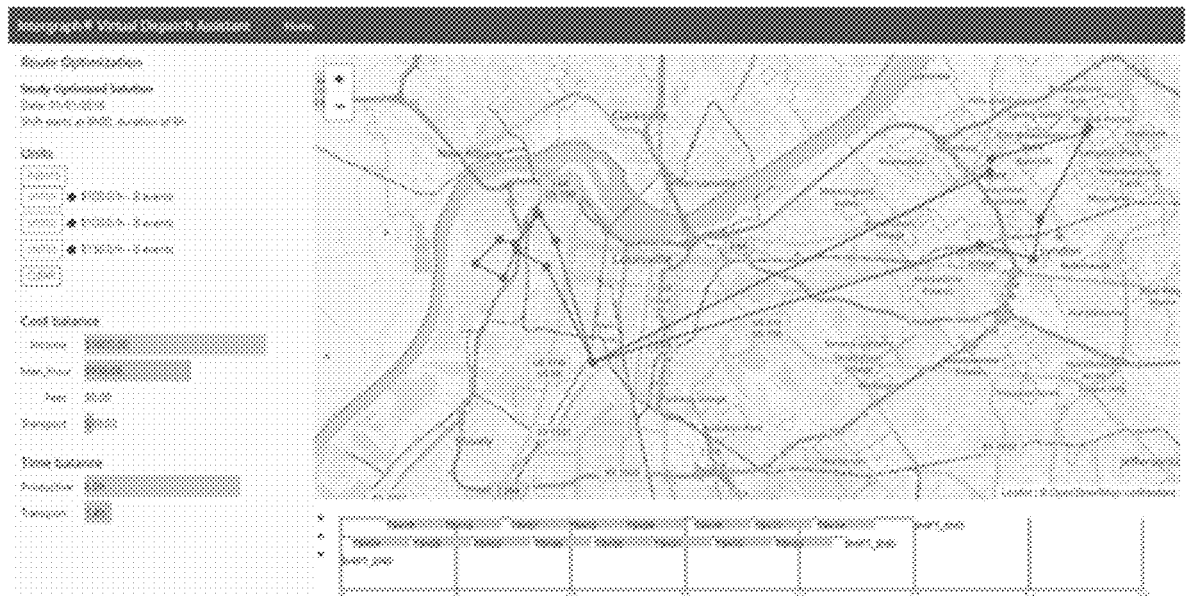
FIG. 28 shows an example graphical user interface screen showing an optimized route, in accordance with one exemplary embodiment.

FIG. 28 shows an example graphical user interface screen showing an optimized route.

Figure 29:
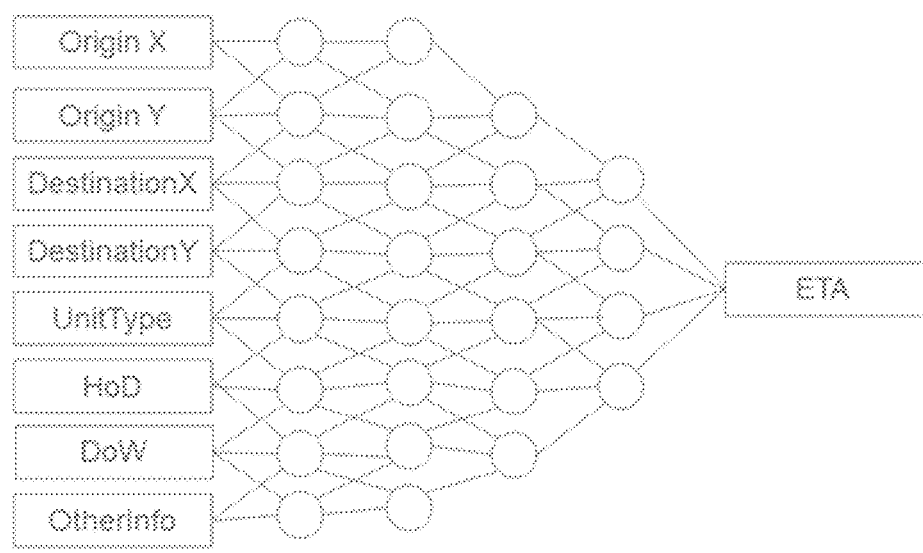
FIG. 29 shows a specialized regression graph for a time estimation agent, in accordance with one exemplary embodiment.

A TimeEstimationAgent can be included to provide time estimates for such things as estimated time of arrival (ETA) and time to complete an event. Time estimation can be based on a specialized regression (e.g., DNN) based on such things as, without limitation, hour of the day, type of event, unit type, day of week, location information (e.g., origin and/or destination), and other available/relevant information (e.g., weather, traffic, etc.), as represented in FIG. 29. Historic events can be used to train the regression service, which can be updated constantly to improve time estimation. The dispatcher is notified with a better time estimation.

An AreaCoverageAgent can be included to make location and relocation suggestions for positioning field units such as for responding quickly to future events based on such things number of available units, maximum time/radius to reach the events, and expected redundancy on coverage. Future events can be predicted based on trends, historic data and external related information. In turn, the locations where units are most likely to be needed can be predicted. Machine learning is used here to help find optimal and near-optimal solutions such as to maximize coverage and redundancy and reduce response times. The AreaCoverageAgent can use clustering analysis, route optimization analysis, and time estimation analysis as part of the location/relocation determinations. Outputs can include station locations and distribution of units among the station locations.

Figure 30:
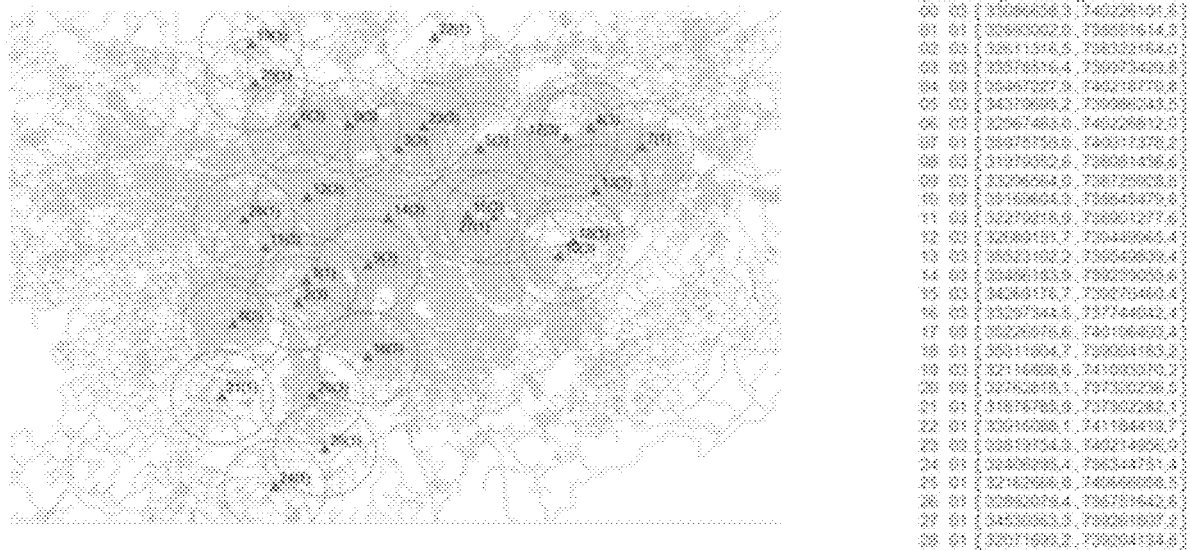
FIG. 30 shows an example graphical user interface screen showing staged locations for various units, in accordance with one exemplary embodiment.

FIG. 30 shows an example graphical user interface screen showing staged locations for various units. The problem can be modeled as a maximum covering location problem, e.g., given a facility associated with a number of units and a radius R covered by the facility, maximize the number of units each event/demand is covered by and minimize the number of units on a facility.

Figure 31:
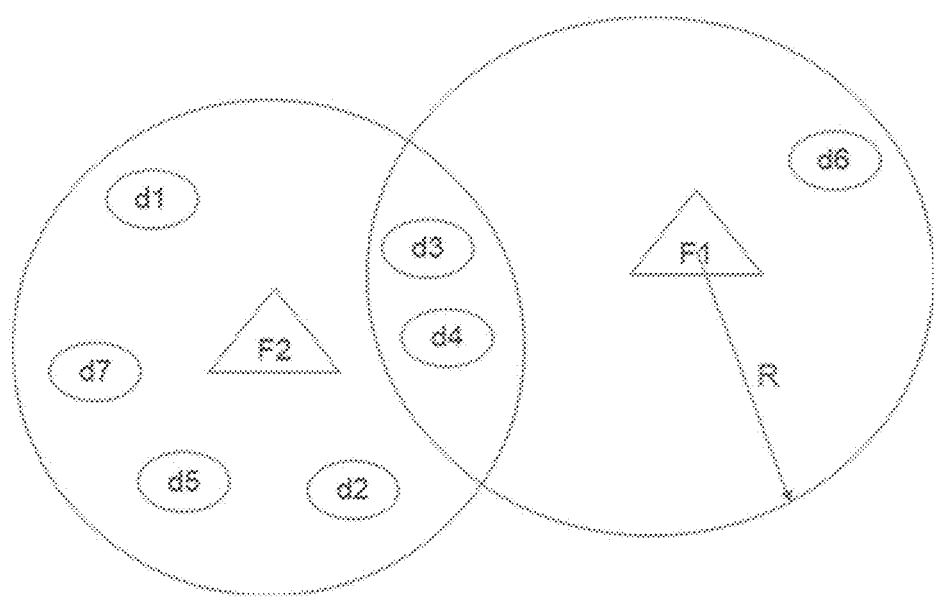
FIG. 31 shows an example coverage criteria definition, in accordance with one exemplary embodiment.

FIG. 31 shows an example coverage criteria definition. In this example, Facility F1 covers demands: d3, d4, d6 (3 demands) with one unit, while Facility F2 covers demands: d1, d2, d3, d4, d5, d7 with two units. In this example, there are different qualities of service, e.g., Events d3 and d4 are covered by 3 units; Events d1, d2, d5, and d7 are covered by 2 units; and Event d6 is covered by 1 unit. Demand can be represented by discrete points in the space. Facilities are located in selected demand points. Each facility can have one or more units. Every demand is covered at least by one unit (except if there are not enough resources). The units are shared by all demands within the reach Radius of that facility. The agent can consider a linear distance (Euler) or Manhattan distance. Reaching a demand means reaching the demand center (not its radius for simplification of the model). This approach tends to place more units where there are more events and limits the number of redundant units to a demand as a quality of service index. The number and location of the facilities are outputs of the algorithm. During location, the algorithm can include/exclude new facilities. During relocation, the number and location of the facilities generally are fixed. Every time a relocation is performed, some improvements in the distribution of the units can be proposed.

In an exemplary embodiment, inputs to the algorithm include Demand=vector of N positions (X, Y, Events), Radius R, Desired Units per Demand (e.g. Max U=3), and Number of Units P. Location outputs from the algorithm can include vector of Facilities that maximizes the demand coverage, Number of units per facility, and Coverage List of the demands. Relocation outputs from the algorithm can include Relocation of units to keep maximum demand coverage and Coverage List of the demands. FIG. 32 shows an example location redundancy detail screen. FIG. 33 shows an example of area coverage relocation.

Other contemplated Intelligent Agents include a safety agent that analyzes data to identify safety issues or improvements (e.g., when or under what conditions a police officer is most likely to be injured), a well-being agent that analyzes personnel data (e.g., work time, rest time, physiological parameters, etc.) to identify exhaustion or stress, a workload agent that analyzes data to identify workload issues or improvements including scheduling, a unit recommendation agent that analyzes data to recommend the most appropriate unit for a given event, natural language and social stream analysis agents to generate context-based notifications or provide inputs to other agents, predictive policing agents that analyze data to identify potential criminal activity and make recommendations for proactive and reactive responses, and various automation agents such as for making automatic assignment and dispatch decisions.

Figure 34:
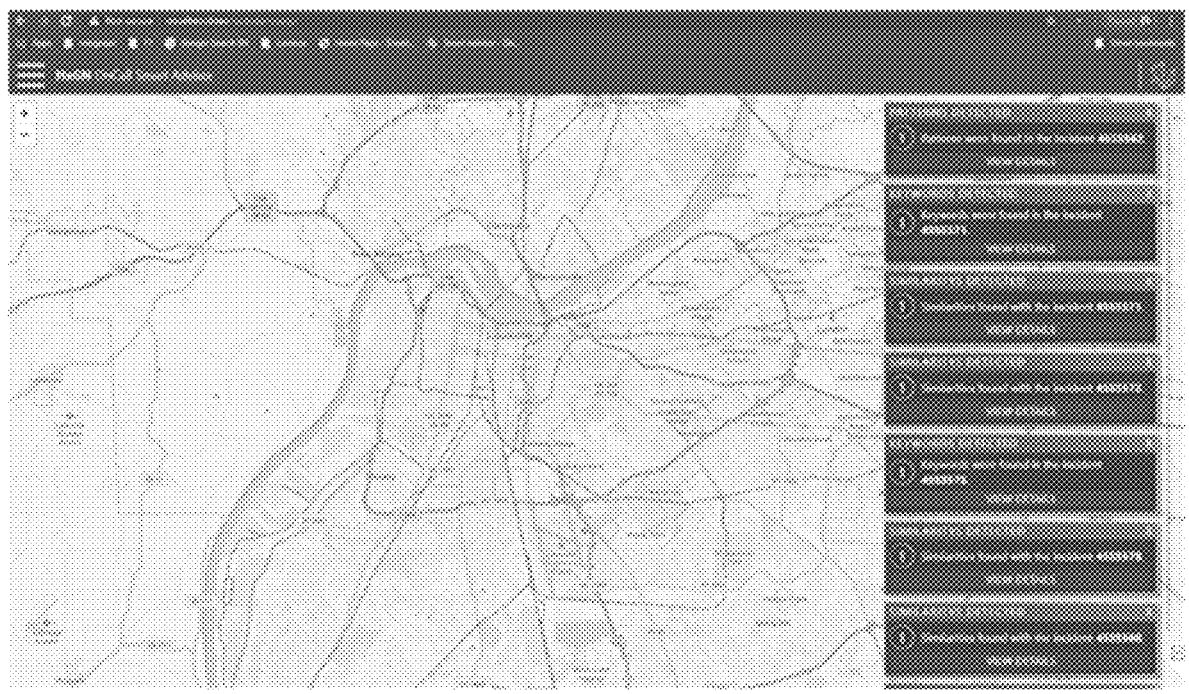
FIG. 34 shows a sample CAD system screen showing various types of notifications superimposed on a map.
Figure 35:
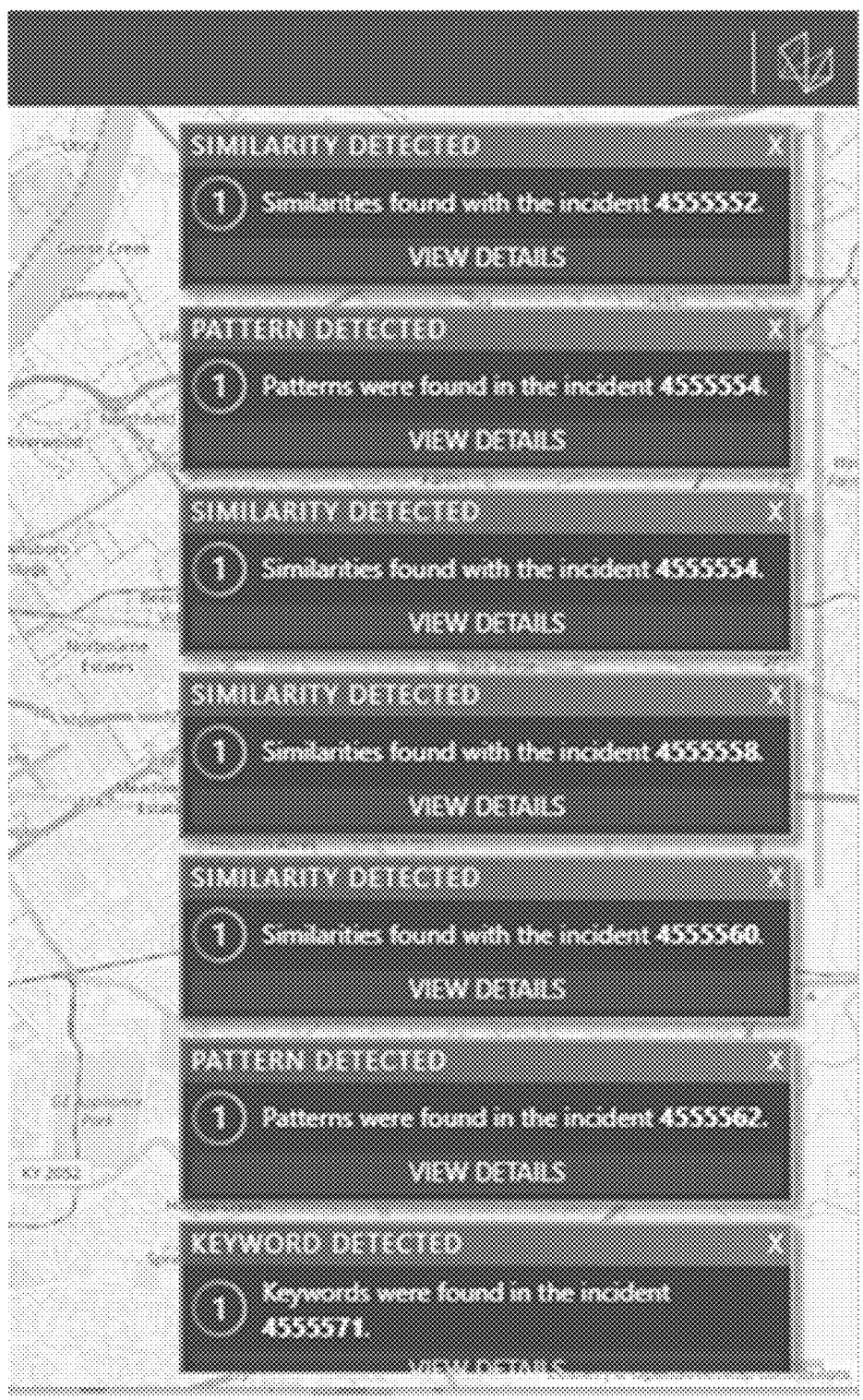
FIG. 35 shows some sample notifications in greater detail.
Figure 36:
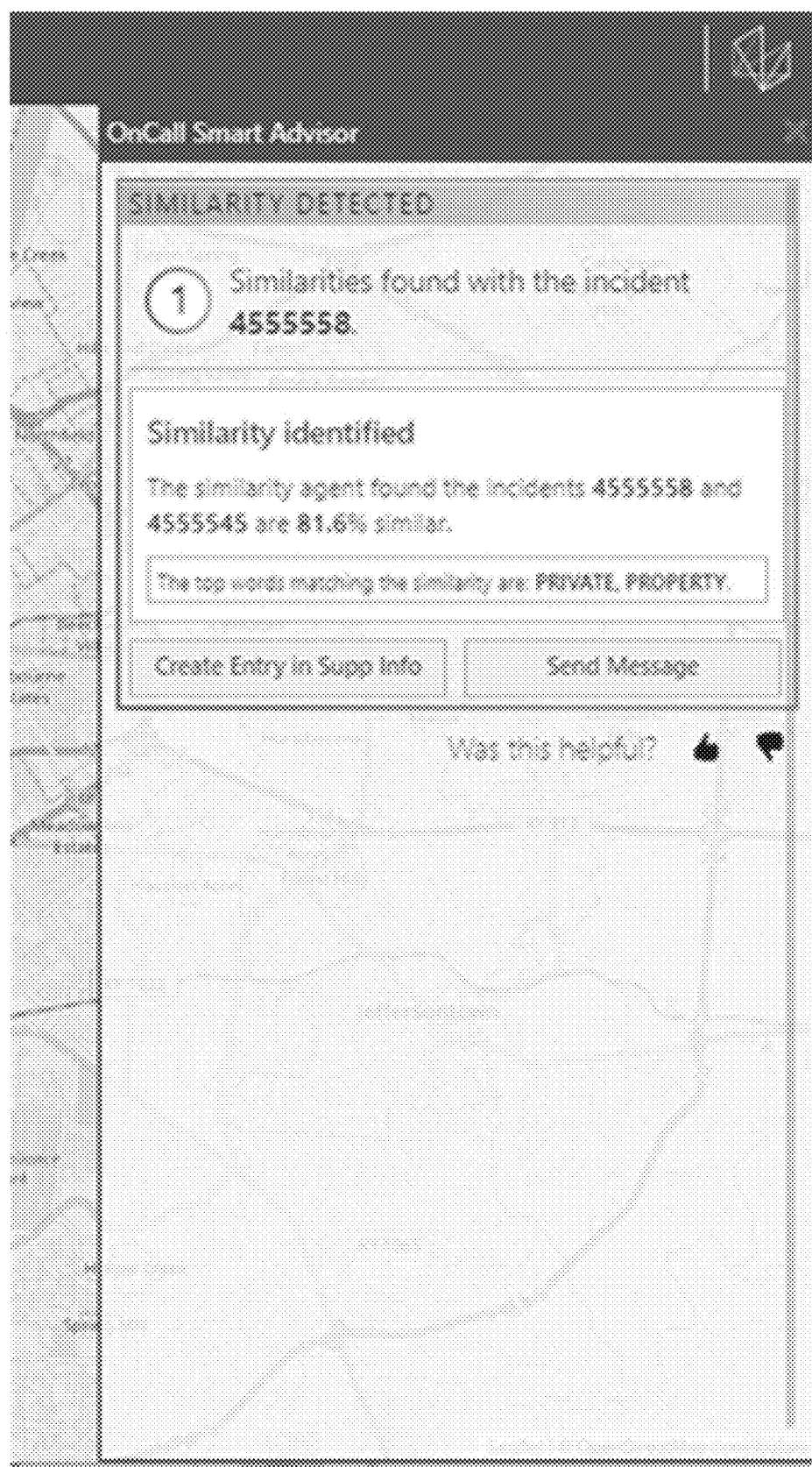
FIG. 36 shows a sample similarity notification detail.
Figure 37:
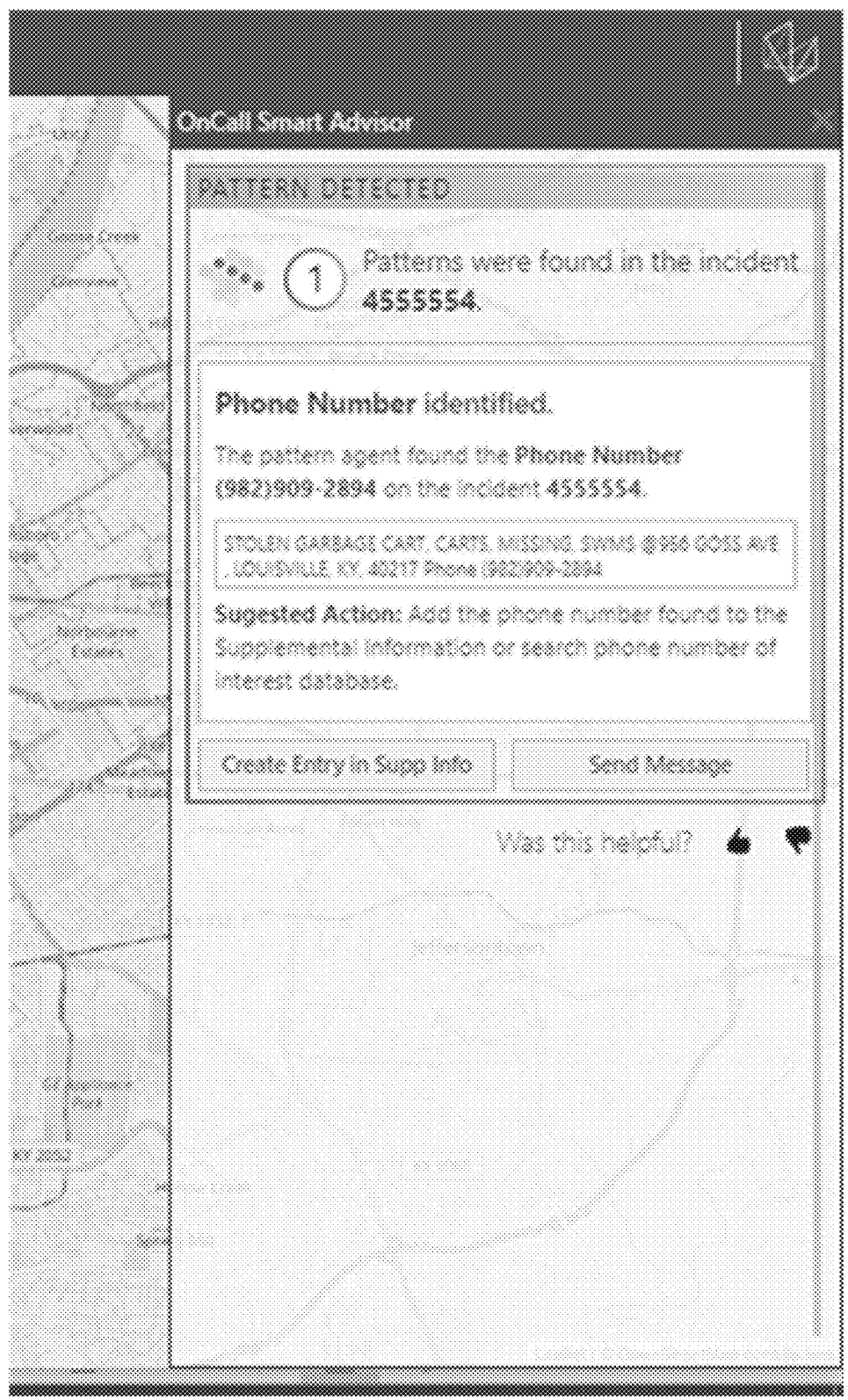
FIG. 37 shows a sample pattern notification detail.
Figure 38:
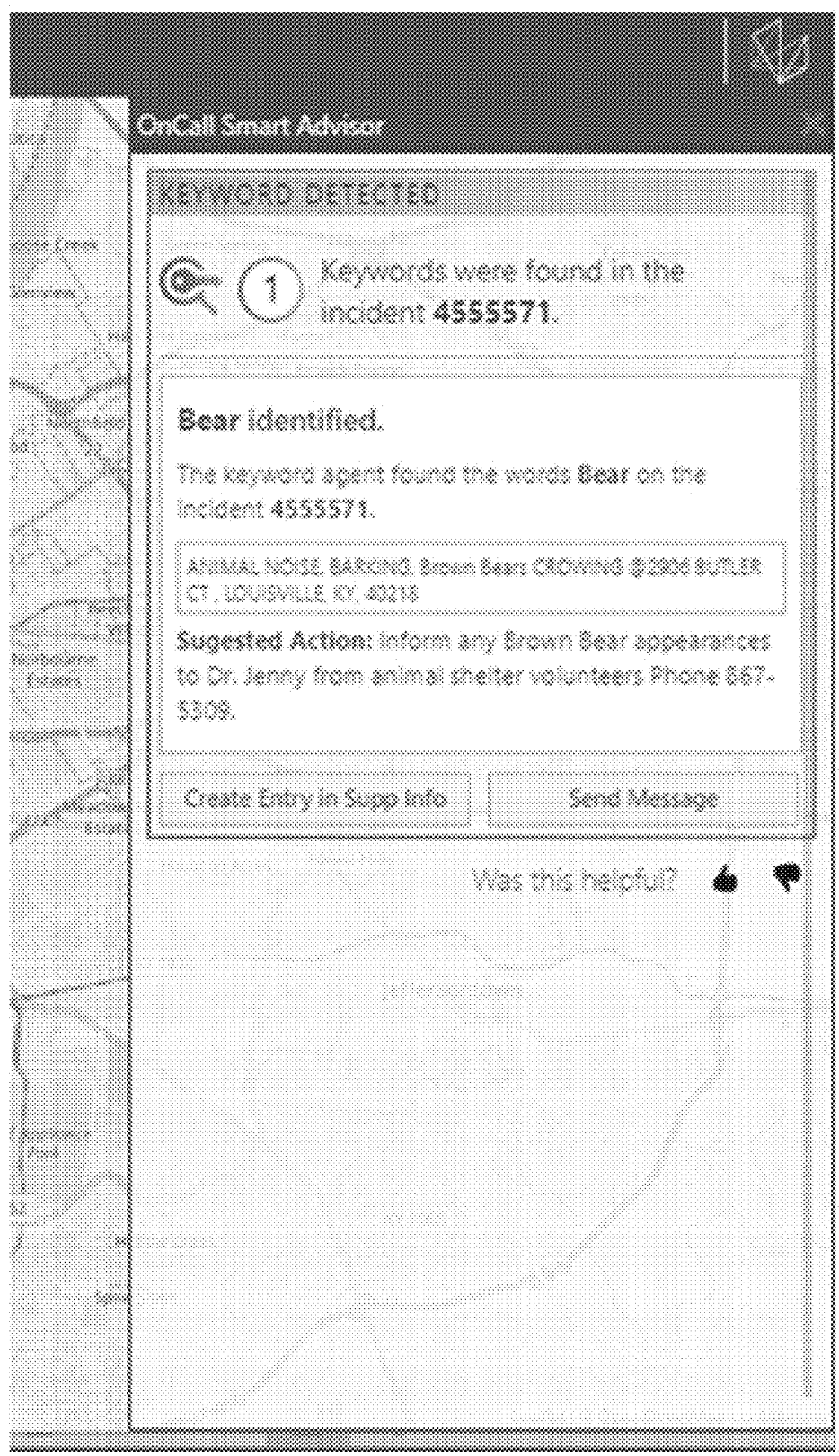
FIG. 38 shows a sample keyword notification detail.

FIGS. 34-38 show some exemplary graphical user interface screens in accordance with one exemplary CAD system embodiment. FIG. 34 shows a sample CAD system screen showing various types of notifications superimposed on a map. FIG. 35 shows some sample notifications in greater detail. Here, the sample notifications include notifications from a SimilarityAgent, a PatternAgent, and a KeywordAgent. The user can click on a notification in order to view details of the notification. FIG. 36 shows a sample similarity notification detail indicating the similarity threshold determination between to events (i.e., 81.6% similar) and the top words matching the similarity (i.e., PRIVATE, PROPERTY). FIG. 37 shows a sample pattern notification detail indicating that a pattern was found based on a phone number and providing the event details and a suggested action. FIG. 38 shows a sample keyword notification detail indicating the keyword that was identified in the event and providing the event details and a suggested action.

The following table shows the type(s) of algorithms used in the various Intelligent Agents, in accordance with one exemplary embodiment:

| Algorithm | Agents |
| --- | --- |
| Rule-Based Logic | RuleAgent |
| Fuzzy Logic | EventMatchAgent, RepeatEventAgent |
| Basic Statistics | StatisticAgent |
| Correlation Statistics | CorrelationAgent |
| NLP—Natural Language Processing | PatternAgent, KeywordAgent |
| Text Pattern Identification | PatternAgent |
| Keyword Identification | KeywordAgent |
| Notification Likelihood Analysis | Notification Feedback |
| Bayesian Classifier | EventClassificationAgent, Notification Feedback |
| Event Pattern Analysis | EventClassificationAgent |
| Repeated Event Identification | RepeatEventAgent |
| Event Similarity | SimilarityAgent |
| Cosine Text Similarity | SimilarityAgent |
| TF-IDF Algorithm | SimilarityAgent |
| Genetic Algorithm | RouteOptimizationAgent, AreaCoverageAgent |

FIGS. 41-51 show some exemplary class models for the SmartAdvisor and various Intelligent Agents, in accordance with one exemplary embodiment.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), conventional hardware components (e.g., off-the-shelf ASICs or discrete hardware components), and conventional AWL algorithms which, when programmed or configured to perform the non-conventional methods described herein, produce non-conventional devices or systems. Thus, there is nothing conventional about the inventions described herein because even when embodiments are implemented using conventional components, the resulting devices and systems (e.g., the CAD system with Intelligent Agents and intelligent notifications subsystem) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computer-aided dispatch (CAD) system comprising:
   a CAD database storing CAD data including event reports, each event report including event information; and
   at least one server comprising a tangible, non-transitory computer readable medium having stored thereon an artificially intelligent similarity agent configured to operate autonomously without being queried by a user and trained to identify event reports in the CAD database that have similar event information based on word values derived through machine learning and to produce dispatch-related notifications regarding such similar event reports, wherein the similarity agent includes a trained classifier that learns relevant words from the event information of event reports to create a dictionary model, performs a comparison of event information of a new event report to event information of past event reports based on the dictionary model, and identifies related event reports that are considered by the trained classifier to have a similarity above a predetermined threshold, wherein the similarity agent is configured to selectively include or exclude numbers from the comparison of event information of the new event report to event information of past event reports based on a user-specified configuration parameter that defines whether or not to reject all numbers in the event information.

2. The system according to claim 1, wherein the word values are based on frequency of words used in the description and remarks of event reports.

3. The system according to claim 2, wherein less frequently used words are assigned higher value than more frequently used words such that similarity is deemed to be higher when less frequently used words appear in different event reports.

4. The system according to claim 1, wherein the similarity agent is configured to determine similarity based on a fuzzy logic comparison and a fuzzy logic tolerance parameter.

5. The system according to claim 1, wherein the similarity agent is configured to produce a similarity index based on the word values, wherein the similarity index indicates a level of similarity of different event reports.

6. The system according to claim 5, wherein the similarity index is based on a combination of term frequency-inverted document frequency (tf-idf) and a cosine similarity of events, where frequency of words in the event information is analyzed, less-frequently used words are considered to be more important, and then cosine similarity is used to determine the ultimate similarity index.

7. The system according to claim 5, wherein two event reports are deemed to be similar when the similarity index is above a predetermined threshold.

8. The system according to claim 1, wherein the similarity agent is configured to accept user input tagging a specific keyword and to produce a notification if the specified keyword appears in an event report.

9. The system according to claim 1, wherein the similarity agent is configured to include electronic and social messages as event reports.

10. The system according to claim 1, wherein the similarity agent is configured to constantly learn words and word values as event reports are added to the system.

11. A computer program product comprising a tangible, non-transitory computer readable medium having embodied therein a computer program which, when run on a computer, implements computer processes comprising an artificially intelligent similarity agent configured to operate autonomously without being queried by a user and trained to identify event reports in a CAD database that have similar event information based on word values derived through machine learning and to produce dispatch-related notifications regarding such similar event reports, wherein the similarity agent includes a trained classifier that learns relevant words from the event information of event reports to create a dictionary model, performs a comparison of event information of a new event report to event information of past event reports based on the dictionary model, and identifies related event reports that are considered by the trained classifier to have a similarity above a predetermined threshold, wherein the similarity agent is configured to selectively include or exclude numbers from the comparison of event information of the new event report to event information of past event reports based on a user-specified configuration parameter that defines whether or not to reject all numbers in the event information.

12. The computer program product according to claim 11, wherein the word values are based on frequency of words used in the description and remarks of event reports.

13. The computer program product according to claim 12, wherein less frequently used words are assigned higher value than more frequently used words such that similarity is deemed to be higher when less frequently used words appear in different event reports.

14. The computer program product according to claim 11, wherein the similarity agent is configured to determine similarity based on a fuzzy logic comparison and a fuzzy logic tolerance parameter.

15. The computer program product according to claim 11, wherein the similarity agent is configured to produce a similarity index based on the word values, wherein the similarity index indicates a level of similarity of different event reports.

16. The computer program product according to claim 15, wherein the similarity index is based on a combination of term frequency-inverted document frequency (tf-idf) and a cosine similarity of event reports, where frequency of words in the event information is analyzed, less-frequently used words are considered to be more important, and then cosine similarity is used to determine the ultimate similarity index.

17. The computer program product according to claim 15, wherein two event reports are deemed to be similar when the similarity index is above a predetermined threshold.

18. The computer program product according to claim 11, wherein the similarity agent is configured to accept user input tagging a specific keyword and to produce a notification if the specified keyword appears in an event report.

19. The computer program product according to claim 11, wherein the similarity agent is configured to include electronic and social messages as event reports.

20. The computer program product according to claim 11, wherein the similarity agent is configured to constantly learn words and word values as event reports are added to the system.

* * * * *